United States Patent
Hoag et al.

(10) Patent No.: US 8,057,682 B2
(45) Date of Patent: Nov. 15, 2011

(54) GREEN SYNTHESIS OF NANOMETALS USING PLANT EXTRACTS AND USE THEREOF

(75) Inventors: George E. Hoag, Bloomfield, CT (US); John B. Collins, Bloomfield, CT (US); Rajender S. Varma, Cincinnati, OH (US); Mallikarjuna N. Nadagouda, Cincinnati, OH (US)

(73) Assignee: VeruTEK Technologies, Inc., Bloomfield, CT (US)

(*) Notice: Subject to any disclaimer, the term of this patent is extended or adjusted under 35 U.S.C. 154(b) by 0 days.

(21) Appl. No.: 12/667,384

(22) PCT Filed: May 18, 2009

(86) PCT No.: PCT/US2009/044402
§ 371 (c)(1), (2), (4) Date: Apr. 13, 2010

(87) PCT Pub. No.: WO2009/140694
PCT Pub. Date: Nov. 19, 2009

(65) Prior Publication Data
US 2010/0200501 A1    Aug. 12, 2010

Related U.S. Application Data

(60) Provisional application No. 61/071,785, filed on May 16, 2008.

(51) Int. Cl.
*C02F 3/00* (2006.01)
(52) U.S. Cl. .................................. 210/688
(58) Field of Classification Search ............ 210/688
See application file for complete search history.

(56) References Cited

U.S. PATENT DOCUMENTS

| | | | |
|---|---|---|---|
| 3,640,821 | A | 2/1972 | Sweeny et al. |
| 3,938,590 | A | 2/1976 | Redford et al. |
| 4,068,717 | A | 1/1978 | Needham |
| 4,101,172 | A | 7/1978 | Rabbitts |
| 4,229,281 | A | 10/1980 | Alquist et al. |
| 4,321,147 | A | 3/1982 | McCoy et al. |
| 4,338,185 | A | 7/1982 | Noelle |
| 4,353,806 | A | 10/1982 | Canter et al. |
| 4,360,061 | A | 11/1982 | Canter et al. |
| 4,368,111 | A | 1/1983 | Siefkin et al. |

(Continued)

FOREIGN PATENT DOCUMENTS
EP    0706427 A1    4/1996
(Continued)

OTHER PUBLICATIONS

Adventus Group. Groundwater Solutions. Accessed Apr. 15, 2007, www.adventusgroup.com/solutions/groundwater.shtml.

(Continued)

*Primary Examiner* — Chester Barry
(74) *Attorney, Agent, or Firm* — Venable LLP; Michael A. Gollin; Lars H. Genieser

(57) ABSTRACT

The present invention relates to methods of making and using and compositions of metal nanoparticles formed by green chemistry synthetic techniques. For example, the present invention relates to metal nanoparticles formed with solutions of plant extracts and use of these metal nanoparticles in removing contaminants from soil and groundwater and other contaminated sites. In some embodiments, the invention comprises methods of making and using compositions of metal nanoparticles formed using green chemistry techniques.

20 Claims, 47 Drawing Sheets

U.S. PATENT DOCUMENTS

| | | | |
|---|---|---|---|
| 4,389,399 A | 6/1983 | Murdock | |
| 4,405,015 A | 9/1983 | McCoy et al. | |
| 4,470,899 A | 9/1984 | Miller et al. | |
| 4,474,616 A | 10/1984 | Smith et al. | |
| 4,968,412 A | 11/1990 | Guymon | |
| 5,000,872 A | 3/1991 | Olah | |
| 5,009,773 A | 4/1991 | Schramm et al. | |
| 5,143,598 A | 9/1992 | Graham et al. | |
| 5,319,966 A | 6/1994 | Jackson et al. | |
| 5,340,467 A | 8/1994 | Gregoli et al. | |
| 5,399,350 A | 3/1995 | Potter | |
| 5,546,134 A | 8/1996 | Lee | |
| 5,602,090 A | 2/1997 | Melikyan et al. | |
| 5,622,641 A | 4/1997 | Kim et al. | |
| 5,641,020 A | 6/1997 | Cherry et al. | |
| 5,788,738 A | 8/1998 | Pirzada et al. | |
| 5,849,201 A | 12/1998 | Bradley | |
| 5,905,036 A | 5/1999 | Pope et al. | |
| 5,919,487 A | 7/1999 | Simonnet et al. | |
| 5,948,242 A | 9/1999 | Ohsol et al. | |
| 5,968,249 A | 10/1999 | Duyvesteyn et al. | |
| 6,003,206 A | 12/1999 | Hall et al. | |
| 6,019,548 A | 2/2000 | Hoag et al. | |
| 6,019,888 A | 2/2000 | Mishra et al. | |
| 6,039,882 A | 3/2000 | Wolfe et al. | |
| 6,099,206 A | 8/2000 | Pennell | |
| 6,127,319 A | 10/2000 | House | |
| 6,158,924 A | 12/2000 | Athens et al. | |
| 6,242,663 B1 | 6/2001 | Ponder et al. | |
| 6,261,463 B1 | 7/2001 | Jacob et al. | |
| 6,261,986 B1 | 7/2001 | Bowman et al. | |
| 6,274,048 B1 | 8/2001 | Parker et al. | |
| 6,315,494 B1 | 11/2001 | Oberle | |
| 6,321,595 B1 | 11/2001 | Pope et al. | |
| 6,352,387 B1 | 3/2002 | Briggs et al. | |
| 6,387,278 B1 | 5/2002 | Leif et al. | |
| 6,474,908 B1 | 11/2002 | Hoag et al. | |
| 6,511,954 B1 | 1/2003 | Wilbur et al. | |
| 6,623,211 B2 | 9/2003 | Kukor et al. | |
| 6,664,298 B1 | 12/2003 | Reinhart et al. | |
| 6,689,485 B2 | 2/2004 | Ponder et al. | |
| 6,719,902 B1 | 4/2004 | Alvarez et al. | |
| 6,726,406 B2 | 4/2004 | Gilmore et al. | |
| 6,777,449 B2 | 8/2004 | Vance et al. | |
| 6,866,764 B2 | 3/2005 | Dalman et al. | |
| 6,869,535 B2 | 3/2005 | Cowdery et al. | |
| 6,881,490 B2 | 4/2005 | Kambe et al. | |
| 6,881,709 B2 | 4/2005 | Nelson et al. | |
| 6,913,419 B2 | 7/2005 | Shiau | |
| 6,945,734 B1 | 9/2005 | Hayes et al. | |
| 7,008,964 B2 | 3/2006 | Clausen et al. | |
| 7,021,863 B2 | 4/2006 | Shiau | |
| 7,037,946 B1 | 5/2006 | Reinhart et al. | |
| 7,056,061 B2 | 6/2006 | Kukor et al. | |
| 7,066,254 B2 | 6/2006 | Vinegar et al. | |
| 7,128,841 B2 | 10/2006 | Zhang | |
| 7,141,162 B2 | 11/2006 | Garner et al. | |
| 7,175,717 B2 | 2/2007 | Song et al. | |
| 7,186,673 B2 | 3/2007 | Varadaraj et al. | |
| 7,192,092 B2 | 3/2007 | Watson | |
| 7,226,966 B2 | 6/2007 | Kambe et al. | |
| 7,229,950 B2 | 6/2007 | Shpakoff et al. | |
| 7,301,066 B2 | 11/2007 | Vance et al. | |
| 7,334,965 B2 | 2/2008 | Yang | |
| 7,364,386 B2 | 4/2008 | Shiau | |
| 7,431,775 B2 | 10/2008 | Wang et al. | |
| RE40,734 E * | 6/2009 | Borden et al. | 210/610 |
| 7,708,496 B2 * | 5/2010 | Shiau | 405/128.1 |
| 2002/0011442 A1 | 1/2002 | McMurtrey et al. | |
| 2002/0179530 A1 | 12/2002 | Cowdery et al. | |
| 2003/0059926 A1 | 3/2003 | deTorres | |
| 2003/0175081 A1 | 9/2003 | Shiau | |
| 2005/0009170 A1 | 1/2005 | Gardea-Torresdey et al. | |
| 2005/0077242 A1 | 4/2005 | Karlsson | |
| 2005/0191131 A1 | 9/2005 | Shiau | |
| 2005/0197267 A1 | 9/2005 | Zaki et al. | |
| 2005/0199556 A1 | 9/2005 | Zhang | |
| 2006/0046297 A1 | 3/2006 | Ball | |
| 2006/0175266 A1 | 8/2006 | Rima et al. | |
| 2006/0210815 A1 * | 9/2006 | Furusawa et al. | 428/457 |
| 2006/0275757 A1 * | 12/2006 | Lee et al. | 435/6 |
| 2007/0116524 A1 | 5/2007 | Shiau | |
| 2007/0119786 A1 * | 5/2007 | Schaefer et al. | 210/757 |
| 2007/0212562 A1 * | 9/2007 | Shim et al. | 428/548 |
| 2007/0256713 A1 * | 11/2007 | Feitz et al. | 134/42 |
| 2007/0256985 A1 | 11/2007 | Zhao et al. | |
| 2008/0003687 A1 | 1/2008 | Satoh et al. | |
| 2008/0044539 A1 | 2/2008 | Perlman et al. | |
| 2008/0047906 A1 * | 2/2008 | Zhang | 210/757 |
| 2008/0190865 A1 * | 8/2008 | Zhao et al. | 210/757 |
| 2008/0264876 A1 * | 10/2008 | Block et al. | 210/759 |
| 2009/0074875 A1 | 3/2009 | Wertz et al. | |
| 2009/0250404 A1 * | 10/2009 | Berkowitz et al. | 210/721 |

FOREIGN PATENT DOCUMENTS

| | | | |
|---|---|---|---|
| EP | 1151807 A1 | 11/2001 | |
| WO | WO 9325714 A1 * | 12/1993 | |
| WO | WO-95/01232 A1 | 1/1995 | |
| WO | WO-98/25857 A1 | 6/1998 | |
| WO | WO-03/068324 | 8/2003 | |
| WO | WO-03/101541 A1 | 12/2003 | |
| WO | WO-2005/095031 A1 | 10/2005 | |
| WO | WO-2006/055054 A1 | 5/2006 | |
| WO | WO-2006/068354 A1 | 6/2006 | |
| WO | WO-2007/047946 A2 | 4/2007 | |
| WO | WO-2007/126779 A2 | 11/2007 | |
| WO | WO-2009/014697 | 1/2009 | |
| WO | WO-2009/042223 A2 | 4/2009 | |
| WO | WO-2009/042224 A1 | 4/2009 | |
| WO | WO-2009/042228 A1 | 4/2009 | |
| WO | WO-2009/140694 | 5/2009 | |
| WO | WO-2009/114145 A2 | 9/2009 | |

OTHER PUBLICATIONS

Adventus Group. Products: Overview for Accelerated Bioremediation. Accessed Apr. 15, 2007, www.adventusgroup.com/products/technologies.shtml.

Anastas PT, Warner JC. Green Chemistry: Theory and Practice, Oxford University Press, Inc: New York. 1998.

Arcadis. Perchlorate. www.arcadis-us.com.

Beal DR, Faircloth H, Tackling Tough Groundwater Contaminants: the presence of dense non-aqueous-phase liquids (DNAPLs) in the sub-surfaces requires some unconventional approaches to site investigation and remediation, Chemical Engineering, Mar. 2002, 91-94.

Bergendahl J, Thies T. Fenton's Oxidation of MTBE with Zero-valent Iron. 2004. Water Research. 38:327-334.

Block, PA, Brown RA, Robinson, D. Novel activation technologies for sodium persulfate in situ chemical oxidation. Proceedings of the Fourth International Conference on the Remediation of Chlorinated and Recalcitrant Compounds, Monterey, CA, May 2004. Batelle Press, Columbus, OH. 2004.

Blum YD, Kambe N, Chaloner-Gill B, Chiruvolu S, Kumar S, MacQueen DB. Naoncomposites by Covalent Bonding between Inorganic Nanoparticles and Polymers. Materials Research Society Symposium Proceedings 2001, 676: 1.8.1.

Boussahel R, Harik D, Mammar M, Lanara-Mohamed S. Degradation of Obsolete DDT by Fenton Oxidation with Zero-Valent Iron., Desalination 2007, 206: 369-372. Presented at the EuroMed 2006 Conference on Desalination Strategies in South Mediterranean Countries, Montpellier, France May 21-25, 2006.

Carvel DD, Cartwright RT Innovative heavy oil contaminant remediation at typical MGP remediation sites. 2005. Unpublished data from web sites: http://www.mecx.net/services1.html.

Chang M, Shu H, Yu H. An Integrated technique using Zero Valent Iron and UV/H2O2 Sequential Process form Complete Decolorization and Mineralization of C.I. Acid Black 24 Wastewater. Journal of Hazardous Materials 2006, B 138: 574-581.

Chen J, McLellan JM, Siekkinen AY, Xiong Y, Li ZY, Xia Y. Facile synthesis of gold-silver nanocages with controllable pores on the surface. J. Am. Chem. Soc. 2006, 128: 14776.

Choi CW, Kin SC, Hwang SS, Choi BK, Ahn HJ, Lee MY, Park SH, Kim SK. Antioxidant activity and free radical scavenging capacity between Korean medicinal plants and flavonoid by assay-guided comparison. Plant Science 2002, 16: 1161-1168.

Chun H, Scriven LE. Hydrodynamic model of steady movement of a solid/liquid/fluid contact line. J. Colloid Interface Sci. 1971, 35: 85-101.

Collins, John and Hoag, George. Coelution Technologies and Surfactant-Enhanced in Situ Oxidation as new breakthrough technologies in the treatmen of toxic subsurface contaminants. 11th Annual Green Chemistry and Engineering Conference. 2007. Retrieved Mar. 25, 2009. http://acs.confex.com/acs/green07/techprogram/P42826.htm.

Coutteneye RA, Huang KC, Hoag GE, Suib SL. Evidence of Sulfate Free Radical (SO4-") Formation under Heat-assisted Persulfate Oxidation of MTBE. Proceedings of the 19th Petroleum Hydrocarbons and Organic Chemicals in Ground Water: Prevention, Assessment, and Remediation, Conference and Exposition, Atlanta, GA, United States, Nov. 5-8, 2002, 345-350.

Dahl JA, Maddux LS, Hutchison JE, Toward Greener Nanosynthesis, Chem. Rev. 2007, 107: 2228.

Das, SK, Butler, RM. Mechanism of the Vapor Extraction Process for Heavy Oil and Bitumen. J Petroleum Sci. and Eng. 1998. 21: 43-59.

Diallo et al. Solubilization of nonaqueous phase liquid hydrocarbons in micellar solution of dodecyl alcohol ethoxylates. Environ. Sci. Technol. 1994. 1829-1837.

Du J, Han B, Liu Z, Liu Y, Kang DJ. Control Synthesis of Silver Nanosheets, Chainlike Sheets, and Microwires via a Simple Solvent-Thermal Method. Crystal Growth and Design 2007, 7: 900.

Edwards, DA, Luthy, RG, Lly, Z. Solubilization of Polycyclic Hydrocarbons in Micellar Nonionic Surfactant Solutions. 1991 Environ. Sci. Technol. 25:127-133.

EOS Remediation Inc. Emulsified Edible Oils for Anaerobic Bioremediation. Accessed Apr. 15, 2007, www.eosremediation.com.

Falta RW. Using Phase Diagrams to Predict the Performance of Cosolvent Floods for NAPL Remediation. Ground Water Monit. Rem. 1998, 18(3): 227-232.

Fang J, You H, Kong P, Yi Y, Song X, Ding B. Dendritic Silver Nanostructure Growth and Evolution in Replacement Reaction. Crystal Growth and Design 2007, 7: 864.

Flaming JE, Knox RC, Sabatini DA, Kibbey TC, Surfactant Effects on Residual Water and Oil Saturations in Porous Media. 2003, Vadose Zone Journal 2:168-176.

Florida Chemical Company, Material Safety Data Sheet for Citrus Burst 3. Jul. 2007, Winter Haven, FL.

Frankel AJ, Owsianiak, LM, Wuerl, BJ, Horst, JF. In-Situ Anaerobic Remediation of Perchlorate-Impacted Soils. Arcadis US.

Georgetti SR, Casagrande R, Di Mambro, VM, Azzolini, AECS, Fonseca, MJV. Evaluation of the Antioxidant of Different Flavonoids by the Chemiluminescence Method. AAPA PharmSci. 2003. 5(2) Article 20.

Gillham RW, O'Hannesin SF. Enhanced degradation of halogenated aliphatics by zero-valent iron. Ground Water 1994, 32(6): 959-967.

Goi et al. Combined chemcial and biological treatment of oil contaminated soil. Chemosphere. Pergamon Press. Oxford. GB. 2006. vol. 63:10. 1754-1763.

Guha S, Jaffe PR. Biodegradation kinetics of phenanthrene partitioned into the micellar phase of nonionic surfactants. Env. Sci. & Tech. 1996, 30: 605-611.

Hatano T, Kagawa H, Yasuhara T, Okuda T. Two new flavonoids and other constituents in licorice root: their relative astringency and radical scavenging effect. Chem. Phar. Bull. 1998, 36: 2090-2097.

He F, Zhao D. Preparation and characterization of a new class of starch-stabilized bimetallic nanoparticles for degradation of chlorinated hydrocarbons in water. Environ Sci Technol. 2005, 39: 3314-3320.

House DA, Kinetics and Mechanism of Oxidations by Peroxydisulfate, Chemistry Review 1962, 62: 185-200.

Huang K, Coutteneye RA, Hoag G. Kinetics of heat-assisted persulfate exidation of methyl tert-butyl ether (MTBE). Chemosphere 2002, 49(4), 413-420.

International Search Report and the Written Opinion of the International Searching Authority for PCT/US2007/007517, Nov. 27, 2008.

International Search Report and Written Opinion for PCT/US08/011228 mailed May 28, 2009.

International Search Report and Written Opinion issued in International Application No. PCT/US2008/011235, mailed on Dec. 19, 2008.

International Search Report and Written Opinion issued in International Application No. PCT/US2008/11229, mailed on Dec. 9, 2008.

International Search Report and Written Opinon for PCT/US2008/008905 mailed May 7, 2009.

International Search Report for International Application No. PCT/US2009/044402, mailed Apr. 12, 2010.

Interstate Technology & Regulatory Council Dense Nonaqueous Phase Liquids Team, Technical and Regulatory Guidance for Surfactant/Cosolvent Flushing of DNAPL Source Zones, Apr. 2003.

Jafvert CT, Technology Evaluation Report: Surfactants/Cosolvents. Dec. 1996, Gound-Wter Remediation Analysis Center, Pittsburgh, PA.

Jawitz, JW, Annable, MD, Rao, PSC, Rhue, RD. Field Implementation of a Winsor Type 1 Surfactant. Alcohol Mixture for in Situ Solubilization of a Complex LNAPL as a Single-Phase Microemulsion. 1998. Environ. Sci. Technol., 32:523-530.

Juliano LM, Griffiths RR. A critical review of caffeine withdrawal: empirical validation of symptoms and signs, incidence, severity, and associated features. Psychopharmacology 2004, 176, 1.

Kile, DE, Chiou, CT. Water Solubility Enhancements of DDT and Trichlorobenzene by Some Surfactants Below and Above the Critical Micelle Concentration. Environ. Sci. Technol. 1989, 23:832-838.

Kislenko VN, Berlin AA, Litovchenko NV, Kinetics of Oxidation of Glucose by Persulfate Ions in the Presence of Mn (II) Ions, Kinetics and Catalysis 1997, 38(3): 391-396.

Kolthoff IM, Medalia AI, Raaen HP The Reaction Between Ferrous Iron and Peroxides IV Reaction with Potassium Sulfate, Journal of American Chemical Society 1951, 73: 1733-1739.

Kotterman MJ, Rietberg HJ, Hage A, Field JA. Polycyclic aromatic hydrocarbon oxidation by white-rot fungus *Bjerkandera* sp. Strain BOS55 in the presence of non-ionic surfactants. Biotechnology and Bioengineering 1997, 57: 220-227.

Kumar A, Vemula PK, Ajayan PM, John G., Silver Nanoparticle-Embedded Antimicrobial Paints Based on Vegetable Oil, Nature Materials 2008, 7: 236-241.

Li Zhaohui, Surfactant-enhanced oxidation of trichloroethylene by permanganate- proof of concept. Chemosphere 2004, 54:419-423.

Liang CJ, Bruell CH, Marley MC, Sperry, KL. Thermally activated persulfate oxidation of trichloroethylene (TCE) and 1,1,1-trichloroethane (TCA) in aqueous systems and soil slurries. 2003. Soil & Sediment Contamination 2003, 12(2): 207-228.

Liang CJ, Bruell CJ, Marley MC, Sperry KL Persulfate oxidation for in situ remediation of TCE I: Activated by ferrous ion with and without a persulfate-thiosulfate redox couple. Chemosphere 2004, 55(9), 1213-1223.

Luong HV, Lin HK. Controlling Fenton reaction for soil remediation. Analytical Letters 2000, 33(14), 3051-3065.

Martel R, Gelinas P. Surfactant solutions developed for NAPL recovery in contaminated aquifers. Ground Water 1996, 34: 143-154.

Martel R, Gelinas PJ, Desnoyers JE, Masson A. Phase Diagrams to Optimize Surfactant Solutions for Oil and DNAPL Recovery in Aquifers, Ground Water 1993, 31: 789-800.

Moschopedis SE. et al. Surface-active materials from Athabasca oil sands. Fuel processing Technology 1980, 3: 55-61.

Murphy CJ, Gole AM, Hunyadi SE, Orendorff CJ. One-Dimensional Colloidai Gold and Silver Nanostructures. Inorg Chem 2006, 45(19): 7544-7554.

Nadagouda et al., "Green Synthesis of AU Nanostructures at Room Temperature Using Biodegradable Plant Surfactants," Crystal Growth and Design, vol. 9, No. 11, 2009.

Nadagouda MN, Varma RS. A Greener Synthesis of Core (Fe, Cu)-Shell (Au, Pt, Pd and Ag) Nanocrystals Using Aqueous Vitamin C, Crystal Growth and Design 2007, 7(12): 2582-2587.

Nadagouda MN, Varma RS. Crystal Growth and Design 2007, 7(4): 686-690.

Nadagouda MN, Varma RS. Green and Controlled Synthesis of Gold and Platinum Nanomaterials Using Vitamin B2: Density-Assisted Self Assembly of Nanospheres, Wires and Rods, Green Chem. 2006, 8: 516.

Nadagouda MN, Varma RS. Green Chem. 2007, 9: 632.

Nadagouda MN, Varma RS. Green synthesis of silver and palladium nanoparticles at room temperature using coffe and tea extract. Royal Society of Chemistry. Green Chem 2008, 10: 859-862.

Nadagouda MN, Varma RS. Microwave Assisted Shape Controlled Bulk Synthesis of Ag and Fe Nanorods in Poly(ethylene glycol) Solutions, Crystal Growth and Design 2008, 8(1): 291-295.

Nadagouda MN, Varma RS. Preparation of novel metallic and bimetallic cross-linked poly(vinly alcohol) nanocomposites under microwave irradiation. Macromolecular Rapid Communications 2007, 28: 465-472.

Nadagouda MN, Varma RS. Synthesis of thermally stable carboxymethyl cellulose/metal biodegradable nanocomposites for potential biological applications. Biomacromolecules. 2007, 8(9): 2762-2767.

Naik RR, Stringer SJ, Agarwal G, Jones SE, Stone MO. Nature Mater. 2002, 1: 169.

Narayan A, Landstrom L, Boman M. Laser-assisted synthesis of ultra small metal nanoparticles. Appl. Surf Sci 2003, 137: 208.

Niu S-F, Liu Y, Xu X-H, Lou Z-H. Removal of hexavalent chromium from aqueous solution by iron Nanoparticles. J. Zhejiang Univ Sci B 2005, 6(10): 1022-1027.

Office Action issued by the USPTO for U.S. Appl. No. 12/680,103 on Jul. 15, 2010.

Peters, S.M. et al. A Laboratory Study on the Degradation of Gasoline Contamination Using Fenton's Reagent, Proceedings 54th Canadian Geotechnical Conference, 2001 An Earth Odyssey, p. 1170-1177.

Pirkanniemi K, Sillanpaa M, Sorokin A. Degradative Science of the Total Environment 2003, 307: 1-3, 11-18.

Ponder S, Darab JG, Bucher J, Caulder D, Craig I, Davis L, Edelstein N, Lukens W, Nitsche H, Rao L, Shuh DK, Mallouk TE. Surface chemistry and electrochemistry of supported zerovalent iron nanoparticles in the remediation of aqueous metal contaminants. Chem. Mater. 2001, 13(2): 479-486.

Ponder SM, Darab JG, Mallouk TE. Remediation of Cr(VI) and Pb(II) aqueous solutions using supported, nanoscale zero-valent iron. Environ. Sci. Technol. 2000, 34: 2564-2569.

Powell RM, Puls RW, Hightower SK, Sabatini DA. Coupled Iron Corrosion and Chromate Reduction: Mechanisms for Subsurface Remediation. Environ. Sci. Technol. 1995, 29: 1913-1922.

Raveendran P, Fu J, Wallen SL. Completely "Green" Synthesis and Stabilization of Metal Nanoparticles, J. Am. Chem. Soc. 2003, 125: 13940.

Regenesis. Chemical Oxidation. Accessed Apr. 15, 2007, www.regenesis.com/products/chemOx/.

Regenesis. Enhanced Aerobic Bioremediation, Accessed Apr. 15, 2007, www.regenesis.com/products/enhAer/.

Regenesis. Remediation Products. Accessed Apr. 15, 2007, www.regenesis.com.

Roote, Diane S. Technology Status Report In Situ Flushing: Ground-Water Remediation Technologies Analysis Center, Pittsburg, PA, Nov. 1998.

Schramm et al. The Influence of Interfacial tension in the recovery of bitumen by water-based conditioning and flotation of Athabasca oil sands. Fuel Processing Technology 2003, 80: 101-118.

Schrick B, Blough J, Jones A, Mallouk TE. Hydrodechlorination of trichloroethylene to hydrocarbons using bimetallic nickel-iron nanoparticles. Chem. Mater. 2002, 14(12): 5140-5147.

Shiau. BJ, Sabatini DA, Harwell JH. Solubilization and mobilization of DNAPLs using direct food additive (edible) surfactants. Ground Water 1994, 32: 561-569.

Song H, Rioux RM, Hoefelmeyer JD, Komor R, Niesz K, Grass M, Yang P, Somorjai GA. Hydrothermal Growth and Mesaporous SBA-15 Silica in the Presence of PVP-Stabilized PT Nanoparticles: Synthesis, Characterization, and Catalytic Properties J. Am. Chem. Soc. 2006, 128: 3027.

Stone JW, Sisco PN, Goldsmith EC, Baxter SC, Murphy CJ. Using gold nanorods to probe cell-induced collagen deformation. Nano Letters 2007, 7: 116.

Sun Y, Xia Y. Shape-Controlled Synthesis of Gold and Silver Nanoparticles. Science 2002, 298: 2176.

Sundstrom DW, Allen JS, Fenton SS, Salimi FE, Walsh KJ, Treatment of Chelated Iron and Copper Wastes by Chemical Oxidation, J Environ Sci Health 1996, A31: 1215.

Swe, MM, Yu, LE, Hung, KC, Chen, BH. Solubilization of Selected Polycyclic Aromatic Compounds by Nonionic Surfactants. Journal of Surfactants and Detergents. 2006, 9:3, 237-244.

Sweeny, KH. 1981 a. The Reductive Treatment of Industrial Wastewater: II. Process Applications. American Institute of Chemical Engineers, Symposium Series, Water-1980 Fd. G.F. Nennett. 209(77): 67-71.

Sweeny, KH. 1981 b. The Reductive Treatment of Industrial Wastewater: I. Process Description. American Institute of Chemical Engineers, Symposium Series, Water-1980 Ed. GF Nennett, 209(77): 72-78.

USDA 2007. Oxygen Radical Absorbance Capacity (ORAC) of Selected Foods-2007. Nutrient Data Laboratory, Beltsville Human Nutrition Research Center, Agricultural Research Service.

Uyeda R. Studies of Ultrafine Particles in Japan: Crystallography, Methods of Preparation and Technological Applications. Prog. Mater. Sci. 1991, 35: 1.

Wang C-B, Zhang W. Synthesizing nanoscale iron particles for rapid and complete dechlorination of TCE and PCBs. Environ. Sci. Technol. 1997, 31(7): 2154-2156.

Wang CC, Chen DH, Huang TC, Synthesis of palladium nanapartices in water-in-oil microemulsions. Colloids ad Surfaces A: Physicochemical and Engineering Aspects 2001, 189: 145.

Wang X, Li Y. Monodisperse nanocrystals: general synthesis, assembly, and their applications. Chem Commun Camb 2007, 28: 2901-2910.

Wei JJ, Xu XH, Liu Y. Kinetics and mechanism of dechlorination of o-chlorophenol by nanoscale. Pd/Fe. Chem Res Chinese U. 2004;20:73-76.

Wiley B, Herricks T, Sun Y, Xia Y. Polyol synthesis of silver nanoparticles: Use of chloride and oxygen to promote the formation of single-crystal, truncated cubes & tetrahedrons. Nano Letters 2004, 4: 1733-1739.

Wiley B, Sun Y, Xia Y. Synthesis of silver nanostructures with controlled shapes and properties. Acc. Chem. Res 2007. 40: 1067.

Wiley BJ, Chen Y, McLellan JM, Xiong Y, Li Z-Y, Ginger D, Xia Y. Synthesis and Optical Properties of Silver Nanobars. Nano Letters 2007, 4: 1032.

Wu X, Beecher GR, Holden JM, Haytowitz DB, Gebhardt SE, Prior RL. Lipophilic and hydrophilic antioxidant capacities of common foods in the United States. Journal of Agricultural and Food Chemistry 2004, 52: 4026-4037.

Xiong Y, Cai H, Wiley BJ, Wang J, Kim MJ, Xia Y. Synthesis and Mechanistic Study of Palladium Nanobars and Nanorods. J. Am. Chem. Soc. 2007, 129: 3665.

Xu Y, Zhang W. Subcolloidal Fe/Ag particles for reductive dehalogenation of chlorinated benzenes. Ind. Eng. Chem. Res. 2000, 39(7): 2238-2244.

Yen GC, Chen F. Antioxidant activity of various tea extracts in relation to their antimutagenicity. Journal of Agricultural and Food Chemistry 1995, 45: 27-32.

Yeom IT, Ghosh MM. Mass transfer limitation in PAH-contaminated soil remediation. Water Sci. Tech 1998, 37: 111-118.

Zeveloff J, Inventor Sues Soil Remediation Co. Over Patents. Portfolio Media. Inc., Oct. 2008, New York NY.

Zhang H, Jin Z-H, Han L, Qin C-H. Synthesis Of nanoscale zero-valent iron supported on exfoliated graphite for removal of nitrate. Transactions of Nonferrous Metals Society of China 2006, 16(1): s345-s349.

Zhang W, Wang C, Lien H. Treatment of chlorinated organic contaminants with nanoscale bimetallic particles. Catal. Today 1998, 40(4): 387-395.

Zhang W-X. Nanoscale iron particles for environmental remediation: An overview. J. Nanoparticle Research 2003, 5: 323-332.

Zheng Z, Obbard JP. Polycyclic Aromatic Hydrocarbon Removal from Soil by Surfactant Solubilization and *Phanerochaete chrysosporium* Oxidation. J. Environ. Qual. 2002, 31: 1842-1847.

Ankamwar et al. Biosynthesis of Gold and Silver Nanoparticles Using Umbilica Officinalis Fruit Extract, Their Phase Transfer and Transmetallation in an Organic Solution. 2005. Journal Nanoscience and Nanotechnology, 5(10):1665-1671.

Baruwati, B. and Varma, R. High Value Products from Waste: Grape Pomace Extract- A Three-in-One Package for the Synthesis of Metal Nanoparticles. ChemSisChem. 2:1041-1044. published online on Oct. 19, 2009.

Watlington, K. Emerging Nanotechnologies for Site Remediation and Wastewater Treatment. A report for the US Environmental Protection Agency, Aug. 2005, 1-47.

Jain et al. Synthesis of Plant-Mediated Silver Nanoparticles Using Papaya Fruit Extract and Evaluation of their Anti Microbial Activities. 2009. Digest Journal of Nanomaterials and Biostructures. 4(3):557-563.

Office Action in U.S. Appl. No. 12/893,826 mailed on Jun. 17, 2011.

\* cited by examiner

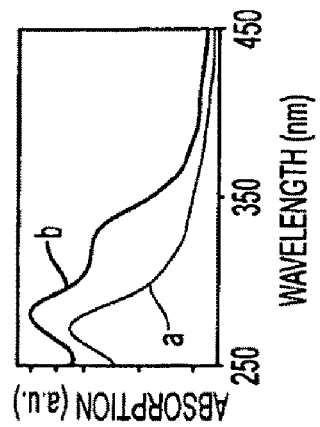
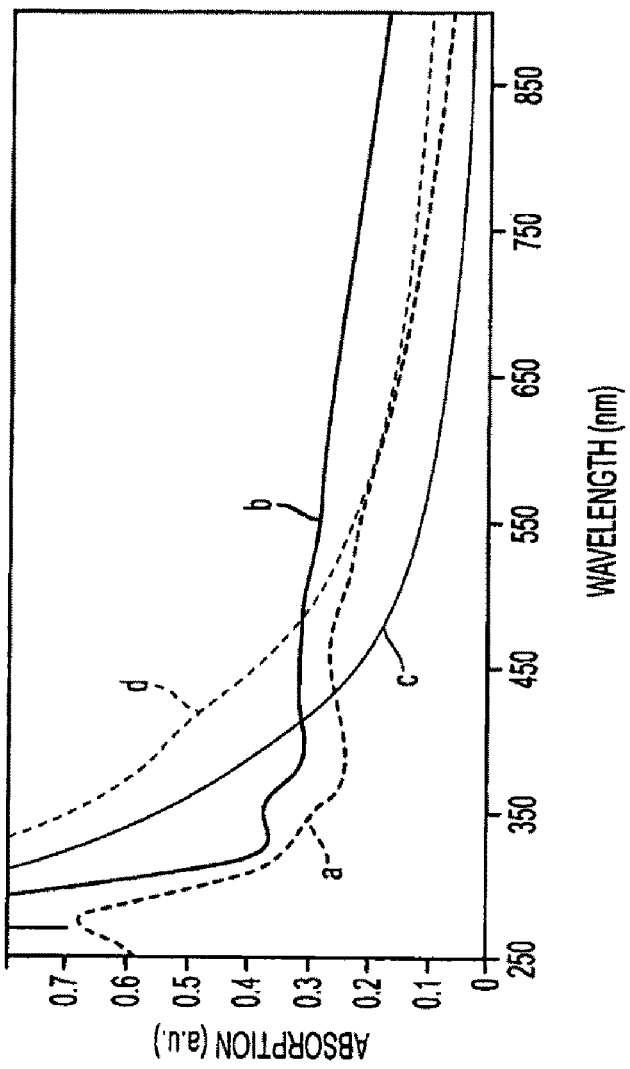
Fig. 7B
Fig. 7A

GREEN SYNTHESIS OF NANOMETALS USING PLANT EXTRACTS AND USE THEREOF

This application is a National Stage of International Application Number PCT/US2009/044402, filed May 18, 2009, which claims the benefit of U.S. Provisional Application No. 61/071,785, filed May 16, 2008.

This invention was made with the support of the United States Government as indicated in a Cooperative Research and Development Agreement (CRADA) with the Environmental Protection Agency (EPA) (EPA Case No. 755-09). The Government has certain rights in the invention.

FIELD OF THE INVENTION

The present invention relates to methods of making and using and compositions of metal nanoparticles formed by green chemistry synthetic techniques. For example, the present invention relates to metal nanoparticles formed with solutions of plant extracts and use of these metal nanoparticles in removing contaminants from soil and groundwater.

BACKGROUND

Nanoparticles are particles ranging in size from 1 nm to 1 micron in diameter. "Nano" is a prefix which means one billionth ($10^{-9}$) part of something (Meridian Webster Dictionary). In recent years, the field of nanoparticles has grown due to their unique properties. Many industries utilize nanoparticles, for example the electronics industry, medical science, material science, and environmental science. Noble metal nanoparticles have found widespread use in several technological applications and various wet chemical methods have been reported. See, X. Wang and Y. Li, Chem. Commun., 2007, 2901; Y. Sun and Y. Xia, Science, 2002, 298, 2176; J. Chen, J. M. McLellan, A. Siekkinen, Y. Xiong, Z-Y Li and Y. Xia, J. Am. Chem. Soc., 2006, 128, 14776; J. W. Stone, P. N. Sisco, E. C. Goldsmith, S. C. Baxter and C. J. Murphy, Nano-Lett., 2007, 7, 116; B. Wiley, Y. Sun and Y. Xia, Acc. Chem. Res., 2007, 40, 1067.

There is great interest in synthesizing metal and semiconductor nanoparticles due to their extraordinary properties, which differ from those of the corresponding bulk material. An example of a nanoparticle is nanoscale zero valent iron (nZVI). Generally, nanoparticles are synthesized in three ways: physically by crushing larger particles, chemically by precipitation, and through gas condensation. Chemical generation is highly varied and can incorporate laser pyrolysis, flame synthesis, combustion, and sol gel approaches. See, U.S. Pat. No. 6,881,490 (Apr. 19, 2005) N. Kambe, Y. D. Blum, B. Chaloner-Gill, S. Chiruvolu, S. Kumar, D. B. MacQueen. Polymer-inorganic particle composites; J. Du, B. Han, Z. Liu and Y. Liu, Cryst. Growth and Design, 2007, 7, 900; B. Wiley, T. Herricks, Y. Sun and Y. Xia, Nano Lett., 2004, 4, 2057; C. J. Murphy, A. M. Gole, S. E. Hunyadi and C. J. Orendorff, Inorg. Chem., 2006, 45, 7544; B. J. Wiley, Y. Chen, J. M. McLellan, Y. Xiong, Z-Y. Li, D. Ginger, and Y. Xia, Nanoletters, 2007, 4, 1032; Y. Xiong, H. Cai, B. J. Wiley, J. Wang, M. J. Kim and Y. Xia, J. Am. Chem. Soc., 2007, 129, 3665; J. Fang, H. You, P. Kong, Y. Yi., X. Song, and B. Ding, Cryst. Growth and Design, 2007, 7, 864; A. Narayan, L. Landstrom and M. Boman, Appl. Surf. Sci., 2003, 137, 208; H. Song, R. M. Rioux, J. D. Hoefelmeyer, R. Komor, K. Niesz, M. Grass, P. Yang and G. A. Somorjai, J. Am. Chem. Soc., 2006, 128, 3027; C. Wang, D. H. Chen and T. C. Huang, Colloids Surf., A 2001, 189, 145. Examples of mechanical processes for producing nanoparticles include mechanical attrition (e.g., ball milling), crushing of sponge iron powder, and thermal quenching. Examples of chemical processes for producing nanoparticles include precipitation techniques, sol-gel processes, and inverse-micelle methods. Other chemical or chemically-related processes include gas condensation methods, evaporation techniques, gas anti-solvent recrystallization techniques, precipitation with a compressed fluid anti-solvent, and generation of particles from gas saturated solutions. The commercial significance of nanoparticles is limited by the nanoparticle synthesis process, which is generally energy intensive or requires toxic chemical solvents and is costly.

SUMMARY

The present invention relates to methods of making and using compositions of metal nanoparticles formed by green chemistry synthetic techniques, as well as the compositions themselves. For example, the present invention relates to metal nanoparticles formed with solutions of plant extracts and use of these metal nanoparticles in removing contaminants from soil and groundwater.

As used herein, trademark terms represent their respective formulation. Citrus Burst is a registered trademark term representing Citrus Burst formulation, EZ-Mulse is a trademark term representing EZ-Mulse formulation, VeruSOL is a registered trademark representing VeruSOL formulations. ALFOTERRA is a registered trademark representing ALFOTERRA formulations. ETHOX is a trademark representing ETHOX formulations. ETHAL is a trademark representing ETHAL formulations. ETHSORBOX is a trademark representing ETHSORBOX formulations. TERGITOL is a registered trademark representing TERGITOL formulations. DOWFAX is a registered trademark representing DOWFAX formulations.

In one aspect, the invention provides methods for making metal nanoparticles. In some embodiments, the methods comprise providing a dissolved metal ion, for example a metal ion in solution; providing a plant extract that comprises a reducing agent, a polyphenol, caffeine, and/or a natural solvent or surfactant; and combining the dissolved metal ion and the plant extract to produce one or more metal nanoparticles. For example, the dissolved metal ion can be provided by dissolving a metal salt in water. For example, the dissolved metal ion can be provided by dissolving a metal chelate in water. For example, the providing of the dissolved metal ion, the providing of a plant extract, and/or the combining of the dissolved metal ion and the plant extract to produce one or more metal nanoparticles can be conducted at about room temperature and/or at about room pressure. For example, room temperature can be a temperature that is in a range that can be tolerated by humans. For example, a temperature greater than or equal to about that of the freezing point of water and less than or equal to about the maximum temperature that naturally occurs on the earth's surface can be considered to be room temperature. For example, a temperature of greater than or equal to about 0° C., 4° C., 10° C., 15° C., 20° C., 25° C., 30° C., 35° C., 40° C., 45° C., and 50° C. and less than or equal to about 4° C., 10° C., 15° C., 20° C., 25° C., 30° C., 35° C., 40° C., 45° C., 50° C., and 60° C. can be considered to be room temperature. For example, room pressure can be pressure that is greater than or equal to about the minimum that occurs on the earth's surface (including mountaintops) and less that or equal to about the maximum that occurs on the earth's surface (including below sea level depressions and the bottom of mines). For example, a pressure of greater than or equal to about 20 kPa, 30 kPa, 50 kPa, 70 kPa, 90 kPa, 95 kPa, 100 kPa, 101 kPa, 107 kPa, 120 kPa, 140 kPa, and less than or equal to about 30 kPa, 50 kPa, 70 kPa, 90 kPa, 95 kPa, 100 kPa, 101 kPa, 107 kPa, 120 kPa, 140 kPa, and 160 kPa can be considered to be room temperature. The metal nanoparticles can be present in a concentration effective for use in an application including, for example, soil and groundwater remediation, water and wastewater treatment, air pollution treatment, medical diagnostic testing, medical materials, targeted drug delivery, catalysis of chemical synthesis reactions, pollution control or monitoring devices, fuel cells, or electronics. The dissolved metal ion can be present in an amount of, for example, at least about 0.01 mM, 0.1 mM, 300 mM or more. The metal nanoparticles can be formed at a rate of, for example, at least about 0.002 mol/L/min, at least about 0.01 mol/L/min, at least about 0.1 mol/L/min, at least about 0.5 mol/L/min or more, where "mol" refers to the moles of metal atoms that form the metal nanoparticles. The metal nanoparticles can have a mean diameter of between about 5 and about 500 nm. A mass fraction of the metal nanoparticles that have a diameter between about 50 nm and about 100 nm can be about 90 percent. The metal nanoparticles can have a mean diameter between about 20 and about 250 nm, or between about 50 and about 100 nm. "Mean diameter" can refer to, for example, the weight averaged mean diameter. That is, the mean diameter for a group of particles can be determined as the sum of the diameter of each individual particle weighted by its mass divided by the total mass of the particles. The reducing agent, polyphenol, caffeine, and/or natural solvent or surfactant can be one or more of, for example, tea extract, green tea extract, coffee extract, lemon balm extract, polyphenolic flavonoid, flavonoid, flavonol, flavone, flavanone, isoflavone, flavans, flavanol, anthocyanins, proanthocyanins, carotenoids, catechins, quercetin, and rutin. The natural solvent or surfactant can be, for example, one or more of VeruSOL™-3, Citrus Burst 1 (CB-1), Citrus Burst 2 (CB-2), Citrus Burst 3 (CB-3), and EZ-Mulse.

In some embodiments, the metal nanoparticles can comprise two or more metals. Methods of making such metal nanoparticles can comprise, for example, providing a dissolved metal ion; providing a plant extract that comprises a reducing agent, a polyphenol, caffeine, and/or a natural solvent or surfactant; providing a second dissolved metal ion, and combining the dissolved metal ion, the second dissolved metal ion and the plant extract to produce one or more metal nanoparticles each comprising a first and a second metal. The first and second dissolved metal ions can be added to the vessel more or less simultaneously, leading to nanoparticles in which the first and second metals are interspersed throughout the metal nanoparticles. Or the first dissolved metal ion can be added to a vessel first and adding the second dissolved metal ion after a period of time, for example, of at least about 15 or 30 seconds, for example, a period of time in the range of from about 30 seconds to about 60 seconds, which generally leads to nanoparticles in which the first metal is present primarily in the core of the metal nanoparticle and the second metal is present primarily in an outer layer around the core of the metal nanoparticle. The first metal can be, for example, iron and the second metal can be, for example, palladium. Alternatively, palladium can be the first metal and iron can be the second metal.

In some embodiments, the dissolved metal ion can be, for example, a dissolved iron ion or a dissolved manganese ion. The dissolved metal ion can be provided by a species including, for example, a metal salt, an iron salt, ferric chloride ($FeCl_3$), ferrous sulfate ($FeSO_4$), ferric nitrate ($Fe(NO_3)_3$), a manganese salt, manganese chloride ($MnCl_2$), manganese sulfate ($MnSO_4$), a silver salt, silver nitrate ($AgNO_3$), a palladium salt, palladium chloride ($PdCl_2$), a metal chelate, Fe(III)-EDTA, Fe(III)-citric acid, Fe(III)-EDDS, Fe(II)-EDTA, Fe(II)-citric acid, Fe(II)-EDDS, and combinations thereof. The plant extract can be provided by a source including, for example, tea, coffee, parsley, sorghum, marjoram, lemon balm, and combinations thereof. Herein, unless otherwise stated, a source of plant extract is to be understood as referring to the product or material mentioned as well as sources, plant components associated with sources, and processing intermediaries from which the product or material is derived, byproducts and waste resulting from manufacture of the product or material, and waste following use or consumption of the product or material. For example, coffee as a source of plant extract can be construed to include a brewed coffee beverage as well as coffee fruit, coffee berries, coffee drupes, coffee seeds, coffee beans, parts of the coffee plant, fermented coffee beans, coffee bean processing wastewater, roasted coffee beans, coffee bean chaff from roasting, ground coffee beans prior to brewing, coffee powder, dehydrated instant coffee powder, coffee grounds following brewing, and coffee concentrate. For example, tea as a source of plant extract can be construed to include a brewed tea beverage as well as tea plant buds, leaves, flushes, and other parts of a tea plant, fermented tea leaves, oxidized tea leaves, wilted tea leaves, post-fermented tea leaves, composted tea leaves, tea bricks, tea powder, instant tea powder, and tea leaf waste following brewing. In some embodiments, providing a plant extract involves combining a plant or plant portion with the dissolved metal ion in a vessel, causing, e.g., a reducing agent, polyphenol, or caffeine to be released into the vessel to produce one or more metal nanoparticles.

In some embodiments, the methods also comprise providing an aqueous solution of carboxy methyl cellulose, and combining the aqueous solution of carboxy methyl cellulose with the dissolved metal ion and the plant extract to form metal nanoparticles coated with carboxy methyl cellulose. The mixture of carboxy methyl cellulose, dissolved metal ion, and plant extract can be heated, for example to a temperature of about 100° C., using a method such as exposing the mixture to microwaves. In some embodiments, the dissolved metal ion is provided in situ, for example by adding a chelating agent to a soil and/or water to be treated.

In some embodiments, the methods comprise providing a dissolved metal ion; providing a plant derivative that comprises a reducing agent, a polyphenol, caffeine, and/or a natural solvent or surfactant; and combining the dissolved metal ion and the plant derivative to produce one or more metal nanoparticles. The plant derivative can be, for example, a plant extract or carboxy methyl cellulose.

In another aspect, the invention provides compositions. The compositions can comprise, for example, a metal nanoparticle prepared according to any of the methods disclosed herein. The metal nanoparticle can be, for example, coated with a substance derived from the plant extract used in the preparation of the metal nanoparticle—i.e., the plant extract serves as a capping agent or dispersing agent for the nanoparticles. The composition can also comprise a natural solvent or surfactant, such as, for example, VeruSOL™-3, Citrus Burst 1 (CB-1), Citrus Burst 2 (CB-2), Citrus Burst 3 (CB-3), EZ-Mulse, or combinations thereof. The composition can also comprise a chelating agent, such as, for example, EDTA, EDDS, citric acid, or combinations thereof. The compositions can also comprise an oxidant, such as, for example, peroxide, calcium peroxide, hydrogen peroxide, air, oxygen, ozone, persulfate, sodium persulfate, percarbonate, permanganate, or combinations thereof. The compositions can also comprise a carboxymethylcellulose coating or a hydrophobic coating on the surface of the metal nanoparticle. The metal nanoparticle can be, for example, a zero valent metal nanoparticle, a zero valent iron nanoparticle, a zero valent manganese nanoparticle, a silver nanoparticle, a palladium nanoparticle, a gold nanoparticle, a platinum nanoparticle, an iron nanoparticle, a manganese nanoparticle, a copper nanoparticle, an indium nanoparticle, or combinations thereof, and thus can also comprise at least two different metals, for example iron and palladium.

In still another aspect, the invention provides methods for reducing the concentration of one or more contaminants in a medium. The methods can comprise, for example, causing a metal nanoparticle prepared according to the methods described herein to be present in the medium; and allowing the metal nanoparticle to reduce or stimulate biological reduction of the contaminant to reduce its concentration. For example, a contaminant can be a chemical of concern (COC), such as a non-aqueous phase liquid (NAPL), dense non-aqueous phase liquid (DNAPL), and/or light non-aqueous phase liquid (LNAPL). The metal nanoparticle can be previously prepared and thereafter introduced into the medium, or it can be formed in situ, for example by introducing a reducing agent, a polyphenol, caffeine, and/or a natural solvent or surfactant into the medium; and allowing the reducing agent, polyphenol, caffeine, and/or a natural solvent or surfactant to react with the dissolved metal ions in the medium to form metal nanoparticles. The methods can also comprise administering a chelating agent, such as, for example, EDTA, citric acid, EDDS, or combinations thereof, to the medium. The contaminant can be, for example, a perchlorate, nitrate, heavy metals or heavy metal compounds, $Hg^{2+}$, $Ni^{2+}$, $Ag^+$, $Cd^{2+}$, $Cr_2O_7^{2-}$, $AsO_4^{3-}$, compounds comprising any of these, and combinations. The methods can also comprise introducing a natural solvent or surfactant, such as, for example, VeruSOL™-3, Citrus Burst 1 (CB-1), Citrus Burst 2 (CB-2), Citrus Burst 3 (CB-3), EZ-Mulse or combinations thereof, into the medium. The metal nanoparticle and the natural solvent and/or surfactant can be introduced into the medium by injection into a subsurface. The methods can also comprise introducing an oxidant into the medium. The medium can be, for example, a biologically contaminated material, soil, groundwater, water, wastewater, air, or combinations thereof.

In yet another aspect, the invention provides methods for determining an optimal amount of dissolved metal ion to add to a plant extract solution in synthesizing metal nanoparticles. The method can comprise providing several aqueous solutions of a first set having different concentrations of a plant extract; adding DPPH to each aqueous solution of the first set; determining DPPH absorbance of each aqueous solution of the first set; adding a dissolved metal ion to several aqueous solutions of a second set having different concentrations of the plant extract to form metal nanoparticles; adding DPPH to each aqueous solution of the second set comprising metal nanoparticles and remaining plant extract; determining DPPH absorbance of each aqueous solution of the second set; comparing the DPPH absorbance of the aqueous solutions of the first set and of the aqueous solutions of the second set to determine the net consumption of DPPH; and determining the optimal ratio of dissolved metal ions to plant extract.

In still another aspect, the invention provides devices comprising a metal nanoparticle prepared according to any of the methods disclosed herein. The device can be, for example, a medical diagnostic test, a medical material such as a bandage, a targeted drug delivery vehicle, a chemical synthesis system, a pollution control or monitoring device, a fuel cell, and an electronic device.

DESCRIPTION OF THE DRAWINGS

FIG. 7 presents a graph of the spectra of absorbance as a function of wavelength for a solution of tea extract with silver nitrate at various times. (a) Pure tea extract. (b) After 1 min. (c) After 20 min. (d) After 40 min. (e) After 60 min. (f) After 2 hrs.

DETAILED DESCRIPTION

Figure 1:
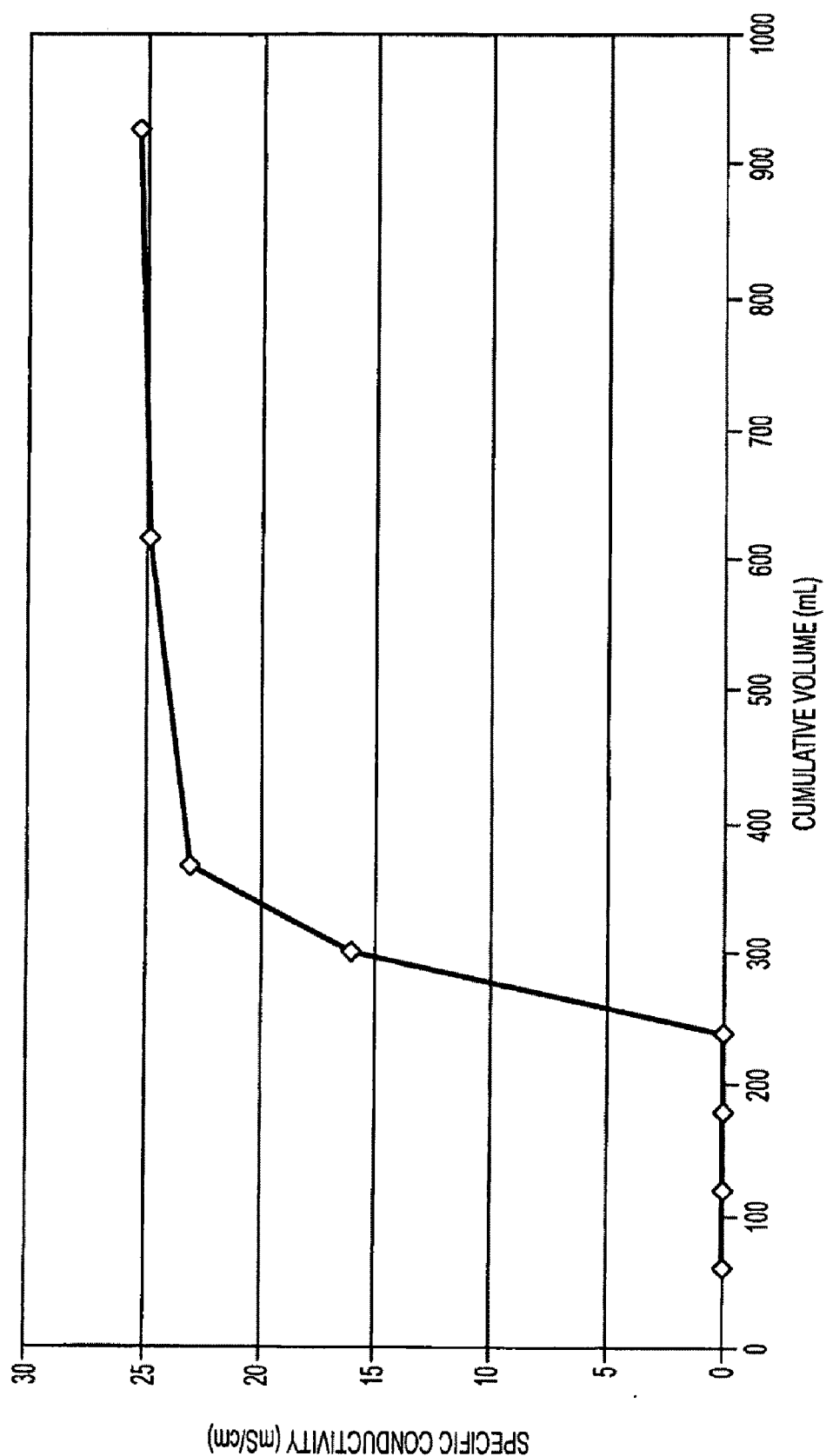
FIG. 1 presents a graph of specific conductivity as a function of cumulative effluent volume in Column 1—Lemon Balm Extract with $Fe(NO_3)_3$.

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without parting from the spirit and scope of the invention. All references cited herein are incorporated by reference as if each had been individually incorporated. For example, U.S. application Ser. No. 12/068,653 and U.S. Prov. Appl. No. 61/071,785 are hereby incorporated by reference.

"Introduce" means to cause to be present in a location. A material or item can be introduced into a location even if the material or item is released somewhere else and must travel some distance in order to reach the location. For example, if a substance is released at location A, and the substance will migrate over time to location B, the substance has been "introduced" into location B when it is released at location A. An item can be introduced in any manner appropriate under the circumstances for the substance to be introduced into the location.

"Effective" means sufficient to accomplish a purpose, and "effective amount" or "effective concentration" means an amount or concentration sufficient to accomplish a purpose. The purpose can be accomplished by effecting a change, for example by decreasing the concentration of a contaminant in a location to be remediated. A purpose can also be accomplished where no change takes place, for example if a change would have taken place otherwise.

"Plant derivative" encompasses any portion of a plant that can be used according to the purposes of the present invention, for example to bring about the formation of metal nanoparticles from dissolved metal ions. "Plant derivative" encompasses, for example, "plant extract." As used herein, a "plant extract" encompasses, for example, any chemical or combination of chemicals found in a plant or that can be prepared using a chemical or chemicals found in a plant, whether by preparing derivatives of the compounds found in the plant via chemical reaction. As used herein, "plant derivative" also encompasses carboxy methyl cellulose.

As used herein, "nano-sized" and "nano-scale" mean particles less than about 1 micron in diameter, though a different meaning may be apparent from the context. As used herein, "micro-sized" and "micro-scale" mean particles from about 1 to about 1000 microns in diameter. As used herein, "macro-sized" and "macro-scale" mean particles greater than about 1000 microns in diameter. A "nanoparticle" is a particle whose diameter falls within the nano-scale range. A nanoparticle can be zero-valent, or it can carry a charge.

As used herein, "medium" encompasses any location or item in which contaminants can be found. For example, "medium" includes, without limitation, a biologically contaminated material, soil, groundwater, water, wastewater, air, and combinations thereof.

"Contaminants" encompasses any substance present in a location that, by its presence, diminishes the usefulness of the location for productive activity or natural resources, or would diminish such usefulness if present in greater amounts or if left in the location for a length of time. The location may be subsurface, on land, in or under the sea or in the air. As used herein, "contaminated soil" encompasses any soil that contains at least one contaminant according to the present invention. "Contaminant" thus can encompass trace amounts or quantities of such a substance. Examples of productive activities include, without limitation, recreation; residential use; industrial use; habitation by animal, plant or other life form, including humans; and similar such activities. Examples of natural resources are aquifers, wetlands, sediments, soils, plant life, animal life, ambient air quality.

A "vessel" is any container or location that is capable of supporting the reactions and preparative methods disclosed herein. For example, a vessel can be a beaker, column, pot, mixing apparatus, vat, or any other laboratory or manufacturing apparatus that can hold gases, liquids and/or solids. As used herein, a "vessel" can also be a location in need of remediation.

As used herein, "plant portion" means any part of a plant that can be used as a source of reactants in the nanoparticle preparation methods disclosed herein. For example, sorghum is very rich in phenolics, such that it is generally not necessary to perform an extraction before using sorghum phenolics in the preparation of metal nanoparticles. Instead, it is possible to prepare nanoparticles simply by placing a sorghum plant, or portion thereof, into the reaction vessel. Examples of "plant portions" include, for example, the husk, stem, root, leaves, flower, fruit, seed, or any other part of the plant.

Conventional methods for manufacturing metal nanoparticles, such as nZVI or nZVMn, include milling and solution methods. Many conventional methods, for example the high energy milling method, involve the use of toxic solvents and industrial surfactants to prevent oxidation of iron, for example during the crushing operation. Solution methods use toxic inorganic chemicals, including strong chemical reducing agents such as sodium borohydride, dispersing agents, and stabilization agents. Sodium borohydride, a commonly used reducing agent use to make zero valent iron nanoparticles, is a highly hazardous material. After making zero valent iron nanoparticles using sodium borohydride, the sodium borohydride must be washed from the zero valent iron nanoparticles, resulting in the generation of liquid hazardous wastes.

By contrast, the invention encompasses green methods of making metal nanoparticles, such as zero valent metal nanoparticles, including green chemistry methods. Green chemistry is the design, development, and implementation of chemical products and processes for the purpose of reducing or eliminating the use and generation of substances hazardous to human health and the environment. See, P. T. Anastas and J. C. Warner, Green Chemistry: Theory and Practice; Oxford University Press, Inc.: New York, 1998. To address mounting environmental concerns regarding conventional approaches, green chemistry methods involve the use of environmentally benign solvents, biodegradable polymers, and non-toxic chemicals.

In an embodiment of the invention, metal nanoparticles are synthesized by reducing the corresponding metal ion salt solutions. Green chemistry can be employed, for example, in the (i) choice of solvent, (ii) the choice of reducing agent, and (iii) the choice of capping agent (or dispersing agent) used. Multifunctional environmentally-friendly materials can be used in synthesizing metal nanoparticles. For example, tea and/or coffee extract, which can contain polyphenols, can function both as a reducing agent and a capping agent in producing, e.g., silver (Ag), palladium (Pd), gold (Au) and iron (Fe) nanoparticles. Caffeine and/or polyphenols can form complexes with metal ions in solution and reduce them to the corresponding metals. Nanoparticles, e.g. of noble metals, transition metals, manganese (Mn), copper (Cu), gold (Au), platinum (Pt), and indium (In) can be produced with this method. The nanoparticles can be of zero valent metal. Tea and coffee extracts have high water solubility and low toxicity and are biodegradable.

In an embodiment of the invention, bulk quantities of nanoparticles, or nanocrystals, of metals such as transition metals, noble metals, silver (Ag), gold (Au), platinum (Pt), palladium (Pd), and iron (Fe), manganese (Mn), copper (Cu), and indium (In) are produced in a single pot method using coffee and/or tea extract, e.g., green tea extract, at room temperature. The nanoparticles can be of zero valent metal. The nanoparticles can be produced without a separate surfactant, capping agent, or template. The nanoparticles obtained can have a size range of from about 5 to about 500 nm, for example about 20 to about 60 nm and can be crystallized in face centered cubic symmetry. Size can be understood as diameter of a nanoparticle. For example, diameter can be the volume diameter, that is $(6V/\pi)^{1/3}$, where V is the volume of the nanoparticle. Plant extracts containing high concentration of reducing agents, including polyphenolic compounds can be used to synthesize nanometal particles in addition to those from tea and coffee can be used. For example, extracts of parsley, sorghum, marjoram, aronia, crowberry, spinach, potato, beets, spruce needles, willowherb, rosemary, meadowsweet and lemon balm can be used to produce nanometals at room temperatures and pressures, without the use of toxic or hazardous chemicals or the production of wastes containing toxic or hazardous chemicals. Sources of compounds useful for producing metal nanoparticles can include, for example, berries, fruits, vegetables, herbs, medical plants, cereals, and tree materials. Waste products, process streams, or by-products from plant processing containing high concentrations of plant polyphenols can be used. The materials can include fruit juice pulp, fruit juice manufacturing wastewater, fruit juice manufacturing waste, food processing waste or byproduct materials, wine and beer manufacture and forest product processing waste streams. Compounds useful for producing metal nanoparticles can include polyphenols, antioxidants, radical scavengers, polyphenolic flavonoids, flavinoid phenolic compounds, flavinoids, flavonoids, flavonols, flavones, flavanones, isoflavones, flavans, flavanols, anthocyanins, proanthocyanins, carotenoids, catechins, quercetins, rutins, catechins, epicatechins and their esters from ferulic and gallic acids, e.g. epigallocatechin. Antioxidant compounds that can be useful for metal nanoparticle synthesis include natural antioxidants such as flavonoids, e.g., quercetin, glabridin, red clover, and Isoflavin Beta (a mixture of isoflavones available from Campinas of Sao Paulo, Brazil). Other examples of natural antioxidants that can be used as antioxidants for synthesizing metal nanoparticles include beta carotene, ascorbic acid (vitamin C), vitamin B1, vitamin B2, tocopherol (vitamin E) and their isomers and derivatives. Non-naturally occurring antioxidants, such as beta hydroxy toluene (BHT) and beta hydroxy anisole (BHA), can also be used to synthesize metal nanoparticles. Plant oil based surfactants can be used to synthesize metal nanoparticles, such as polyethylene glycol (PEG) modified plant oils. Plant oils such as castor oil, corn oil, palm oil, coconut oil, canola oil, cottonseed oil, almond oil, olive oil, rapeseed oil, peanut oil, safflower oil, sesame oil, sunflower oil, acai oil, flax seed oil, hemp oil and algae-derived oil.

Plant extracts that are U.S. FDA Generally Recognized as Safe (GRAS) can be used. The synthesis of metal nanoparticles, such as zero valent iron nanoparticles, with natural resources, can avoid generating hazardous waste and thus can reduce environmental risk. Methods for making metal nanoparticles with plant-based extracts can be easier and safer than conventional methods of making metal nanoparticles.

The green synthesized nanoparticles and compositions including these nanoparticles according to embodiments of the invention can be used, for example, to remediate contaminated sites by inducing chemical reduction mechanisms, by stimulating biological reduction mechanisms, or by a combination of chemical and biological reduction mechanisms. For example, the green synthesized nanoparticles, including zero valent nanometal particles and bimetallic particles, can serve as reducing agents in processes to detoxify inorganic species, such as metals, heavy metals, arsenical compounds, and chromium compounds, e.g., $Hg^{2+}$, $Ni^{2+}$, $Ag^+$, $Cd^{2+}$, $Cr_2O_7^{2-}$, and $AsO_4^{3-}$, by in-place manufacture and treatment. The green synthesized nanoparticles, e.g., zero valent nanometal particles, can be used as reducing agents to destroy oxidizing agent compounds such as perchlorates ($ClO_4^-$) and nitrates ($NO_3^-$). The metal nanoparticles can be administered with, for example, plant derived reducing agents, in order to increase the reducing effect of the nanoparticles on the species to be remediated.

The nanoparticles and compositions including them can be used for catalysis, for example, to activate free radical oxidation chemistries for remediation, water treatment, and wastewater treatment. Green synthesized nanoparticles, such as nZVI or nZVMn particles, and compositions including them can be applied to remediate sites contaminated with, for example, non-aqueous phase liquids (NAPLs), dense non-aqueous phase liquids (DNAPLs), and/or light non-aqueous phase liquids (LNAPLs). The green synthesized nanoparticles can be applied together with VeruTEK's VeruSOL™ green co-solvents and surfactants and/or oxidants. For example, the metal nanoparticles can be applied with oxidants such as peroxide (e.g., calcium peroxide, hydrogen peroxide), air, oxygen, ozone, persulfate (e.g., sodium persulfate), percarbonate, and permanganate. The green synthesized nanoparticles can be used, for example, to remediate contaminated water, wastewater, building materials and equipment, and subsurfaces. nZVI can be produced with green tea and ferric chloride in the presence or absence of VeruSOL™-3. Similarly, nZVI can be produced with green tea and chelated iron in the presence or absence of VeruSOL™-3.

The nanoparticles according to the invention and compositions including them can be applied in conjunction with, for example, catalyzed oxidant systems or reduction technologies to destroy DNAPL or LNAPL compounds. Thus, nanoparticles according to the invention and compositions including them can be used, for example, to treat CERCLA Sites, NPDES permitted discharges, and RCRA Sites. Furthermore, systems regulated under the Safe Drinking Water Act, Clean Water Act, FIFRA, and TSCA can be treated using nanoparticles according to the invention and compositions including them. For example, agencies of the U.S. Government, such as the Department of Defense, are responsible for sites that can benefit from treatment with materials according to the invention, such as nanoparticles and compositions including them. Use of the materials according to the invention to treat water, wastewater, and contaminated soils can reduce risks to the public and environment.

For example, green synthesized silver or composite silver nanometals according to the invention can be used to disinfect materials and disinfect biological agents. Such silver or composite silver nanometals can be, for example, incorporated into medical materials to provide disinfecting properties. Metal nanoparticles can have additional medical applications.

Nano-scale zero valent iron (nZVI) is of increasing interest for use in a variety of environmental remediation, water and waste water treatment applications. Initial ZVI research used microscale (~150 μm) particles for environmental applications in reactive subsurface permeable barriers (PRBs) for chemical reduction of chlorinated solvents. In comparison to larger sized ZVI particles, nZVI has a greater reactivity due to a greater surface area to volume ratio. Recent environmental applications include removal of nitrite by ultrasound dispersed nZVI, dechlorination of dibenzo-P-dioxins, reduction of chlorinated ethanes, adsorption of humic acid and its effect on arsenic removal and hexavalent chromium removal. However, field applications of ZVI have been limited to granular particles used in permeable reactive barriers (PRB). While PRBs are found to be effective for the remediation of shallow aquifers, more cost-effective in situ technologies are needed for rapid and complete destruction of chlorinated contaminants in deep aquifers and in source zones. However, for this technology to be feasible, the nZVI particles must be small enough to be mobile in the targeted zones, and the transport behaviors (or size) of the nanoparticles in various soils must be controllable.

A technique for preparing nZVI particles of controlled size and transport properties was previously unavailable, and a method is lacking to extend the reactive lifetime of these relatively short-lived nanoparticles. Their extreme reactivity is addressed in this investigation, as the relative stability of such nZVI particles has been enhanced using tea polyphenols which cap the ensuing nanoparticles. Table 1 presents examples of green tea manufacture of nanoscale zero valent iron particles, for example with cosolvent-surfactant mixtures, ferric chloride and chelated iron.

TABLE 1

Green Tea Manufacture of Nanoscale Zero Valent Iron Particles with Cosolvent-Surfactant Mixtures, Ferric Chloride and Chelated Iron

| | Testing Conditions | | Chemical doses | | | |
|---|---|---|---|---|---|---|
| Sample ID | Total Volume ml | VS-3 g/L | Chumnee T.E. (20 g/L) mL | FeCl$_3$ (0.1M) mL | Fe-EDTA 0.1M as Fe | Fe-Citric Acid 0.1M as Fe |
| Tea NZVI-T1 | 480 | 2 | 160 | 320 | — | — |
| Tea NZVI-T2 | 480 | 5 | 160 | 320 | — | — |
| Tea NZVI-T3 | 480 | 10 | 160 | 320 | — | — |
| Tea NZVI-T4 | 480 | 0 | 160 | 320 | — | — |
| Tea NZVI-T5 | 480 | 0 | 160 | — | 320 | — |
| Tea NZVI-T6 | 480 | 5 | 160 | — | 320 | — |
| Tea NZVI-T7 | 480 | 0 | 160 | — | — | 320 |
| Tea NZVI-T8 | 480 | 5 | 160 | — | — | 320 |

Gold nanostructures have been the focus of intense research owing to their fascinating optical, electronic, and chemical properties and promising applications in nanoelectronics, biomedicine, sensing, and catalysis. A variety of methods have been developed to fabricate gold nanoparticles using NaBH$_4$, microwave, simple galvanic replacement reaction (transmetalation reaction), polymeric strands of oleylamine-AuCl complexes, poly(vinyl pyrrolidone) (PVP) in aqueous solutions, reducing agent (ascorbic acid), seed-mediated synthesis and ionic polymers. Wet methods often require the use of an aggressive chemical reducing agent such as sodium borohydride, hydroxylamine, and/or a capping agent and may additionally involve an organic solvent such as toluene or chloroform. Although these methods may successfully produce pure, well-defined metal nanoparticles, the cost of production is relatively high both materially and environmentally. Consequently, more cost-effective and environmentally benign alternatives to these existing methods should be developed. The choice of an environmentally compatible solvent system, an eco-friendly reducing agent, and a non-hazardous capping agent for the stabilization of the nanoparticles are three main criteria for a totally "green" nanoparticle synthesis. Recently, there has been an increased emphasis on the topics of "green" chemistry using environmentally benign and renewable materials as the respective reducing and protecting agents. The use of environmentally benign and renewable materials in the production of metal nanoparticles is important for pharmaceutical and biomedical applications.

In addition to their uses in remediation applications, metal nanoparticles prepared according to embodiments of the invention can be useful in a wide variety of fields. For example, gold nanoparticle applications include the following: due to the low oxidation metal potential associated with gold nanoparticles, gold nanoparticles can be used in medical diagnostic tests, such as, labeling, immunostain, x-ray contrasting, and phagokinetic tracking studies; targeted drug delivery techniques, for example conjugated with ligands or proteins, and also those involving gene guns, uptake by cells, and as a heat source to kill selected cells such as cancer using targeting cell hypothermia, optically triggered opening of DNA bonds. Gold nanoparticles with phytochemical coatings have shown significant affinity toward prostate (PC-3) and breast (MCF-7) cancer cells.

Gold nanoparticles are valuable catalysts in chemical synthesis reactions and for pollution control devices, such as those involving (1) colorimetric detection methods for cysteine based oligonucleotide-functionalized gold nanoparticle probes that contain strategically placed thymidine-thymidine (T-T) mismatches to complex Hg$^{2+}$ ions; and (2) colorimetric metal sensors based on DNAzyme-directed assembly of gold nanoparticles and their use for sensitive and selective detection and quantification of metal ions, particularly lead in leaded paint. Fuel cell applications include use of gold nanoparticles on carbon supports. Electronic devices also use gold nanoparticles for superior conductance. Other uses for metal nanoparticles include cancer cell and DNA hypothermic inactivation, biological agent inactivation, full cells, and toxicity reduction.

In some embodiments, the reducing agent used in preparing the metal nanoparticles can be, without limitation, a phenolic compound, a phenolic plant extract, a plant extract-based surfactant, a natural solvent or surfactant, a plant oil based surfactant, a flavonoid, or combinations thereof. In some embodiments, the reducing agent is extracted using a plant-based solvent, such as d-limonene and citrus terpenes.

In some embodiments, the plant extract and/or reducing agent is further concentrated for example prior to use in the preparation of metal nanoparticles. The concentration process can produce a higher concentration of plant polyphenols, enabling a high concentration of dissolved metal to be used to make higher concentrations of nanometal particles. The plant extract and/or reducing agent can be concentrated using any method known in the art, for example using reverse osmosis and/or filter presses or using extraction with supercritical carbon dioxide. Similarly, the green synthesized nanometal particles can be further concentrated, for example after they are prepared, to produce higher concentrations of nanometal particles. Concentration methods include, but are not limited to, centrifugation, filtrations, magnetic separation, electroosmosis, and electrokinetic migration.

Free radicals initiated from catalysis or activation of hydrogen peroxide or sodium persulfate can be readily experimentally determined using probe compounds such as bromothymol blue. Bromothymol blue has an advantage over methylene blue as a probe compound as it is not directly oxidized (in the absence of free radicals) by sodium persulfate. Methylene blue is directly oxidized by sodium persulfate, therefore it cannot be used to experimentally determine free radical generation and subsequent destruction by sodium persulfate. The advantage of bromothymol blue is that it is not directly oxidized by either hydrogen peroxide or sodium persulfate.

In the process of experimentally optimizing the initiation and generation of free radicals using various catalysis or activators, bromothymol blue is superior to many other probe compounds in that various catalysts and activators can be rapidly evaluated. For example, Fe-chelated metal catalysts such as Fe-TAML, Fe-EDTA, Fe-EDDS, Fe-EDDHA, Fe- EDDHMA, Fe-EDDCHA, Fe-EDDHSA, Fe-NTA, and Fe-DTPA can be used as catalysts for peroxide and persulfate. Other transition metal catalysts can also be used, such as Mn, Co, Ni, Cu, and Zn. Additionally, nanoparticle catalysts, such as nanoiron, bimetallic nanoiron species such as Fe/Ni, Fe/Pd, Fe-oxides, Mn-oxides, silicates, alumina, and mixed transition metal oxides, can be used.

In many industrial applications, the faster the catalysis of peroxide and persulfate the better. However, the catalysis of peroxide and persulfate in subsurface remediation applications is best conducted at a controlled rate and in many cases as slow as possible, while still maintaining effective catalysis. Slowing the catalysis rates using plant extract and plant extract-based surfactants is effectively achieved and the desired rate obtained using bromothymol blue as a probe compound. Inclusion of plant extracts can reduce the rate of catalysis to, for example, 90%, 75%, 50%, 25%, 10%, 5%, 1% or less, compared to the rate without plant extract-containing catalysts. In terms of initial rate constants, the plant extract-controlled catalysts may decrease the initial rate constant to 0.2/min, 0.1/min, 0.05/min, 0.01/min, 0.005/min or otherwise as described for a particular application.

In some embodiments, the invention provides methods of using bromothymol blue as a probe compound. Bromothymol blue can be used, for example, to optimize the rate of peroxide or persulfate catalysis, for example using: a) bromothymol blue; b) a catalyst or mixture of catalysts, and optionally one or more of c) an oxidant stabilizer; d) a catalyst stabilizer; e) a soil sample; and/or f) a contaminant.

Examples of oxidant stabilizers include, without limitation, plant extracts, surfactants including, for example, plant-extract based surfactants, and/or plant extract solvents and cosolvents. Examples of catalyst stabilizers include, without limitation, plant extracts, surfactants including, for example, plant-extract based surfactants, chelates, poly(ethylene terephthalate), poly(amidoamine)-dendrime, polyethylene glycol and nanometal capping agents. In addition, the nanometal particle morphology can be optimized for the formation of free radicals in peroxide and/or persulfate catalysis.

A DPPH test can be used to measure the gross antioxidant capacity of plant extracts. DPPH (2,2-diphenyl-1-picrylhydrazyl) is a stable free radical in an aqueous solution. When a plant extract in solution is exposed to DPPH, the amount of DPPH decreases according to the antioxidant capacity of the plant extract. Generally, the more DPPH consumption, the greater concentration of plant extract components, e.g., polyphenols. The more plant extract components, e.g., polyphenols, are in solution, the greater their capacity to make nanometal particles. A DPPH test can be used to determine which plant extracts, and under what extraction conditions, yield the highest concentration of plant extract components, e.g., polyphenols for use in making nanometal particles.

The metal ions in solution can be within a range of, for example, from about 0.001 M to 1.0 M, or about 0.01 to 0.1 M, for example, up to or at least about 0.001 M, 0.005 M, 0.01 M, 0.05 M, 0.1 M, 0.2 M, 0.3 M, 0.4 M, 0.5 M, 0.6 M, 0.7 M, 0.8 M, 0.9 M, 1.0 M or more. The plant extract can have a concentration of, for example, from about 5 g/L to about 200 g/L, or about 10 g/L to about 100 g/L, or about 15 g/L to about 50 g/L, or about 40 g/L to about 100 g/L, or up to or at least about 0.1, 0.5, 1, 5, 10, 15, 20, 30, 40, 50, 60, 70, 80, 90, 100, 110, 120, 130, 140, 150, 160, 170, 180, 190, 200 g/L or more. The metal nanoparticles can be present in a concentration of from about 0.0006 to about 0.6 M, about 0.005 to about 0.1 M, or up to or at least about 0.0001, 0.0005, 0.001, 0.005, 0.01, 0.05, 0.1, 0.2, 0.3, 0.4, 0.5, 0.6 M, 1 M or more. The nanoparticles can have a diameter of, for example, from about 1 nm to about 1000 nm, from about 5 nm to about 100 nm, about 20 nm to about 85 nm, about 10 to about 50 nm, about 40 to about 100 nm, or up to or at least about 1 nm, 5 nm, 10 nm, 20 nm, 30 nm, 40 nm, 50 nm, 60 nm, 70 nm, 80 nm, 90 nm, 100 nm, 120 nm, 140 nm, 160 nm, 180 nm, 200 nm, 250 nm, 300 nm, 400 nm, 500 nm, 600 nm, 700 nm, 800 nm, 900 nm, 1000 nm or more.

The nanoparticles can have various shapes, including spheres, rods, prisms, hexagonal and mixed prisms, faceted shapes, wires, and other shapes.

In some embodiments, the amount of the plant extract used in the methods disclosed herein is sufficient to convert substantially all of the dissolved metal ion into nanoparticles. As used herein, "substantially all" encompasses, e.g., greater than 50%, or at least about 60%, 70%, 80%, 85%, 90%, 95% or more. Different meanings of "substantially all" may be apparent from the context.

Compositions comprising metal nanoparticles can comprise, for example, metal nanoparticles and plant extract or components of plant extracts in solution; metal nanoparticles having a component of a plant extract, including, without limitation, one or more phenolic compounds, on its surface; with a component of a plant extract, including, without limitation, one or more phenolic compounds, interspersed within the metal nanoparticle. In addition, compositions comprising metal nanoparticles can also be compositions from which liquid components have been removed, for example through filtration or another method, such that the particles are suitable for, e.g., packaging and shipping; a concentrated form of a composition comprising nanoparticles in a liquid; as well as other forms, as would be appreciated by a person of ordinary skill in the art.

The metal nanoparticles according to the invention can be characterized by having a high degree of dispersibility. For example, the metal nanoparticles can be much easier to handle because they are less susceptible to aggregation than are metal nanoparticles prepared using other methods. For example, if the metal nanoparticles prepared according to embodiments of the invention are isolated, e.g., through filtration, and then later redispersed in, for example, water, the particles will be less susceptible to aggregation upon redispersion than are nanoparticles prepared using other methods. Nanoparticles prepared according to other methods often require the application of a capping agent. Metal nanoparticles prepared according to embodiments of the invention generally do not require such an additional step.

As used herein, a "natural solvent or surfactant" is a substance or composition that can perform, e.g., one or both of two functions. First, a natural solvent or surfactant can be a substance or composition that can be used to reduce metal ions in solution in the preparation of metal nanoparticles, such as zero-valent metal nanoparticles. Second, a natural solvent or surfactant can serve to reduce the surface tension between two phases, for example between an aqueous phase and a non-aqueous phase that contains, e.g., a contaminant or other substance to be remediated.

Nanoparticles, for example isolated nanoparticles, may be incorporated into any device in which nanoparticles as disclosed herein may be used.

Example 1

Green Synthesis Manufacture of Nanoscale Zero Valent Iron (NZVI) or Manganese (NZVMn)

A method according to the invention uses plant extracts containing reducing agents that are capable of forming nanoparticles in the presence of dissolved iron species. The reactions are nearly instantaneous when plant extracts containing reducing agents are mixed with dissolved iron or manganese species. The plant reducing agents consist primarily of phenolic compounds and flavonoids. Examples of dissolved iron are ferric chloride ($FeCl_3$), ferrous sulfate ($FeSO_4$), and ferric nitrate ($Fe(NO_3)_3$). Examples of dissolved manganese species are manganese chloride ($MnCl_2$) and manganous sulfate ($MnSO_4$).

This green synthesis pathway using plant reducing agents can replace milled or solution-based manufacturing of these materials with a green synthesized process. This process eliminates toxic materials used in traditional production of zero valent metal nanoparticles (i.e., nZV metals). This process also eliminates toxic materials in waste streams that result from the traditional production of NZV metals.

Several sources of dissolved iron can be used to make nZVI using plant extracts. Ferrous sulfate, ferric chloride, and ferric nitrate can all be used to form nZVI using this green synthesis process. Whereas solutions of each of these salts is a clear liquid, and the plant extracts, e.g., tea extracts, are often light colored liquids, upon combining the plant extracts with these dissolved iron sources produces a black solution, evidencing the formation of iron nanoparticles.

Example 2

Synthesis of Metal Nanoparticles with Plant-Based Surfactant and/or Cosolvent

A methods according to the invention includes the green synthesis of metal nanoparticles in the presence of plant-based cosolvents and surfactants. The plant-based cosolvents and surfactants can serve to stabilize the metal nanoparticles and to minimize their agglomeration, and they can also serve as the reducing agent in the formation of metal nanoparticles. These plant-based cosolvents and surfactants are naturally derived and can be biodegradable.

Examples of plant-based cosolvents and surfactants that can be used are U.S. FDA Generally Recognized as Safe (GRAS) cosolvents and surfactants used by VeruTEK for increasing the solubility of LNAPLs and DNAPLs during oxidation and reduction reactions. Examples of plant-based cosolvents and surfactants that can be used include VeruSOL™, Citrus Burst 1 (CB-1), Citrus Burst 2 (CB-2), Citrus Burst 3 (CB-3), and EZ-Mulse, manufactured by Florida Chemical. Any of these can be considered a "natural solvent or surfactant" as used herein. Citrus Burst 3 includes a surfactant blend of ethoxylated monoethanolamides of coconut oil fatty acids and polyoxyethylene castor oil and d-limonene. Examples of plant-based cosolvents and surfactants that can be used include Alfoterra 53, biodegradable citrus-based solvents, degradable surfactants derived from natural oils and products, citrus terpene, CAS No. 94266-47-4, citrus peels extract (*citrus* spp.), citrus extract, Curacao peel extract (*Citrus aurantium* L.), EINECS No. 304-454-3, FEMA No. 2318, or FEMA No. 2344, terpenes, citrus-derived terpenes, limonene, d-limonene, castor oil, coca oil, coconut oil, soy oil, tallow oil, cotton seed oil, and a naturally occurring plant oil. Examples of plant-based cosolvents and surfactants that can be used include ALFOTERRA 123-8S, ALFOTERRA 145-8S, ALFOTERRA L167-7S, ETHOX HCO-5, ETHOX HCO-25, ETHOX CO-5, ETHOX CO-40, ETHOX ML-5, ETHAL LA-4, AG-6202, AG-6206, ETHOX CO-36, ETHOX CO-81, ETHOX CO-25, ETHOX TO-16, ETHSORBOX L-20, ETHOX MO-14, S-MAZ 80K, T-MAZ 60 K 60, TERGITOL L-64, DOWFAX 8390, ALFOTERRA L167-4S, ALFOTERRA L123-4S, and ALFOTERRA L145-4S. For example, a composition of surfactant and cosolvent can include at least one citrus terpene and at least one surfactant. Examples of plant-based cosolvents and surfactants that can be used include nonionic surfactants ethoxylated corn oil, ethoxylated palm oil, ethoxylated soybean oil, ethoxylated castor oil, ethyoxylated coconut oil, ethoxylated coconut fatty acid, ethoxylated coca oil, or amidified, ethoxylated coconut fatty acid. Many of these natural plant oils are US FDA GRAS. Examples of plant-based cosolvents and surfactants that can be used include ethoxylated castor oil, a polyoxyethylene (20) castor oil, CAS No. 61791-12-6, PEG (polyethylene glycol)-10 castor oil, PEG-20 castor oil, PEG-3 castor oil, PEG-40 castor oil, PEG-50 castor oil, PEG-60 castor oil, POE (polyoxyethylene) (10) castor oil, POE (20) castor oil; POE (20) castor oil (ether, ester); POE (3) castor oil, POE (40) castor oil, POE (50) castor oil, POE (60) castor oil, or polyoxyethylene (20) castor oil (ether, ester). Any of these can be considered a "natural solvent or surfactant" as used herein.

Other examples of plant-based cosolvents and surfactants that can be used include ethoxylated coconut fatty acid, CAS No. 39287-84-8, CAS No. 61791-29-5, CAS No. 68921-12-0, CAS No. 8051-46-5, CAS No. 8051-92-1, ethoxylated coconut fatty acid, polyethylene glycol ester of coconut fatty acid, ethoxylated coconut oil acid, polyethylene glycol monoester of coconut oil fatty acid, ethoxylated coco fatty acid, PEG-15 cocoate, PEG-5 cocoate, PEG-8 cocoate, polyethylene glycol (15) monococoate, polyethylene glycol (5) monococoate, polyethylene glycol 400 monococoate, polyethylene glycol monococonut ester, monococonate polyethylene glycol, monococonut oil fatty acid ester of polyethylene glycol, polyoxyethylene (15) monococoate, polyoxyethylene (5) monococoate, or polyoxyethylene (8) monococoate. An amidified, ethoxylated coconut fatty acid can include, for example, CAS No. 61791-08-0, ethoxylated reaction products of coco fatty acids with ethanolamine, PEG-11 cocamide, PEG-20 cocamide, PEG-3 cocamide, PEG-5 cocamide, PEG-6 cocamide, PEG-7 cocamide, polyethylene glycol (11) coconut amide, polyethylene glycol (3) coconut amide, polyethylene glycol (5) coconut amide, polyethylene glycol (7) coconut amide, polyethylene glycol 1000 coconut amide, polyethylene glycol 300 coconut amide, polyoxyethylene (11) coconut amide, polyoxyethylene (20) coconut amide, polyoxyethylene (3) coconut amide, polyoxyethylene (5) coconut amide, polyoxyethylene (6) coconut amide, or polyoxyethylene (7) coconut amide. Any of these can be considered a "natural solvent or surfactant" as used herein.

Other examples of plant-based cosolvents and surfactants that can be used include yucca extract, soapwood extract, and other natural plants that produce saponins, such as horse chestnuts (*Aesculus*), climbing ivy (*Hedera*), peas (*Pisum*), cowslip, (*Primula*), soapbark (*Quillaja*), soapwort (*Saponaria*), sugar beet (*Beta*) and balanites (*Balanites aegyptiaca*). Any of these can be considered a "natural solvent or surfactant" as used herein. Many surfactants derived from natural plant oils are known to exhibit excellent surfactant power, and are biodegradable and do not degrade into more toxic intermediary compounds.

In addition to stabilizing green synthesized metal nanoparticles, such as zero valent metal nanoparticles, e.g., nZVI particles, against agglomeration and serving as the reducing agent in the formation of metal nanoparticles, the plant-based cosolvents and surfactants can promote solubilization of chemicals of concern such as NAPLs, LNAPLs, and DNAPLs. For example, soil and/or water contaminated with NAPLs, LNAPLs, and/or DNAPLs can be treated with a remediation composition that include metal nanoparticles, e.g., zero valent metal nanoparticles, and a plant-based natural solvent or surfactant, in order to remediate the contaminated soil and/or water by destroying NAPLs, LNAPLs, and/or DNAPLs and decreasing their concentration.

Preparation of metal nanoparticles using green synthesis methods according to some embodiments of the invention has been demonstrated using a green cosolvent-surfactant system (VeruSOL™-3), a mixture of U.S. FDA Generally Recognized as Safe (GRAS) citrus and plant extract-based materials. This enables the preparation of metal nanoparticles with a food-grade cosolvent-surfactant system that can be used in the remediation of highly hydrophobic chemicals, non aqueous phase liquids (NAPLs) and hydrophobic chemical or biological agents or materials.

Trials were conducted in which nZVI particles were produced using ferric chloride and green tea extract with VeruSOL™-3 concentrations at 2 g/L, 5 g/L, and 10 g/L. A control was prepared using a mixture of ferric chloride and green tea extract alone. The presence of VeruSOL™-3 did not impact the formation of nZVI particles. The presence of VeruSOL™-3 in the ingredients of the nZVI particles enables the solubilization and desorption of hydrophobic organic compounds, such as halogenated solvents, PCBs, and pesticides, and subsequent reduction of these compounds with nZVI. A further advantage of this new green synthetic process for preparing nZVI particles is that it can be carried out using chelated iron. nZVI particles were made using Fe chelated with ethylene diamine tetraacetic acid (EDTA) and citric acid. Additionally, VeruSOL™-3 was also used in two of the experiments, demonstrating that the nZVI particles can be made in the presence of VeruSOL™-3 and chelated iron. Prior work by Feng and Hoag (2004) demonstrated that chelates can be used to strip iron from hydroxides of iron. Chelates can be used according to the invention to complex with iron naturally present in soils and groundwater, which can then be used to form nZVI particles.

Nanoscale zero valent iron particles were manufactured in the presence of a cosolvent-surfactant mixture, ferric chloride, and chelated iron species, including Fe(III)-EDTA and Fe(III)-citric acid. Transmission Electron Microscopy (TEM) images were made of nZVI particles made with various concentrations of a cosolvent-surfactant mixture (VeruSOL™-3) ranging in concentration from 0.0 g/L to 10 g/L (FIGS. 14 through 17). These figures demonstrate that as the cosolvent-surfactant concentration increased, the agglomeration of particles decreased, with the smallest amount of particle agglomeration occurring at the 10 g/L concentration. Using Fe(III)-EDTA and Fe(III)-citric acid as the dissolved iron source to make the nZVI particles led to a significant difference in the size of particles versus those made when VeruSOL™-3 cosolvent-surfactant was present in solution during nanoparticle preparation (FIGS. 18-21). One major advantage of some compounds, compositions and methods of the invention is that a chelate may be added to soil to extract iron from the soil and/or groundwater, so that this indigenous source of iron may be used instead of an added iron source.

Chelating compounds other than ethylene diamine tetraacetic acid (EDTA) and citric acid can be used. For example, ethylenediaminedissuccinate (EDDS) can be used. Some examples of chelated iron species that can be used are Fe(III)-EDTA, Fe(III)-citric acid, Fe(III)-EDDS, Fe(II)-EDTA, Fe(II)-citric acid, and Fe(II)-EDDS.

Example 3

Coating of NZVI, NZVMn, and Bimetallic NZVI, NZVMn

The use of nanoparticle zero valent iron (nZVI) and nanoparticle zero valent manganese (nZVMn) can be limited in environmental applications because they may exhibit a tendency to aggregate into micron-sized particles, thus losing some of their surface area to mass benefit. Additionally, nZVI and nZVMn particles can be highly reactive, and their surfaces can become quickly passivated and oxidized. In many applications including those for remediation, there is a need for these particles to exist and retain reactivity for months or even years. Coating the nZVI and nZVMn particles can reduce the rapid agglomeration, oxidation, and passivation of the nanoscale particles.

In a green approach according to some embodiments of the invention, bulk quantities of nanocomposites containing, for example, transition metals such as Cu, Ag, In, and Fe, can be produced at room temperature using a biodegradable polymer such as carboxymethyl cellulose (CMC) by reacting respective metal salts with the sodium salt of CMC in aqueous media. These nanocomposites exhibit broader decomposition temperatures when compared with control CMC, and Ag-based CMC nanocomposites exhibit a luminescent property at longer wavelengths. Noble metals such as Au, Pt, and Pd do not react at room temperature with aqueous solutions of CMC, but do so rapidly under microwave irradiation (MW) conditions at 100° C. The nanocomposites obtained at room temperature and microwave conditions were characterized using scanning electron microscopy, transmission electron microscopy, infrared spectroscopy, UV-visible spectroscopy, X-ray mapping, energy-dispersive analysis, and thermogravimetric analysis. This environmentally benign approach permits the relatively easy preparation of noble nanostructures of several shapes, without using any toxic reducing agents, such as sodium borohydride ($NaBH_4$), hydroxylamine hydrochloride, and others. The approach uses the benign biodegradable polymer CMC and does not require a separate capping/surfactant agent. Thus, the approach can produce nanoparticles for use in a wide and varied field of technological application, for example medicinal and land remediation applications.

The green synthesis of zero valent metals and bimetallic species using plant reducing agents along with biopolymers, with or without VeruTEK's VeruSOL™ green cosolvents and surfactants, can be used to make hydrophobic organic coated nZVI and nZVMn to enhance solvophobicity (with and without bimetallic metals). The coatings may also exhibit amphiphillic properties because of the presence of surfactant molecules present in the composite matrix. The coatings and composite structures of these nanometal species can also exhibit anionic, cationic, or zwitterionic surface charge properties.

The first and second dissolved metal ions can be added to the vessel more or less simultaneously, leading to nanoparticles in which the first and second metals are interspersed throughout the metal nanoparticles. Or the first dissolved metal ion can be added to a vessel first and adding the second dissolved metal ion after a period of time, for example, of at least about 1 second, 10 seconds, 15 seconds, 30 seconds, or 60 seconds, which generally leads to nanoparticles in which the first metal is present primarily in the core of the metal nanoparticle and the second metal is present primarily in an outer layer around the core of the metal nanoparticle. As used herein, "simultaneously" encompasses events that happen at precisely the same time as well as events that happen somewhat asynchronously, provided they are close enough in time to substantially accomplish the ends of the procedures requiring more or less simultaneous events. For example, in a procedure for preparing bimetallic nanoparticles in which it is desired that the metals be interspersed throughout the particle, introduction of the two metal ions will be considered "simultaneous" if, for example, the procedure produces, or is capable of producing, bimetallic nanoparticles with the metals substantially interspersed throughout the particles.

Bimetallic Fe/Pd nanoparticles can be prepared as follows: prepare 20 g/L green tea extract by adding 20 grams of green tea to 1 liter of deionized water and bring to 80° C. Let tea cool to room temperature and vacuum filter through 90 mm glass fiber filter. Prepare 0.1 M $FeCl_3$ by dissolving 16.2 g of solid $FeCl_3$ in 1 L of deionized water. Prepare palladium chloride solution in deionized water at appropriate concentration, 0.2 M in this study. Green tea synthesized nano-scale zero valent iron (GT-nZVI) is then prepared by adding 0.1 M of $FeCl_3$ to the 20 g/L filtered green tea in a 2:1 volume ratio, resulting in a 66 mM Fe concentration in the final GT-nZVI solution. Add appropriate amount of $PdCl_2$ to GT-nZVI solution within 30-60 seconds after $FeCl_3$ is added to the green tea. Shake. This and/or similar methods can also be used to prepare nanoparticles comprising other metals, as well as particles comprising more than two metals.

Example 4

Trial Production of nZVI Particles with Green Tea Extract and Ferric Chloride in the Presence of Carboxy Methyl Cellulose (CMC), VeruSOL-3™, and/or Trichloroethylene (TCE)

A series of batch tests were conducted to evaluate the capability of the green synthesis of nZVI using green tea extract and ferric chloride with the following: a) carboxy methyl cellulose (CMC); b) VeruSOL™-3; and c) trichloroethylene (TCE). Testing conditions are shown in Table 2.

TABLE 2

Compatibility of Carboxy Methyl Cellulose, VeruSOL ™-3 and Trichloroethylene with Green Tea & Ferric Chloride Synthesized Nanoscale Zero Valent Iron

| Test | CMC Saturated Water mL | VS-3 (10 g/L) mL | Pure VS-3 mL | FeCl3 mL | Green Tea-Extract mL | Dyed Pure TCE mL |
|---|---|---|---|---|---|---|
| I-1  | 20 | 20  |     |    |    |   |
| I-2  | 4  | 20  |     |    |    |   |
| I-3  | 20 |     |     | 20 |    |   |
| I-4  | 4  |     |     | 20 |    |   |
| I-5  | 20 |     |     |    | 20 |   |
| I-6  | 4  |     |     |    | 20 |   |
| I-7  | 40 |     |     |    |    | 1 |
| I-8  | 4  |     |     | 24 | 12 | 1 |
| I-9  | 4  |     |     | 24 | 12 |   |
| I-10 | 4  |     | 0.4 | 24 | 12 | 1 |
| I-11 | 4  |     | 0.4 | 24 | 12 |   |
| I-12 |    |     | 0.4 | 24 | 12 |   |

Notes:
1) Reagants- Carboxy methyl cellulose (CMC) Saturated Water, VeruSOL ™-3, FeCl₃, Green Tea Extract, Dyed Pure TCE
2) Tests Conducted in 40 mL vials
3) Interfacial Tension and photographs taken 24 hours after a 1 minute initial mixing period
4) Concentrations of VeruSOL ™-3 used results in 10 g/L concentration in vial
5) 0.1 M ferric chloride used in test
6) Carboxy methyl cellulose used a from a saturated solution (~3%) of sodium carboxy methyl cellulose (MW-90,000)

In Test Vials I-1 and I-2, the compatibility of carboxy methyl cellulose with VeruSOL™-3 was evaluated at two CMC concentrations. In both cases there were no separate phases detected when CMC and VeruSOL™-3 were mixed together. In Test Vials I-2 and I-3, the ability of carboxy methyl cellulose to chelate the iron in ferric chloride was evaluated. When 4 mL of a saturated CMC solution was added to 0.1 N ferric chloride, precipitation of iron was observed for Test Vial I-4. However, when 20 mL of a saturated CMC solution was added to 0.1 N ferric chloride, there was no precipitation and the ferric chloride was fully chelated. In Test Vials I-5 and I-6, the compatibility of CMC and green tea extract were evaluated to determine if there would be separate phase reaction products. Both of these solutions indicated no separate phase. In Test Vial I-7, the compatibility of CMC with pure phase trichloroethylene was evaluated. Visual observation revealed no apparent reactivity of TCE with CMC. In Test Vials I-8 and I-9, the synthesis of nZVI using ferric chloride and green tea extract was evaluated in the presence of CMC (I-9) and in the presence of CMC and pure phase TCE (I-8). There was no apparent impact on the ability to form nZVI particles when CMC and CMC plus TCE were present. Test vials clearly exhibited a layer of TCE under the settled nZVI.

In Test Vial 10, the synthesis of nZVI using ferric chloride and green tea was evaluated in the presence of CMC, TCE, and VeruSOL™-3. The appearance of this test was similar to Test Vial I-8 (similar conditions to Test Vial I-10 but without TCE); however, the TCE appeared to attach to the glass walls of the Test Vial. In Test Vials I-11 and I-12, the effects were determined on the addition of VeruSOL™-3 on the synthesis of nZVI using ferric chloride and green tea extract in the presence of CMC (Vial I-11) and absence of CMC (Vial I-12). In both cases the addition of VeruSOL™-3 stabilized the nZVI and inhibited much of the agglomeration and settling observed when VeruSOL™-3 was not added during the synthesis of nZVI using ferric chloride and green tea extract.

Hoag and Collins (Patent pending; U.S. Ser. No. 12/068, 653) teach that VeruSOL™-3, a mixture of d-limonene and nonionic surfactants consisting of ethoxylated plant oils, can be used to dissolve a variety of organic liquids, including TCE. The test results clearly indicate that nZVI can be synthesized using ferric chloride and green tea extract in the presence of TCE without any impact on particle formation. Therefore, nZVI can be made using this green synthesis process in the presence of VeruTEK's VeruSOL™-3 to enable controlled dissolution of Non Aqueous Phase Liquids (NAPL). Additionally, since nZVI can be made in situ, as demonstrated in the soil column test results, nZVI can also be manufactured in situ in the presence of pure phase TCE.

Example 5

In Situ Formation of Metal Nanoparticles

A method according to the invention was used to produce nanoscale zero valent iron particles (nZVI) in soil columns, as a simulation of in situ formation of nanoscale iron particles in soil. Two column experiments were conducted to evaluate the potential for in situ generation of nZVI using $Fe(NO_3)_3$ and either green tea extract or lemon balm extract. Two stock solutions were each injected in an upflow mode into soil columns packed with ASTM 20/30 sand with the dimension of 300 cm long by 30 cm diameter. For Column 2, green tea extract and 0.1 M $Fe(NO_3)_3$ were each simultaneously injected at flowrates each at 0.15 mL/min for a total injected flowrate of 0.30 mL/min.

The green tea extract was made as follows: 200 mL of deionized water were heated in a beaker to a temperature of 82° C. and 4.01 grams of Chunmee green tea was added. The beaker was covered with aluminum foil and the tea was heated in the water for 5 minutes. After 5 minutes, the beaker was removed from the heat and the tea was allowed to settle for 1 hour and return to 25° C. The tea extract supernatant was then removed from the beaker and either immediately used or stored at 4° C. for later use. The Lemon Balm Extract was made using a similar procedure.

Figure 2:
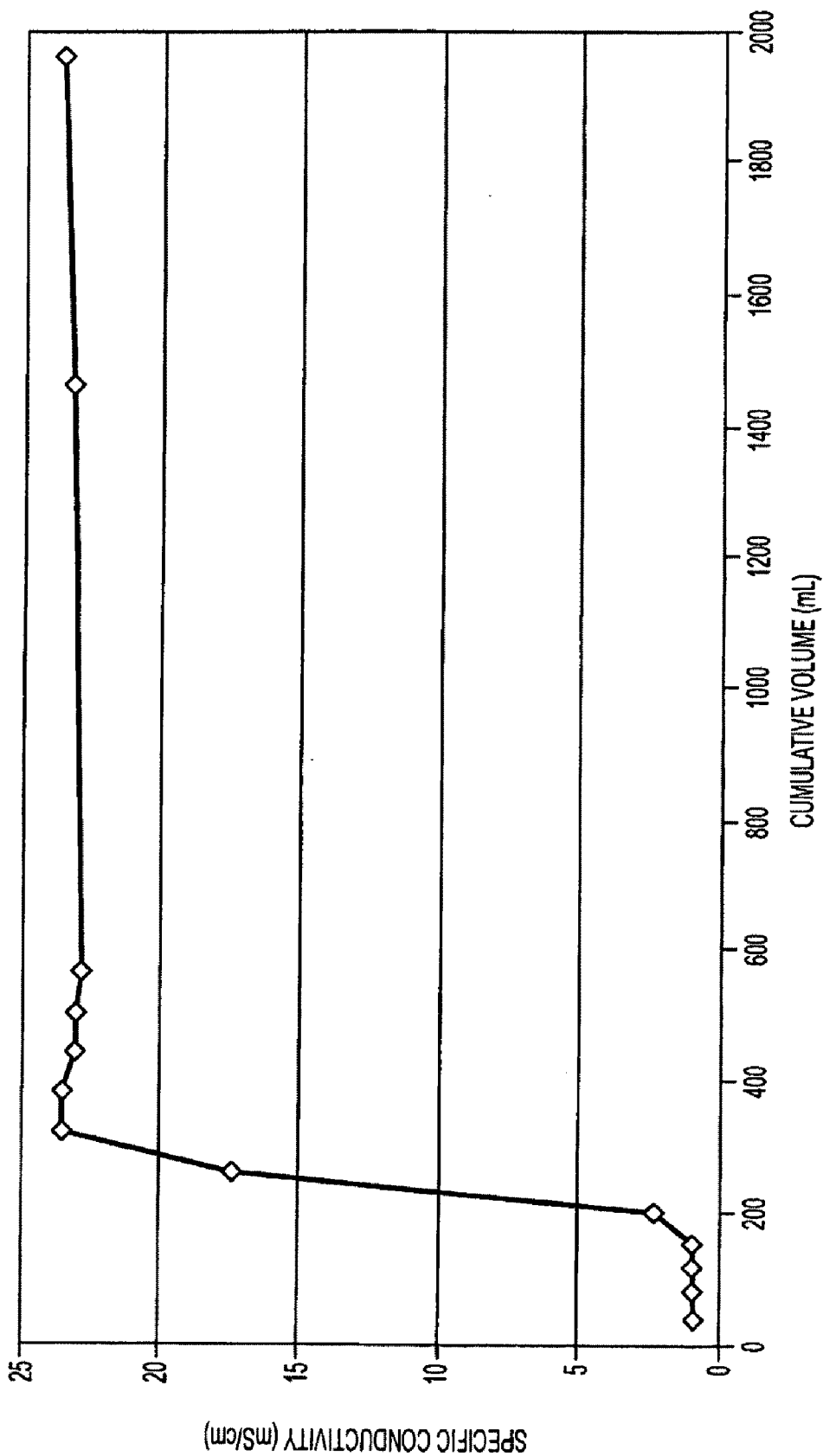
FIG. 2 presents a graph of specific conductivity as a function of cumulative effluent volume in Column 2—green tea extract with $Fe(NO_3)_3$.

The initial formation of nZVI in the bottom (inlet) of the soil column was observed in the bottom of Column 2, as black in an otherwise light-colored liquid. Effluent from Column 2 was collected and sampled for electrolytic conductivity and was visually observed. Sample number 4 was collected between effluent volumes of from 117 mL to 150 mL in a 40 mL sample vial and represented approximately 0.56 pore volumes of flow through the column. Sample number 5 was collected between effluent volume from 150 mL to 200 mL in a 60 mL sample vial and represented approximately 0.74 pore volumes of flow through the column. Sample number 6 was collected between effluent volumes of from 200 mL to 259 mL in a 60 mL sample vial and represented approximately 0.96 pore volumes of flow through the column. The electrolytic conductivity values for Samples 4, 5, and 6 were 0.86 mS/cm, 2.27 mS/cm, and 17.4 mS/cm, respectively. An examination of the effluent samples demonstrated that the nZVI began eluting from the column between Samples 4 and 5. A comparison of the Lemon Balm Extract and 0.1 M $Fe(NO_3)_3$ Column (Column 1) to a control column (no Lemon Balm Extract or ferric nitrate) clearly showed the accumulation of nZVI in the column, but the nZVI continued to elute from the column as long as the test runs were conducted. The electrolytic conductivity of the Column 1 (Lemon Balm Extract and 0.1 M $Fe(NO_3)_3$) effluent is shown in FIG. 1. It is evident that the nZVI eluted from the column and continued to elute after breakthrough. The same trend is evident in Column 2 (Green Tea Extract and 0.1 M $Fe(NO_3)_3$), as is shown in FIG. 2.

Example 6

DPPH Stable Radical Method for Screening of Plant Extracts for Use in Synthesis of Metal Nanoparticles A 2,2-diphenyl-1-picrylhydrazyl (DPPH) stable radical method for analysis of radical scavenging properties related to antioxidant activity was used to screen plant extract for potential use in the manufacture of zero valent nanoparticles. This method was used to determine and optimize the amount of ferric iron added to a given plant extract for the formation of zero valent nanoparticles. One optimization goal in the manufacture of nanometal particles using plant extracts is to determine how much ferric iron (or other metal) can be added to a given plant extract to ensure complete conversion of ferric iron to zero valent iron. This DPPH screening method also can be used with metals other than iron and with plant extracts other than green tea for the manufacture of nanometals using plant extracts.

The experimental design is presented in Table 3.

TABLE 3

DPPH Stable Radical Consumption by Plant Extracts Before and After Reaction with Ferric Chloride to Manufacture Nanoscale Zero Valent Iron Particles

| Test | Reaction Matrix | Absorbance of Treated Samples at 517 nm | Observations | Test Conc, g/L |
|---|---|---|---|---|
| 1 | L mL DI Water + 3 mL EtOH + 1 mL DPPH Soln | 0.955 | Purple | |
| 2 | 1 mL 200x, 2.5 g/L Tea Extract + 3 mL EtOH4 + 1 mL DPPH Soln | 0.836 | Purple | 2.5 |
| 3 | 1 mL 200x, 5 g/L Tea Extract + 3 mL EtOH4 + 1 mL DPPH Soln | 0.793 | Purple | 5 |
| 4 | 1 mL 200x, 10 g/L Tea Extract + 3 mL EtOH4 + 1 mL DPPH Soln | 0.637 | Purple | 10 |
| 5 | I mL 200x, 20 gfL Tea Extrnct + 3 mL EtOH4 + 1 mL DPPH Soln | 0.593 | Light Purple | 20 |
| 6 | 1 mL 200x, 40 g/L Tea Extract + 3 mL EtOH4 + 1 mL DPPH Soln | 0.072 | Tea | 40 |
| 7 | 1 mL 200x, 2.5 g/L Tea Extract/NZV1 + 3 mL EtOH4 + 1 mL DPPH Soln | 0.86 | Purple | 2.5 |
| 8 | 1 mL 200x, 5 g/L Tea Extract/NZVI + 3 mL EtOH4 + 1 mL DPPH Soln | 0.858 | Purple | 5 |
| 9 | 1 mL 200x, 10 g/L Tea Extract/NZVI + 3 mL EtOH4 + 1 mL DPPH Soln | 0.802 | Purple | 10 |
| 10 | 1 mL 200x, 20 g/L Tea Extract/NZVI + 3 mL EtOH4 + 1 mL DPPH Soln | 0.774 | Purple | 20 |
| 11 | 1 mL 200x, 40 g/L Tea Exttact/NZVI + 3 mL EtOH4 + 1 mL DPPH Soln | 0.527 | Purple pink | 40 |

Experimental Procedure:
1) DPPH (500 uM) was dissolved in pure ethanol (96%). The radical stock solution was prepared fresh daily.
2) The DPPH solution (1 mL)was added to 1 mL of sample extract with 3 mL of ethanol.
3) The mixture was shaken vigorously for 10 min and allowed to stand at room temperature in the dark for another 20 min.
4) A decrease in absorbance of the resulting solution (the result of consumption of the radical scavenger) was measured at 517 nm.

Figure 13:
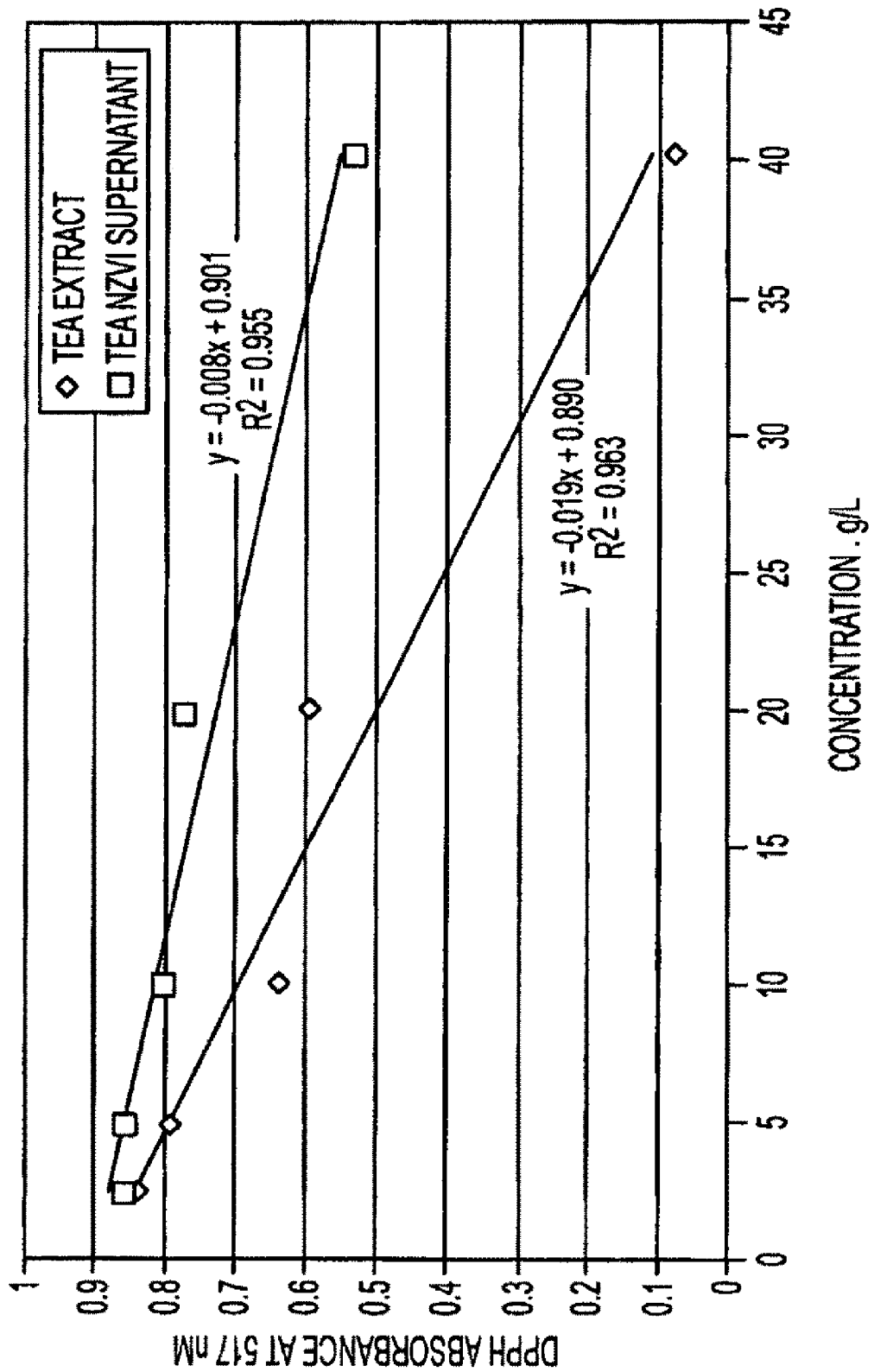
FIG. 13 presents a graph illustrating plant extract DPPH stable radical consumption from nanoscale zero valent iron particle formation from reaction of green tea extract with ferric chloride.
Figure 14:
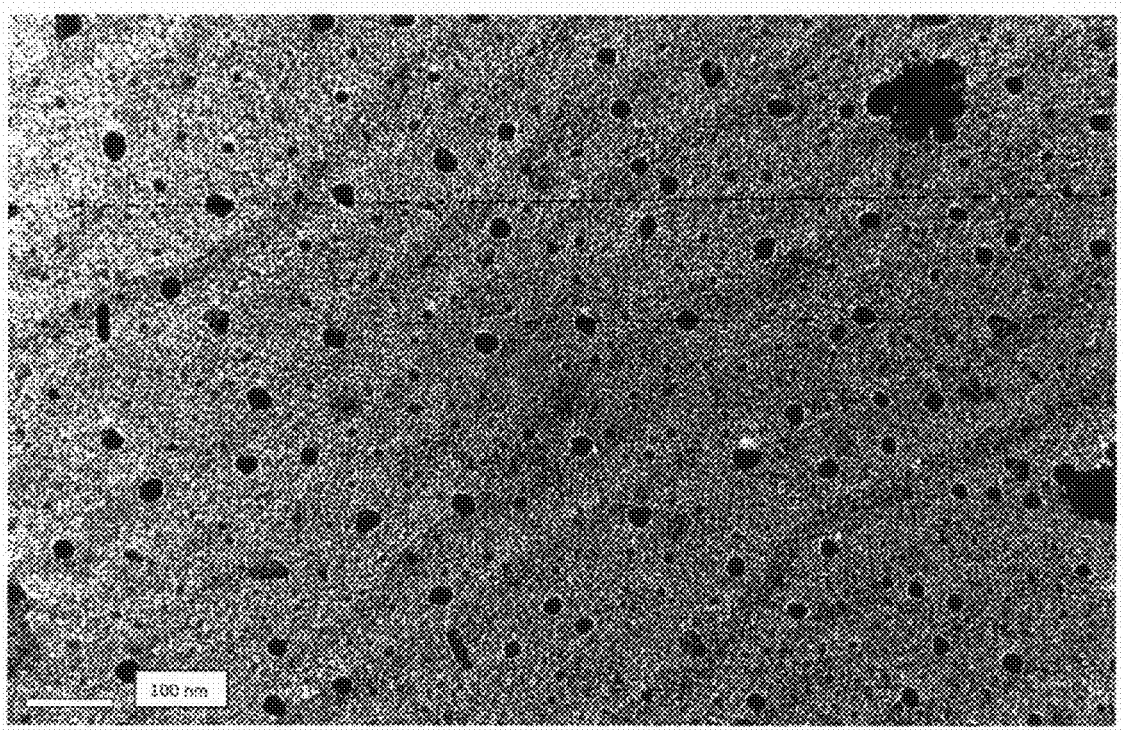
FIG. 14 presents a micrograph of green tea synthesized zero valent iron nanoparticles made by combining 0.1 M ferric chloride with 0 g/L VeruSOL™-3.
Figure 15:
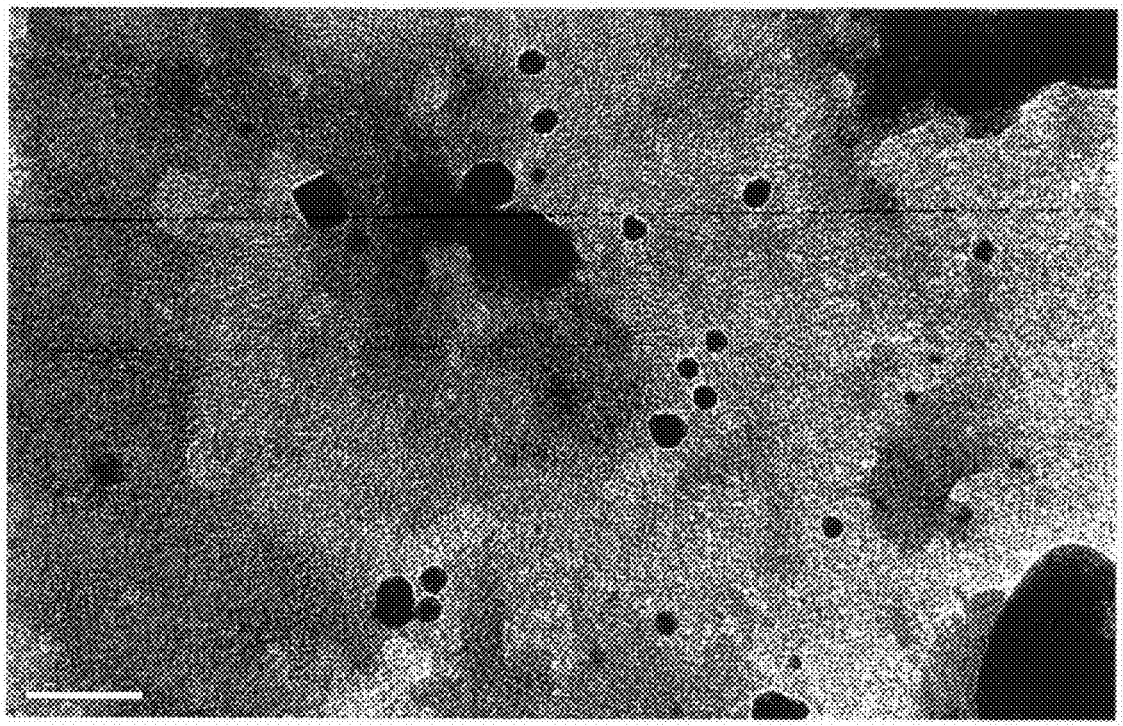
FIG. 15 presents a micrograph of green tea synthesized zero valent iron nanoparticles made by combining 0.1 M ferric chloride with 2 g/L VeruSOL™-3.
Figure 16:
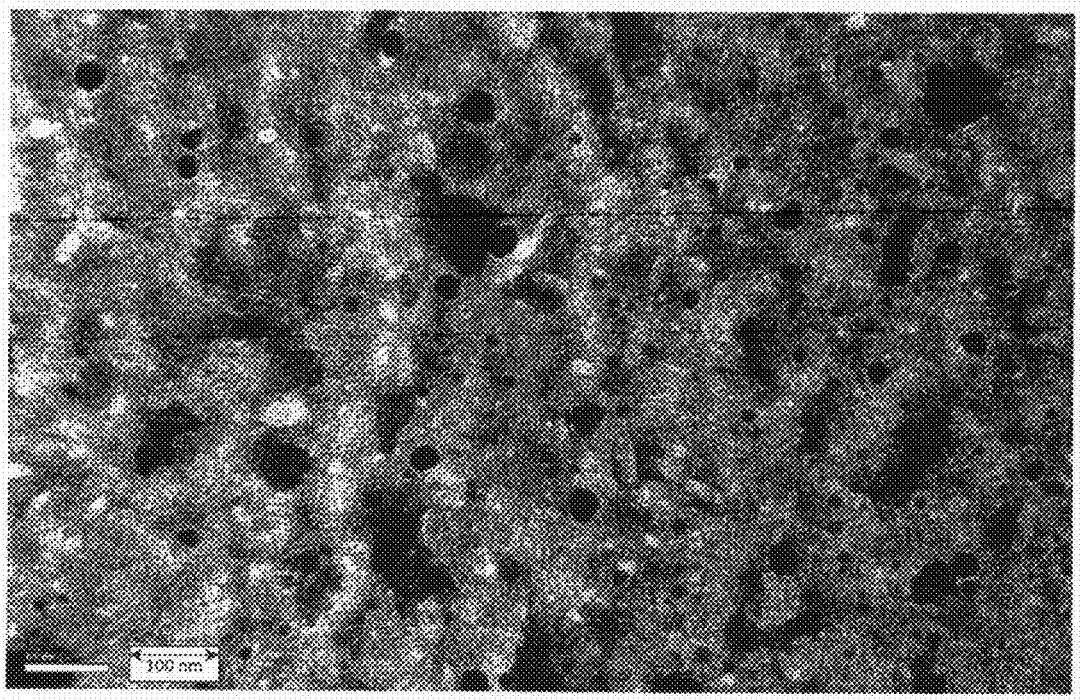
FIG. 16 presents a micrograph of green tea synthesized zero valent iron nanoparticles made by combining 0.1 M ferric chloride with 5 g/L VeruSOL™-3.
Figure 17:
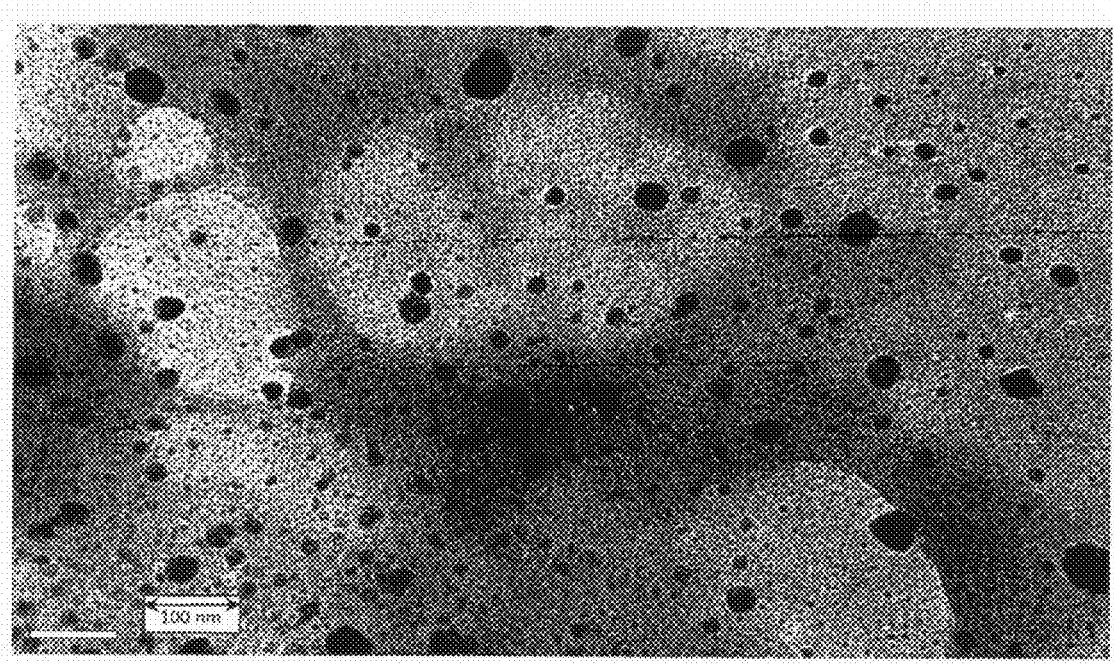
FIG. 17 presents a micrograph of green tea synthesized zero valent iron nanoparticles made by combining 0.1 M ferric chloride with 10 g/L VeruSOL™-3.
Figure 18:
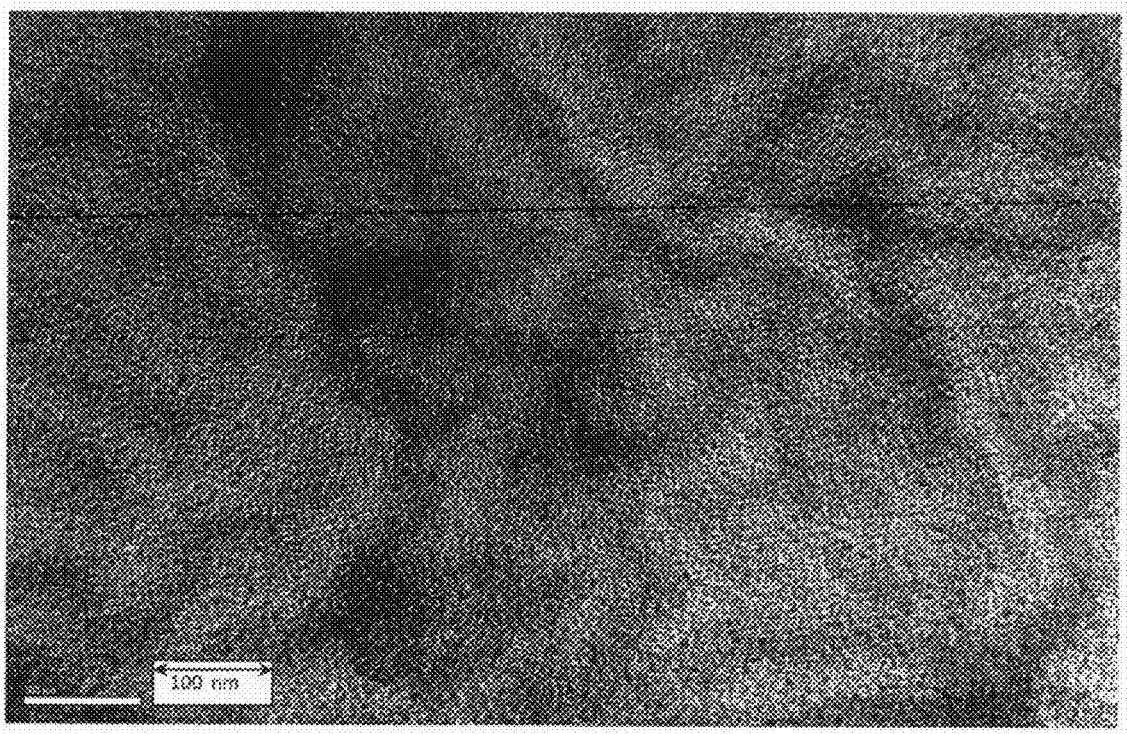
FIG. 18 presents a micrograph of green tea synthesized zero valent iron nanoparticles made by combining 0.1 M Fe(III)-EDTA with 0 g/L VeruSOL™-3.
Figure 19:
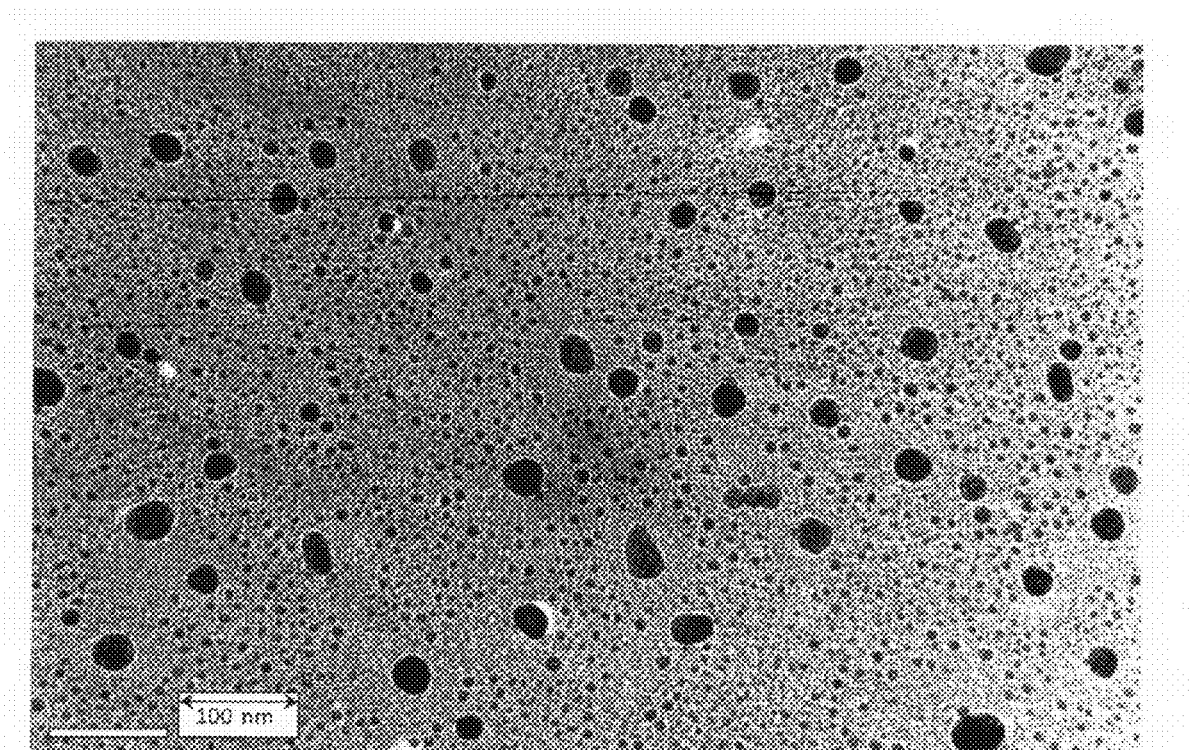
FIG. 19 presents a micrograph of green tea synthesized zero valent iron nanoparticles made by combining 0.1 M Fe(III)-EDTA with 5 g/L VeruSOL™-3.
Figure 20:
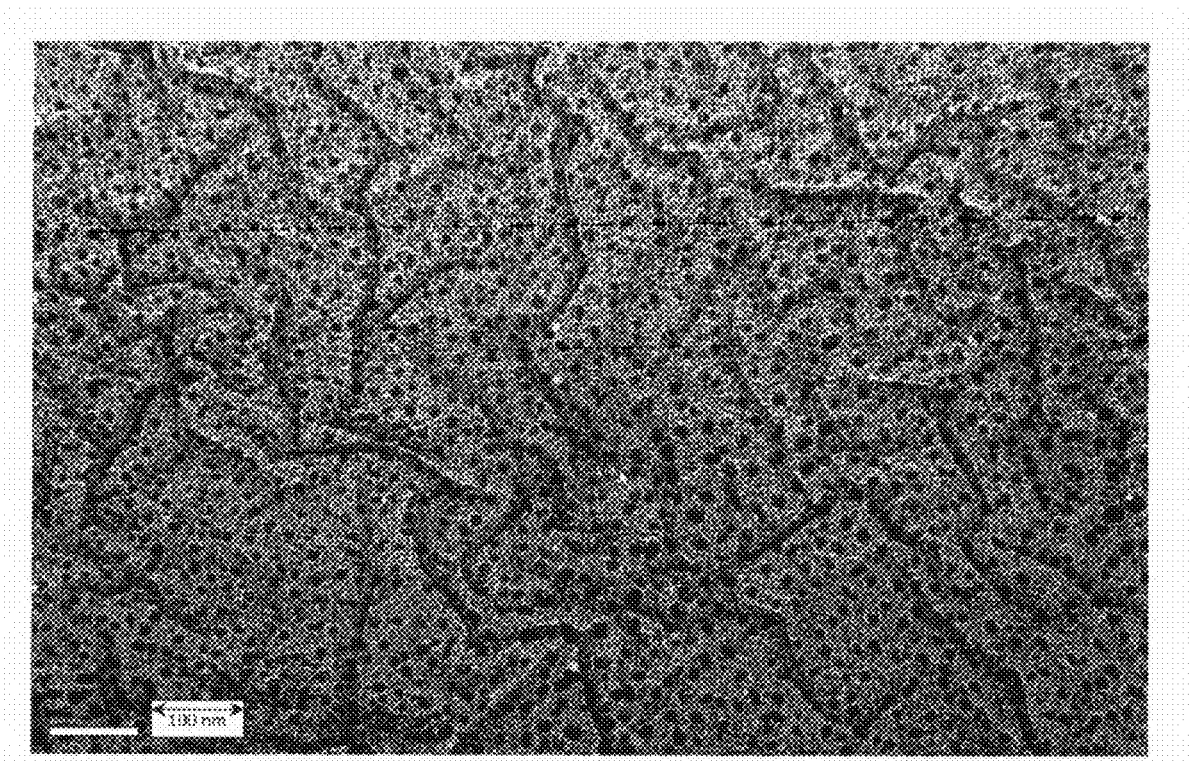
FIG. 20 presents a micrograph of green tea synthesized zero valent iron nanoparticles made by combining 0.1 M Fe(III)-citric acid with 0 g/L VeruSOL™-3.
Figure 21:
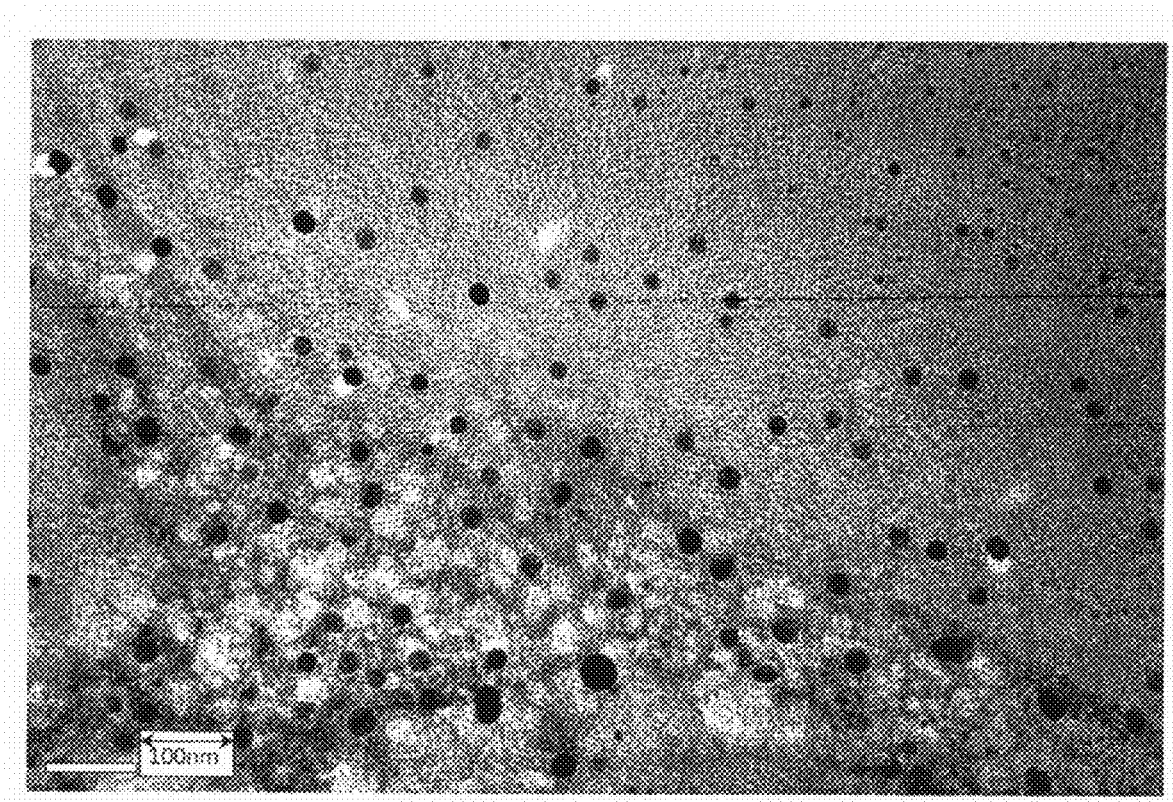
FIG. 21 presents a micrograph of green tea synthesized zero valent iron nanoparticles made by combining 0.1 M Fe(III)-citric acid with 5 g/L VeruSOL™-3.

Tests 1 though 5 in Table 2 were used to determine the effects of increasing concentrations of dry green tea used to make tea extract in heated water on the spectroscopic absorbance of the DPPH radical. The results of tests 1 through 5 are represented by the lower line of best fit in FIG. 13, demonstrating a linear relationship between dry green tea concentration (used to make the tea extract) and DPPH absorbance at 517 nm. The green tea extract was diluted by a factor of 200 to obtain usable absorbance measurements in a linear range. The same green tea extracts used in tests 1 through 5 were then added to ferric chloride to make zero valent iron nanoparticles. A ratio of 2:1 (v/v) of 0.1M $FeCl_3$ to tea extract was used to make the zero valent iron nanoparticles used in tests 7 through 11. The DPPH absorbance of the solution following the formation of nZVI particles was considerably higher than with the original green tea extracts alone, reflecting that some of the compounds in the tea extract responsible for consumption of the DPPH free radical were consumed in the formation of the nZVI particles. This is evident by examination of the upper line of best fit in FIG. 13. The difference between the two lines represents the net consumption of DPPH free radical absorbance when nanometal particles are manufactured. Polyphenolic compounds and other compounds in the tea extract are consumed during the production of metal nanoparticles, as evidenced by the difference between the two lines. The net consumption can be used to run successive dosing tests for the concentration ratio of the metal salt solutions and the plant extract, thereby enabling a relationship to be derived between DDPH absorption and metal salt added.

This relationship can be used to establish the optimum dose of plant extract and metal salt solution to use the plant extract to the maximum extent in the formation of metal nanoparticles.

Example 7

Green Synthesis Manufacture of Noble Metal Nanoparticles at Room Temperature A method according to some embodiments of the invention represents a green approach that generates bulk quantities of nanocrystals of noble metal, such as silver (Ag) and palladium (Pd), using a plant extract, such as coffee and tea extract, at room temperature. This single-pot method uses no surfactant, capping agent, and/or template. The obtained nanoparticles have a diameter size of from about 20 nm to about 60 nm and are crystallized in face centered cubic symmetry. The method may be used to produce nanoparticles of other metals, such as other noble metals, e.g., gold (Au) and platinum (Pt).

To produce the coffee extract, 400 mg of coffee powder (Tata Bru coffee powder 99%) was dissolved in 50 mL of water. 2 ml of 0.1 N $AgNO_3$ ($AgNO_3$, Aldrich, 99%) was mixed with 10 ml of the coffee extract and shaken to ensure thorough mixing. The reaction mixture was allowed to settle at room temperature.

2 ml of 0.1 N $PdCl_2$ ($PdCl_2$, Aldrich, 99%) was mixed with 10 ml of the coffee extract and shaken to ensure thorough mixing. The reaction mixture was allowed to settle at room temperature.

To produce the tea extract, 1 gm of tea powder (Red label from Tata, India Ltd. 99%) was boiled in 50 ml of water and filtered through a 25 µM Teflon filter. 2 ml of 0.1 N $AgNO_3$ ($AgNO_3$, Aldrich, 99%) was mixed with 10 ml of the tea extract and shaken to ensure thorough mixing. The reaction mixture was allowed to settle at room temperature.

2 ml of 0.1 N $PdCl_2$ ($PdCl_2$, Aldrich, 99%) was mixed with 10 ml of the tea extract and shaken to ensure thorough mixing. The reaction mixture was allowed to settle at room temperature.

To evaluate the effect of the source of the coffee or tea extract on the morphology of the Ag and Pd nanoparticles prepared, several experiments similar to those described above were carried out with coffee and tea extracts from various sources. The results are shown in Table 4.

TABLE 4

Various brands of tea/coffee used to generate nanoparticles.

| Item | Brand Names | Shape | Size |
|---|---|---|---|
| 1 | Sanka ™ coffee | faceted | ~100 nm |
| 2 | Bigelow ™ tea | spherical | ~20 nm |
| 3 | Luzianne ™ tea | spherical | ~100 nm |
| 4 | Starbucks ™ coffee | spherical | ~10 nm |
| 5 | Folgers ™ coffee | spherical | ~10 nm |
| 6 | Lipton ™ tea | spherical | ~20-30 nm |

0.1 mL of the products containing nanoparticles was dispersed with 5 mL distilled water to prepare samples for transmission electron microscopy (TEM) and scanning electron microscopy (SEM) analysis. TEM grids were prepared by placing 1 µL of the particle solution on a carbon-coated copper grid and drying at room temperature, and UV-visible spectrum measurements were taken. To obtain better SEM images, the product was drop-cast on carbon tape and allowed to dry; a thin layer of gold was coated on the surface to make it conducting. TEM was performed with a JEOL-1200 EX microscope operated at 120 kV. SEM was carried out with a field-emission microscope (Leo, 1530 VP) operated at an accelerating voltage of 20 kV. X-ray diffraction (XRD) patterns were obtained from a Scintag X-ray diffractometer at a 2 theta range of 2-600 using CuKα radiation. Open-circuit voltage potentials were obtained using 1 M NaCl with reference to saturated calomel electrode (SCE).

Various shapes and sizes for Ag and Pd nanoparticles using coffee and tea extract were observed. Drop-coated films of Ag and Pd nanoparticles were prepared by room temperature aqueous solution evaporation on carbon-coated copper grids and analyzed by TEM (FIG. 3a-d). At low magnification, a number of highly polydisperse Ag nanoparticles possessing a variety of shapes were observed (FIG. 3a). The TEM image shows that Ag nanoparticles were well-separated from each other with an apparently uniform inter-particle separation. This indicates that the Ag nanoparticles were capped by organic molecules, such as caffeine, and at higher magnifications it can be seen clearly (FIG. 3b). In the case of Pd nanoparticles, the sizes seemed to be smaller than Ag nanoparticles and the inter-particle distance was uniformly separated and well aligned (FIG. 3c-d).

Figure 3:
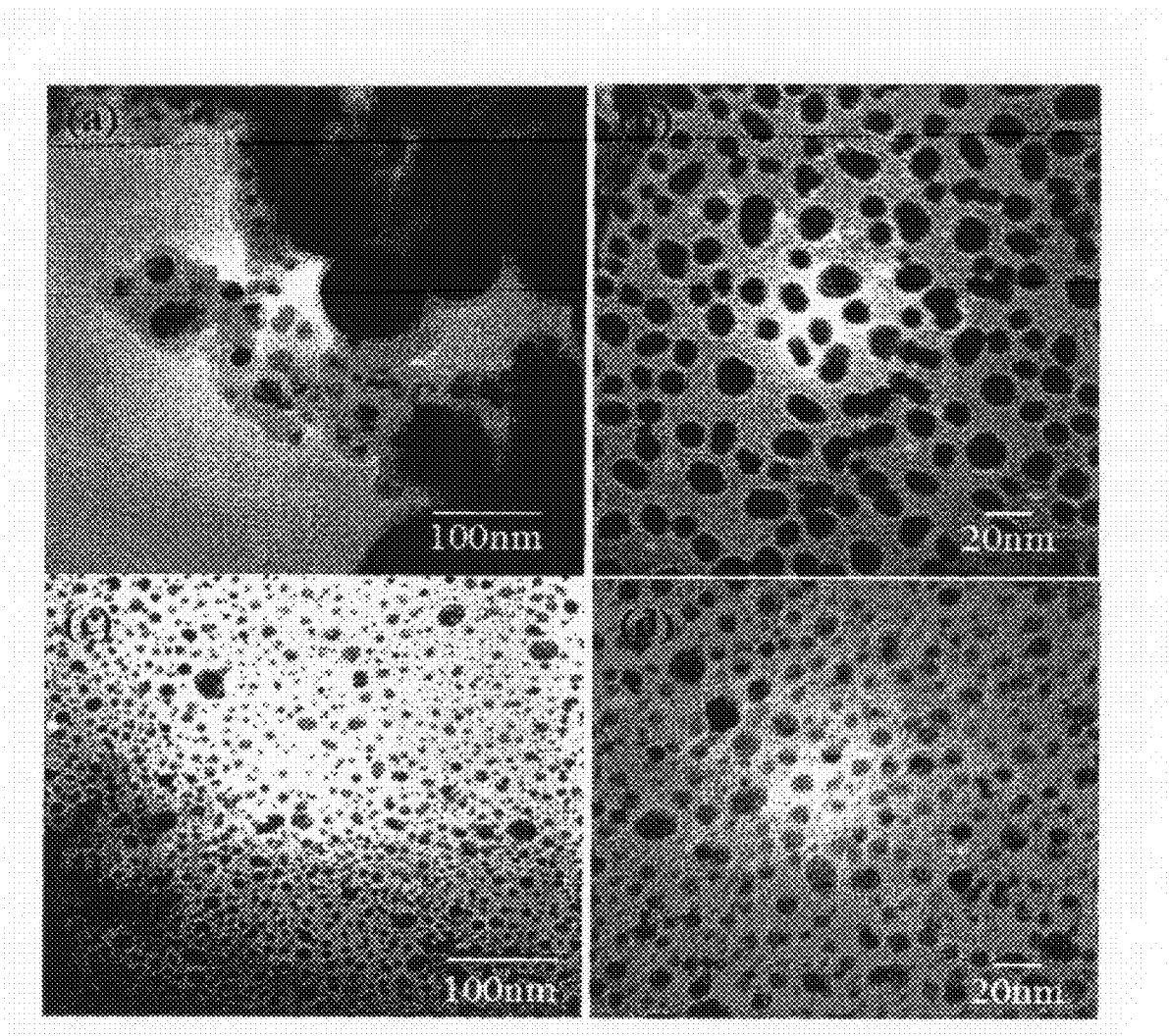
FIG. 3 presents transmission electron micrographs of silver and palladium nanoparticles in aqueous solutions of coffee and tea extract cast on a carbon coated copper grid. (a) Silver nanoparticles from coffee extract. (b) Silver nanoparticles from tea extract. (c) Palladium nanoparticles from coffee extract. (d) Palladium nanoparticles from tea extract.
Figure 4:
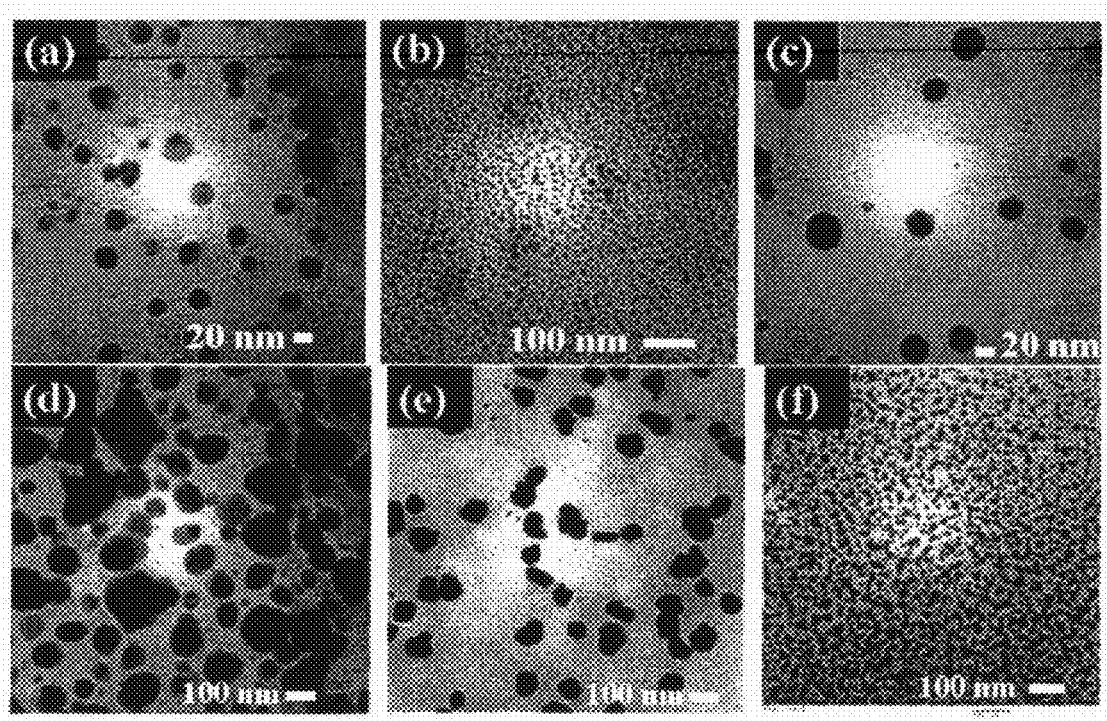
FIG. 4 presents TEM images of silver nanoparticles synthesized with coffee and tea extracts.
Figure 5:
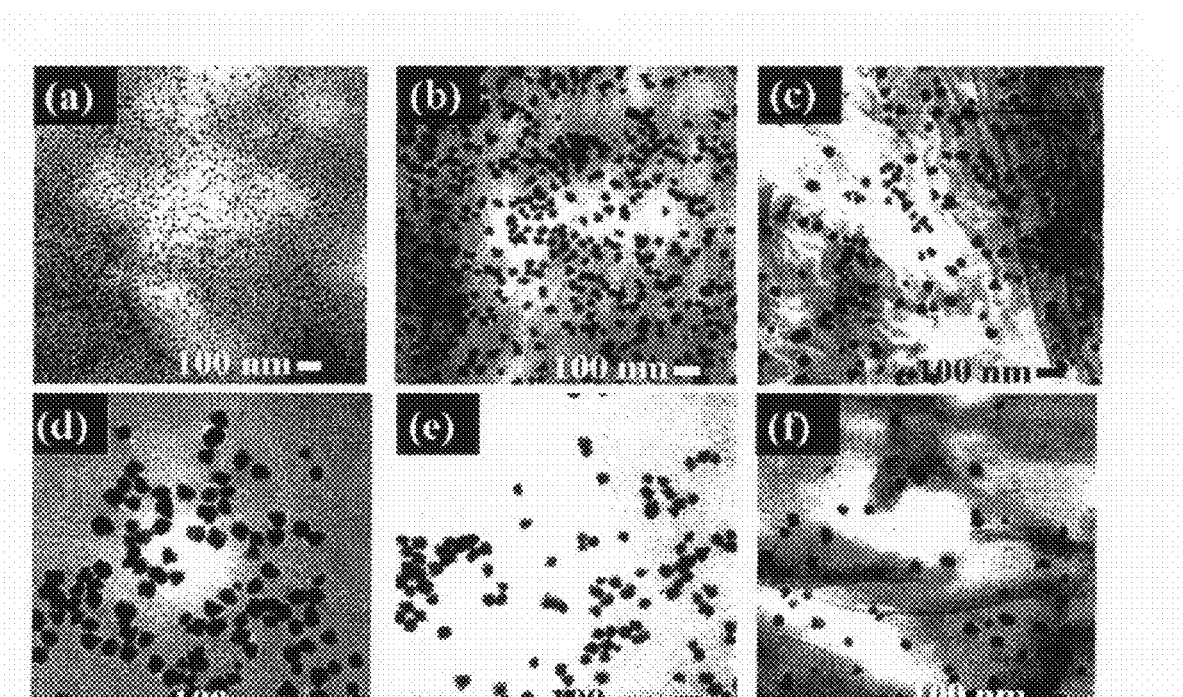
FIG. 5 presents TEM images of palladium nanoparticles synthesized with coffee and tea extracts.
Figure 11:
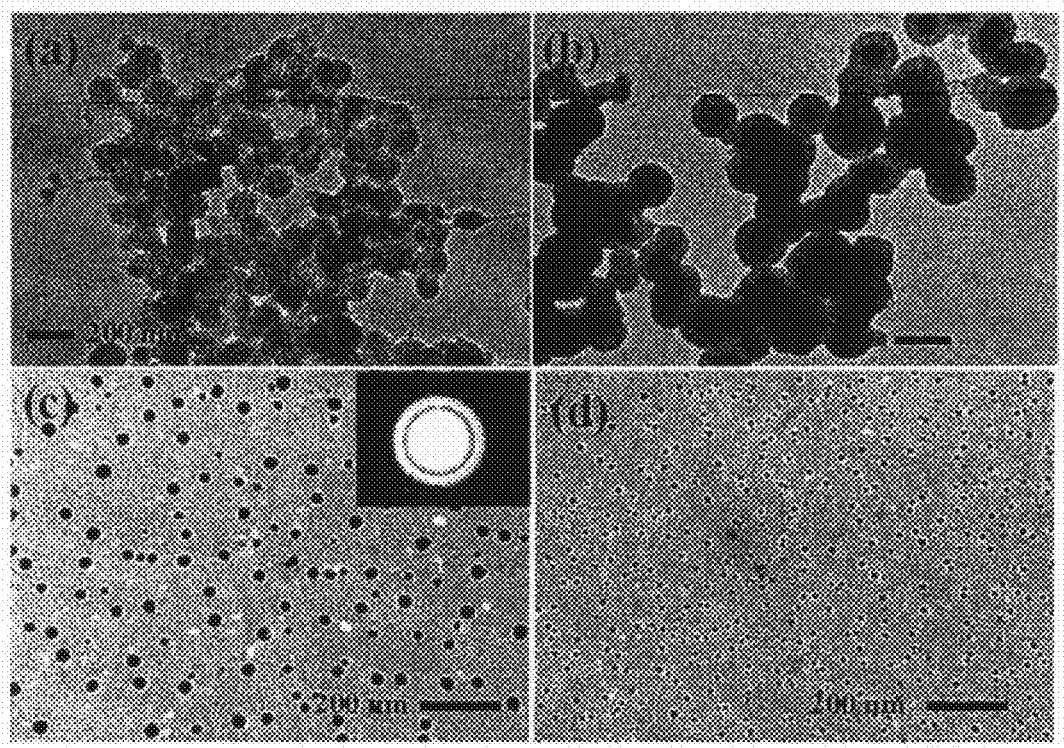
FIG. 11 presents TEM images of gold nanoparticles reduced with solutions of catechin. 2 mL 0.01N solutions of gold ions reduced with: (a) 2 mL; (b) 4 mL; (c) 6 mL; and (d) 8 mL of catechin in (0.1N) aqueous solution
Figure 12:
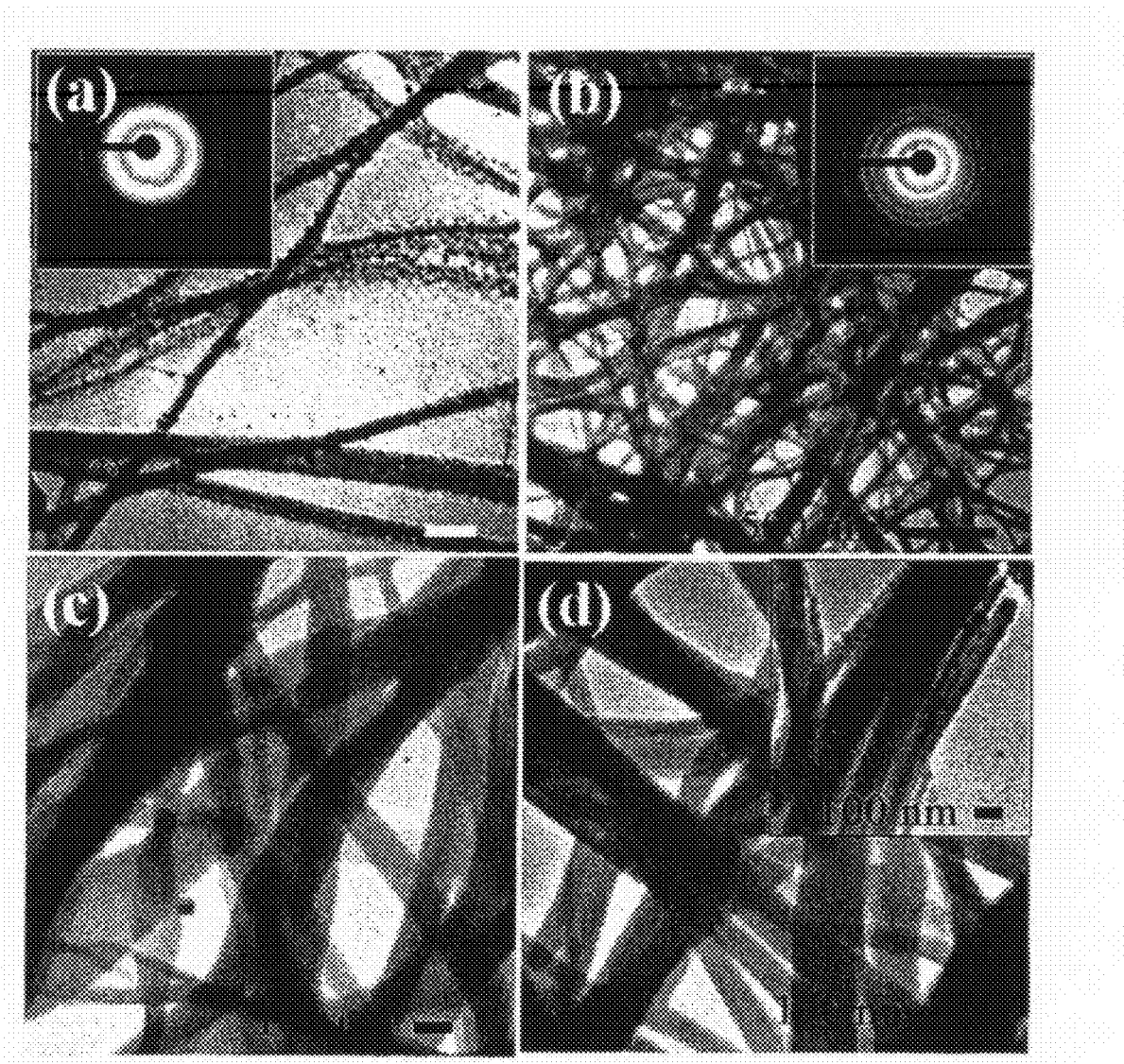
FIG. 12 presents TEM images of gold nanowires reduced with solutions of caffeine. 2 mL 0.01N solutions of gold ions reduced with (a) with 25 mg (b) 100 mg (c) 200 mg and (d) 300 mg of caffeine.

The particles sizes ranged from about 20 nm to about 60 nm, and the particles were well-separated from each other. The polyphenols acted as a reducing agent as well as a capping agent. The control experiments carried out with pure catechin yielded tennis-ball-like structures for Au and Ag (FIG. 3 and FIG. 11). However, pure caffeine yielded wire-like structures for Au (FIG. 12) and reaction with $AgNO_3$ is very slow with less yield. This approach was carried out for nanoparticles produced with coffee and tea from various sources (Table 4), and corresponding TEM images are shown in FIGS. 4 and 5. The Ag and Pd nanoparticles were mostly spherical and had sizes ranging from as low as about 5 nm to about 100 nm, depending upon the source of coffee or tea extract used (see FIG. 4 and FIG. 5).

Figure 6:
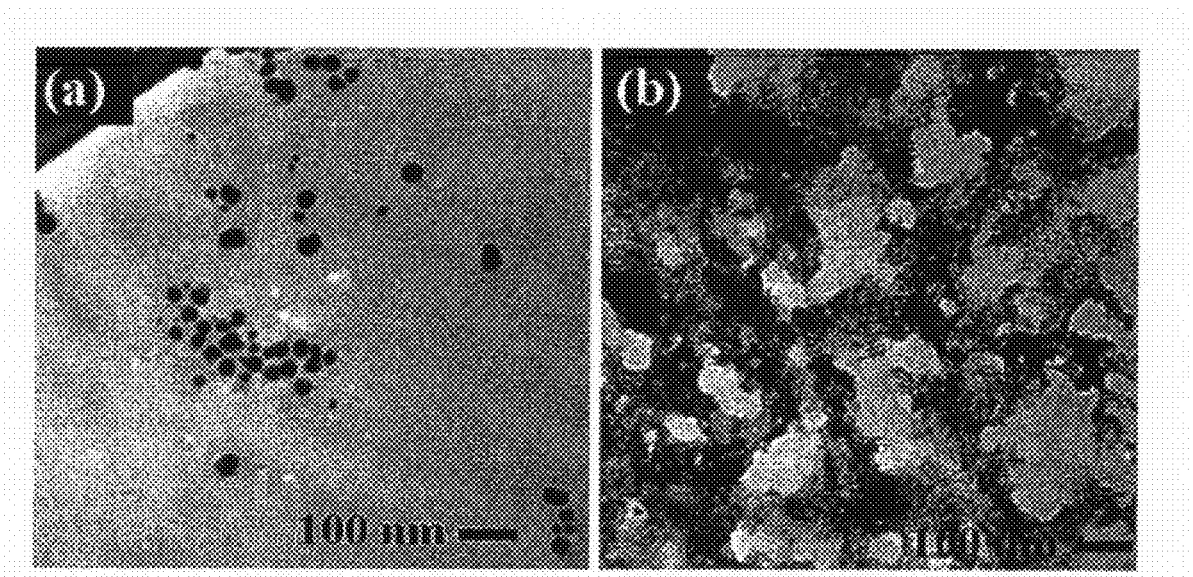
FIG. 6 presents TEM images of Ag and Pd nanoparticles prepared in aqueous solutions using catechin.

The control experiments carried out with pure catechin showed spherical-ball-like structures for Ag and Pd, as shown in FIG. 6.

The formation mechanism of Ag and Pd was studied using UV spectroscopy, which was found to be a useful technique for the analysis of nanoparticle formation over time. As illustrated in FIG. 7, a surface plasmon peak located at ~460 nm was observed for the Ag nanoparticles after 2 hours of reaction (curve (f)) prepared from tea extract. A strong absorption peak was observed at ~340 nm corresponding to the absorption of polyphenol compounds present in the tea.

Figure 8:
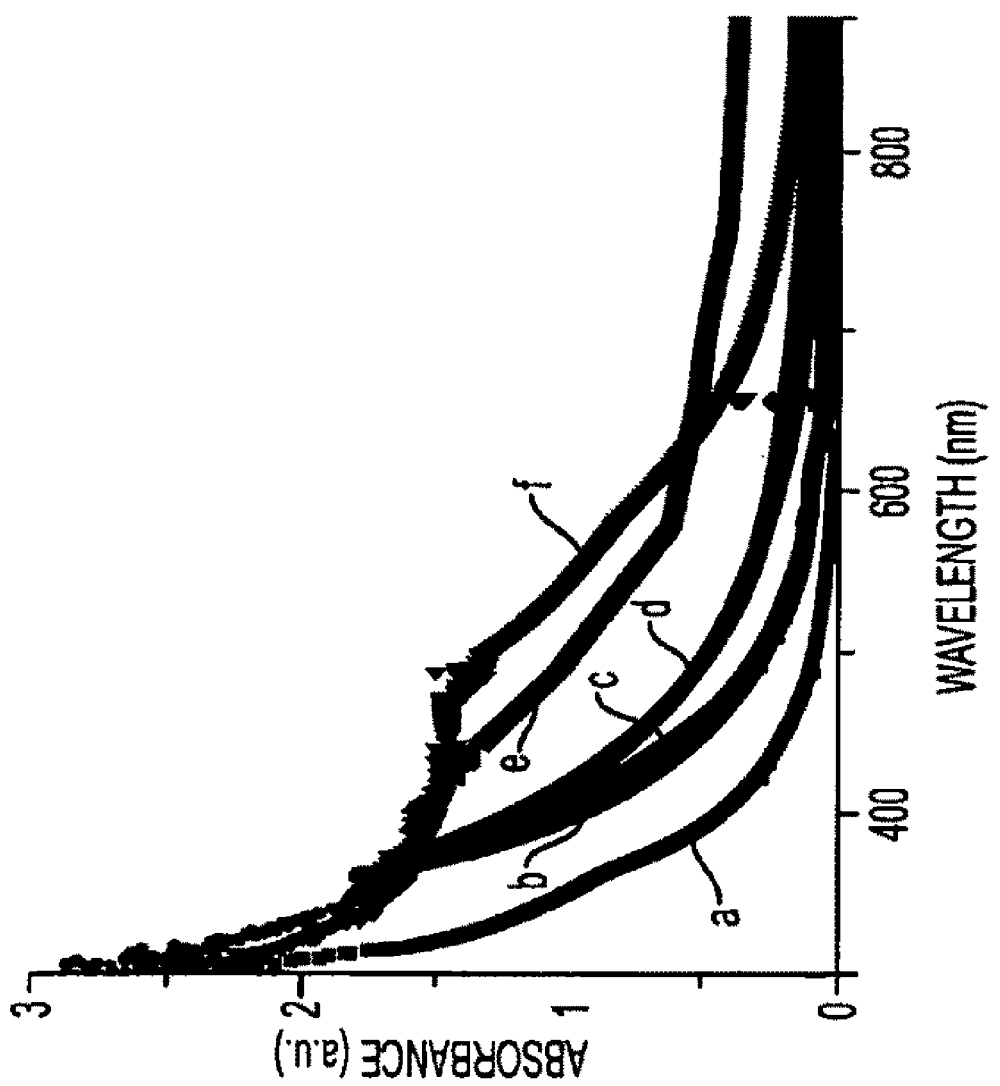
FIG. 8 presents a graph of UV-Visible spectra of Ag and Pd nanoparticles in aqueous solutions of coffee and tea leaves extract. (a) Ag nanoparticles from coffee extract. (b) Ag nanoparticles from tea extract. (c) Pd nanoparticles from coffee extract. (d) Pd nanoparticles from tea extract. The inset shows UV-Visible spectra of (a) coffee and (b) tea extract.

The UV spectra of Ag and Pd nanoparticles prepared from coffee and tea extracts are shown in FIG. 8. The generation of strong but broad-surface plasmon peaks has been observed in the case of various metal nanoparticles over a wide range of particle sizes, e.g., from about 200 to about 1200 nm.

Figure 9:
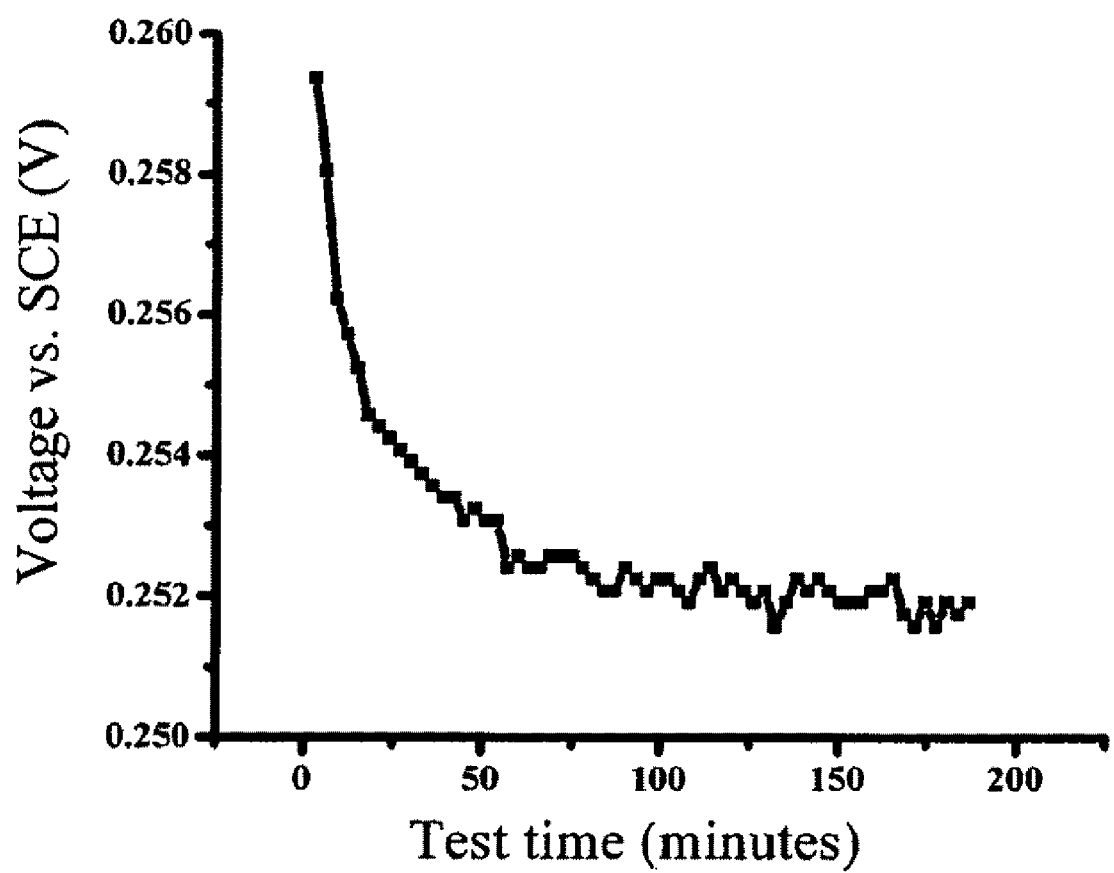
FIG. 9 presents a graph of voltage as a function of time for coffee extract in 1M sodium chloride solution.

The reduction potential of caffeine is ~0.3 V vs. SCE (see FIG. 9) which is sufficient to reduce metals viz. Pd (reduction potential 0.915 V vs. SCE), Ag (reduction potential 0.80 V vs. SCE), and also for reducing $Au^{+3}$ to $Au^0$ (reduction potential is 1.50 V vs. SCE) and Pt (reduction potential 1.20 V vs. SCE). The formation of Ag and Pd nanoparticles with caffeine is understood to take place via the following steps:
  complexation with Ag and Pd metal salts
  simultaneous reduction of $Ag^+$ and Pd metal and formation of capping with oxidized caffeine.

Figure 10:
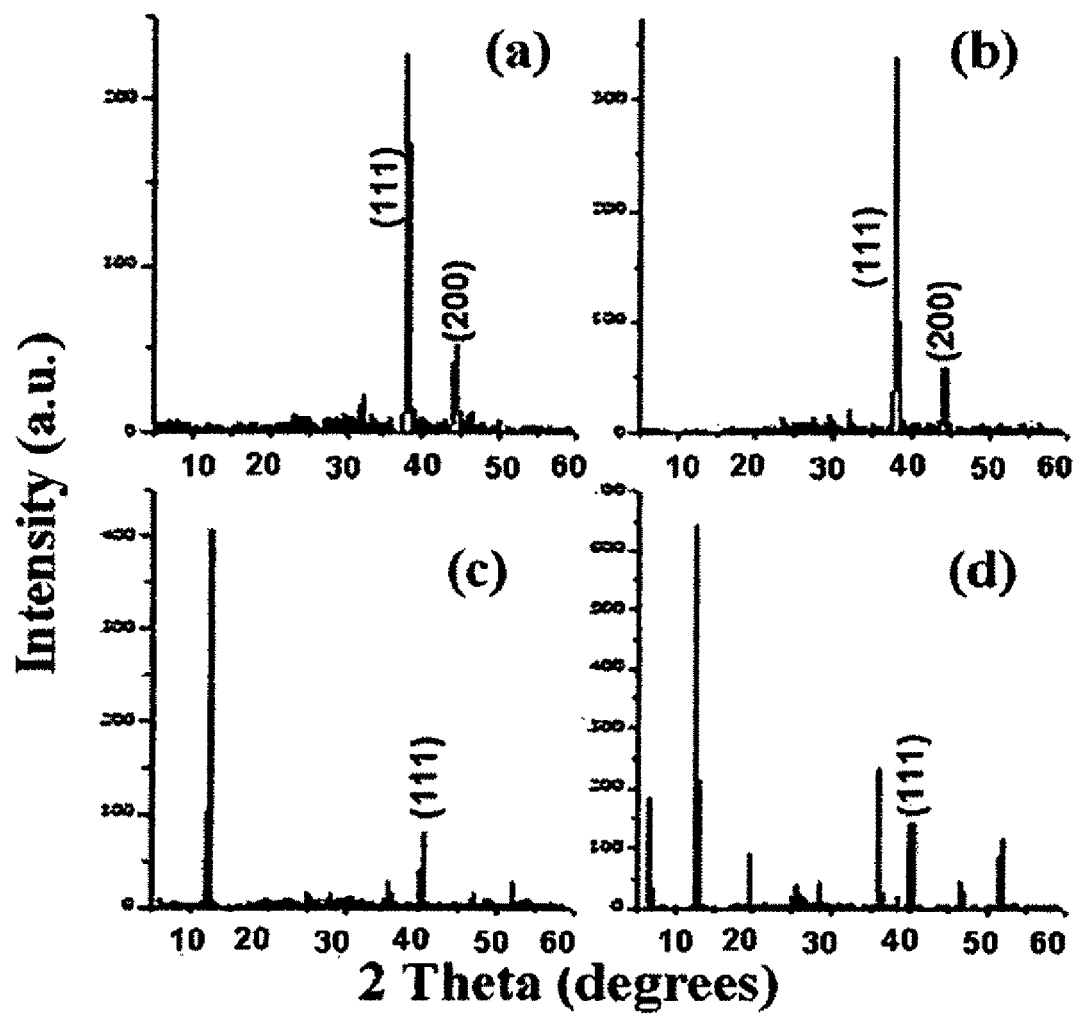
FIG. 10 presents a graph of intensity as a function of 2 theta angle for silver and palladium nanoparticles in coffee and tea extract. (a) Silver nanoparticles from coffee extract. (b) Silver nanoparticles from tea extract. (c) Palladium nanoparticles from coffee extract. (d) Palladium nanoparticles from tea extract.

FIG. 10a-d shows the XRD patterns of Ag and Pd nanoparticles obtained from coffee and tea extract, respectively, from an aqueous solution drop coated film on glass plate. From the XRD patterns, prominent Bragg reflections at 2θ values of 38.3 and 42.6 were observed which correspond to the (111) and (200) Bragg reflections of face centered cubic (fcc) Ag nanoparticles (FIG. 10a-b). See, e.g., Y. Sun and Y. Xia, Science, 2002, 298, 2176. However, in the case of Pd nanoparticles, layered structures of caffeine remained with a well-developed progression of intense reflections, which are successive orders of diffraction with a large d spacing (see FIG. 10c-d). See, L. M. Juliano and R. R. Griffiths, Psychopharmacology, 2004, 176, 1. The diffraction patterns can be interpreted to depict a crystal structure in which Pd and caffeine molecules occur in regularly stacked layers with a large interlayer lattice dimension, and relatively small distances in the interlayer two-dimensional lattice. The presence of narrow interlayer reflections indicates that there is crystallographic registry of layers.

Example 8

Green Synthesis of Nanoscale Bimetallic Zero Valent Metals

Methods according to the invention, similar to those described above, can be used to manufacture bimetallic nZV materials. For example, bimetallic metal nZV materials can be made by adding additional metal salts to the base metal salt used. In the case of nZV iron, palladium, nickel, silver, and other metals can be used to develop bimetallic nanoparticles. The uses of these materials can be substantially similar to those described above. The methods described herein can also be used to prepare nZV particles comprising three or more metals, as would be appreciated by a person of ordinary skill in the art.

The preparation of bimetallic nanoparticles from metal salts is generally carried out using one of two methods: 1) co-reduction and 2) successive reduction of two metal salts. Successive reduction can be carried out to prepare core-shell structured bimetallic nanoparticles. Co-reduction is the simpler preparative method for bimetallic nanoparticles. In this process, first the metal ions coordinate with green tea/coffee extract, and then reduction occurs. Addition of a second metal salt and subsequent reduction with excess stabilizing green tea/coffee extract results in the formation of core-shell structure. The formation of core-shell structure will depend upon the metal salts used and the reducing/stabilizing agent used in the preparation.

The plant extracts according to the invention may be aqueous plant extracts from a wide variety of plant materials, obtained in water from cold to boiling temperatures, with or without mild surfactants and with or without cosolvents, e.g., ethanol or d-limonene, to facilitate extraction. The extracts may be crude, or may be further purified, as with catechins. The extracts generally exhibit high anti-oxidant and/or polyphenol concentrations sufficient to form nanoparticles of metal according to the invention.

Example 9

Degradation of Bromothymol Blue by "Greener" Nano-Scale Zerovalent Iron Synthesized Using Tea Polyphenols The focus of this study is to compare the degradation of bromothymol blue, a model contaminant, by green tea synthesized nano-scale zero valent iron (GT-nZVI), Fe-EDTA (Fe-ethylenediamine tetraacetate), and Fe-EDDS (Fe—(S,S)-ethylene diamine-N,N'-disuccinic Acid) catalyzed hydrogen peroxide. The degradation of the model contaminant is monitored, allowing for the determination of rate constants at various concentrations of iron. The following green single-step synthesis of iron nanoparticles using tea (Camellia sinensis) polyphenols uses no additional surfactants/polymers as capping or reducing agents. The tea extract (polyphenols) used in this study functions both as a reducing and capping agent for Fe. It has additional advantages due to its high water solubility, low toxicity, and biodegradability. The reaction between polyphenols and ferric nitrate occurs within a few minutes at room temperature, as indicated by color changes from pale yellow to dark greenish/black in the formation of iron nanoparticles.

Bromothymol blue, a commonly deployed pH indicator, is used here as a model contaminant for free radical reactions, due to its stability in the presence of $H_2O_2$ and its absorbance in the visible range at pH 6. The concentration of bromothymol blue is conveniently monitored using ultraviolet-visible (UV-Vis) spectroscopy during treatment with iron-catalyzed $H_2O_2$. Various concentrations of iron are tested to allow for the determination of initial rate constants for the different iron sources.

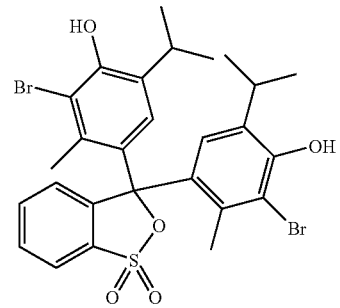

Bromothymol Blue

This new synthetic method is an extremely simple green approach that generates bulk quantities of relatively stable nanocrystals of iron (Fe) using tea extract at room temperature.

Green tea extract was prepared by heating 20 g/L green tea to 80° C. followed by vacuum filtration. A solution of 0.1M $FeCl_3$ was prepared by dissolving 16.2 g of solid $FeCl_3$ (Acros Organics) in 1 L of deionized water. Green tea synthesized nano-scale zero valent iron (GT-nZVI) was then prepared by adding 0.1M $FeCl_3$ to 20 g/L green tea in a 2:1 volume ratio, resulting in a 66 mM Fe concentration in the final GT-nZVI solution.

Solutions of Fe-EDTA and Fe-EDDS were prepared at 350 mg/L as iron. Fe-EDTA was prepared by dissolving 0.2378 g of ethylenediamine tetraacetate (EDTA) (Fisher) in deionized water followed by 0.1737 g of $FeSO_4$ (Fisher). $H_2SO_4$ was then added to the solution, drop-wise, until it turned a pale green color. The solution was then brought to a total volume of 100 mL with deionized water. Fe-EDDS was prepared in the same manner using 0.2239 g of (S,S)-ethylene diamine-N,N'-disuccinic Acid (EDDS) and 0.1737 g of $FeSO_4$. An unstabilized 30% $H_2O_2$ solution was obtained from Fisher. A 500 ppm bromothymol blue solution was prepared by dissolving 50 mg bromothymol blue (Aldrich) in 100 mL of deionized water.

The reaction vessel used for all experiments was a quartz cuvette. Ultraviolet-visible absorbance measurements were made throughout the experiment with a photodiode array scanning spectrophotometer (Beckman). Three iron sources were tested at various concentrations as a catalyst for the formation of $H_2O_2$ free radicals: GT-nZVI, Fe-EDTA, and Fe-EDDS. Before each trial, a blank was read which included 3 mL deionized water with the appropriate iron source and concentration. A clean cuvette was then loaded with 3 mL of 500 ppm bromothymol blue and $H_2O_2$ was added. With the cuvette in the spectrophotometer, the iron source was added to the solution and quickly mixed with the pipette. Scans were started immediately after the injection of the iron source and the solution was left untouched until completion.

The first series of experiments examined the degradation of bromothymol blue with GT-nZVI catalyzed $H_2O_2$ at various nano-scale iron concentrations. The second and third series of experiments examined the degradation of bromothymol blue with Fe-EDTA catalyzed $H_2O_2$ and Fe-EDDS catalyzed $H_2O_2$, respectively. A 2% $H_2O_2$ concentration was used for all experiments. Experiments were conducted using GT-nZVI concentrations at 0.03 mM, 0.06 mM, 0.12 mM, and 0.33 mM as Fe. Similarly, experiments using Fe-EDTA and Fe-EDDS had concentrations at 0.12 mM, 0.33 mM, and 0.5 mM; an additional concentration of 0.66 mM as Fe was also used for Fe-EDDS.

Figure 22:
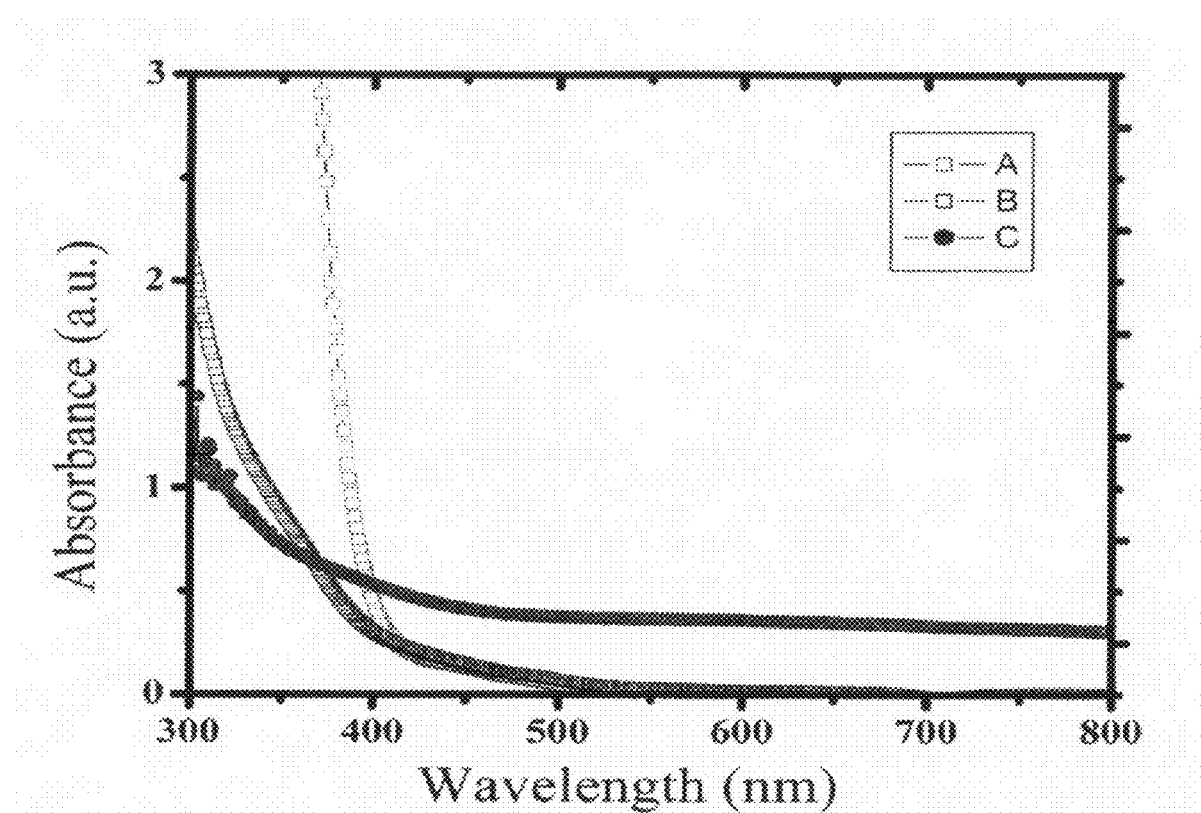
FIG. 22 presents a graph depicting UV spectra of (a) Fe, (b) tea extract and (c) reaction product of $Fe(NO_3)_3$ and tea extract. Inset shows the photographic image of the reaction.
Figure 23:
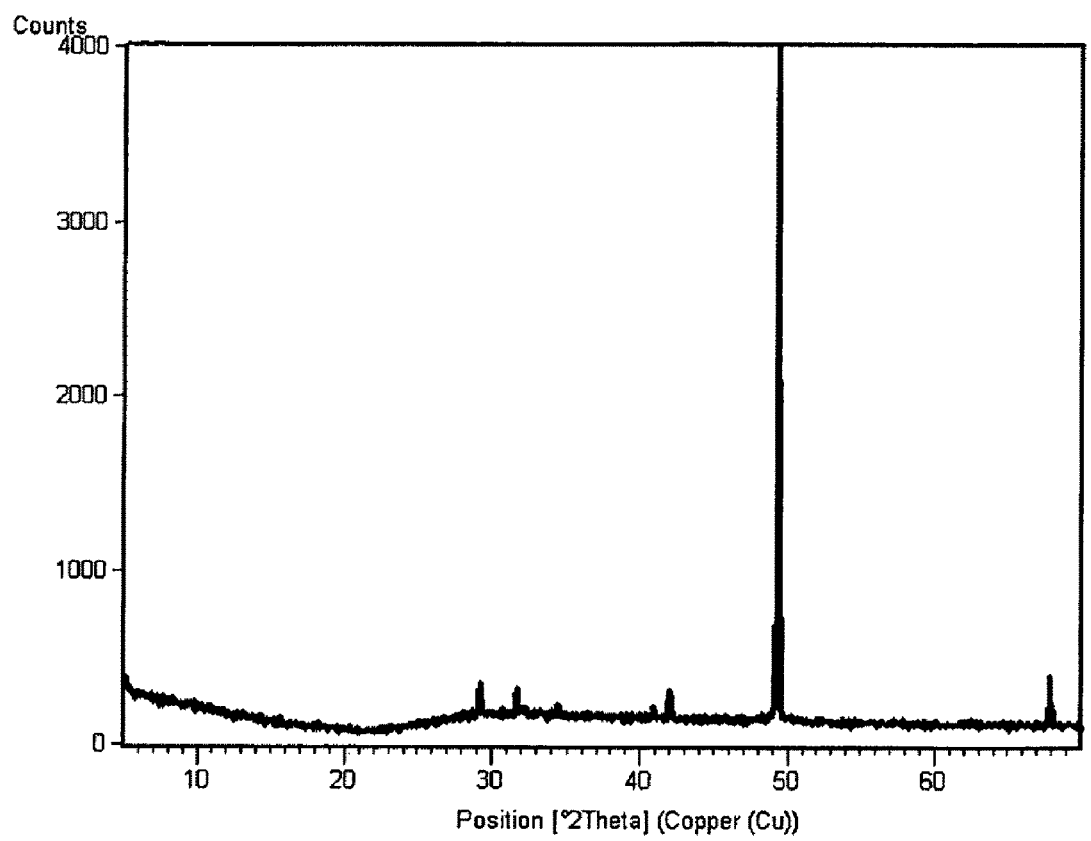
FIG. 23 presents a representative XRD pattern of iron nanoparticles synthesized using tea extract.

The reduction potential of caffeine is 0.3 V vs. SCE which is sufficient to reduce metals viz. Fe (reduction potential −0.44 V vs. SCE). The formation of Fe nanoparticles with caffeine/polyphenols is understood to occur via the following steps: (1) complexation with Fe salts, (2) simultaneous reduction of Fe (+III) capping with oxidized polyphenols/caffeine. The reduction of Fe was confirmed using UV spectra and is shown in FIG. 22. The blank extract has an absorption beginning at 500 nm which is similar to the control $Fe(NO_3)_3$ solutions. The reaction between $Fe(NO_3)_3$ and tea extract was instantaneous and the color of the reaction mixture changed from yellow to dark brown as shown in the inset of FIG. 22. This general approach was explored using other common salts of iron as the source of dissolved Fe, namely $FeCl_3$, $FeSO_4$, and FeEDTA. A variety of additional plant sources of polyphenols have also been used including several herbs including lemon balm (*Melissa officinalis*), and parsley (*Crispum crispum*) and grains, for example sorghum bran (*Sorghum* spp.). After the reaction, the UV spectra had broad absorption at a higher wavelength and there was no sharp absorption at lower wavelengths as occurred in the controls. Representative XRD pattern of the iron nanoparticles is shown in FIG. 23 and the pattern was compared with JCPDS pattern 00-050-1275. The highest intensity plane (102) is well-matched with the reported pattern. However, other additional reflections were very weak, possibly due to preferred orientation of the iron nanoparticles. Some small additional peaks were noted, which may correspond to impurities originating from the tea extract.

Figure 24:
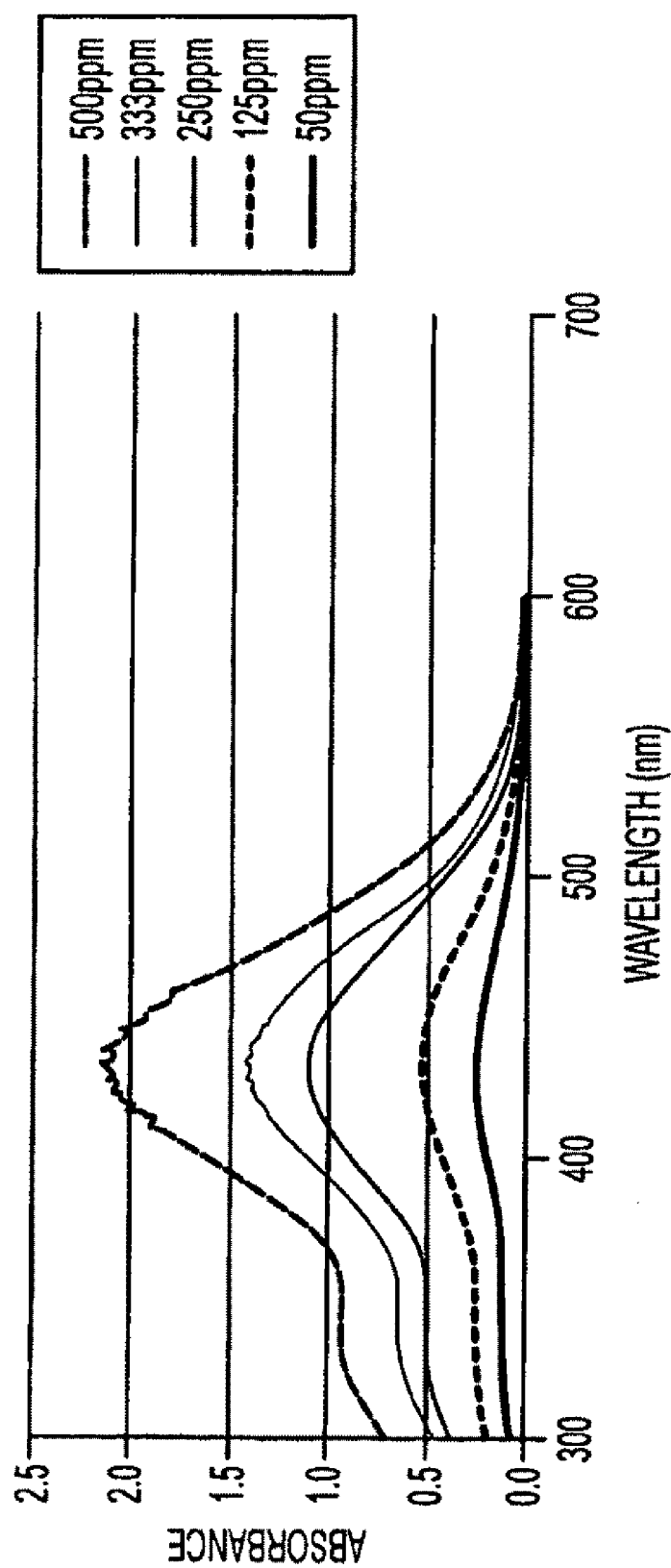
FIG. 24 presents a graph depicting concentration-dependent bromothymol blue dye absorbance.
Figure 33:
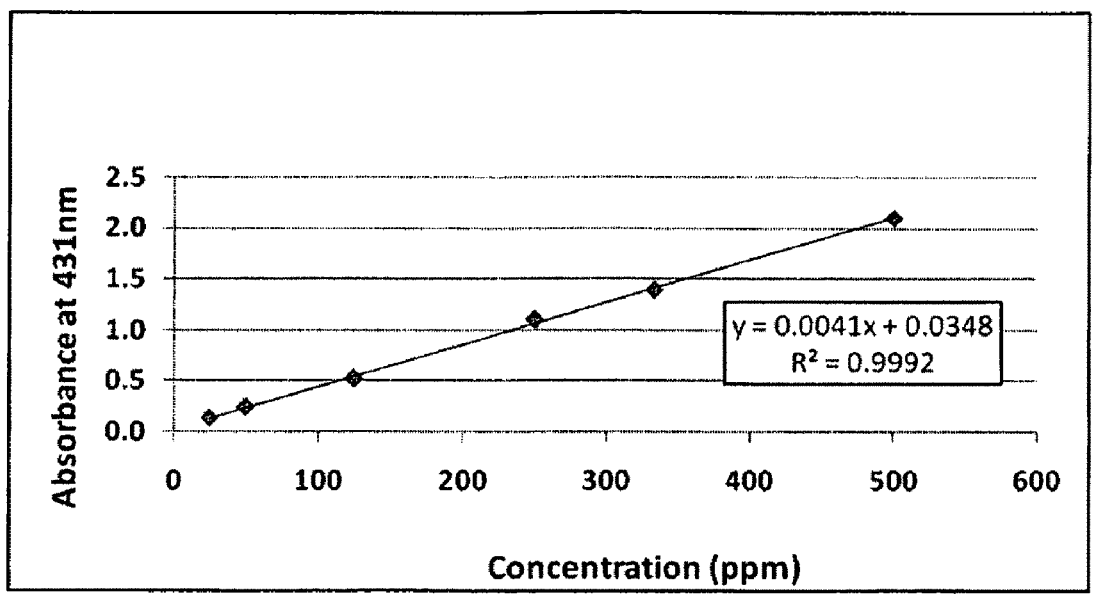
FIG. 33 presents a graph depicting the concentration dependent absorption of bromothymol blue (pH<6) (Standard curve).

These iron nanoparticles were tested as a catalyst for the oxidation of bromothymol blue. The bromothymol has an absorption in the visible region which is concentration-dependent (see FIGS. 24 and 33).

Figure 25:
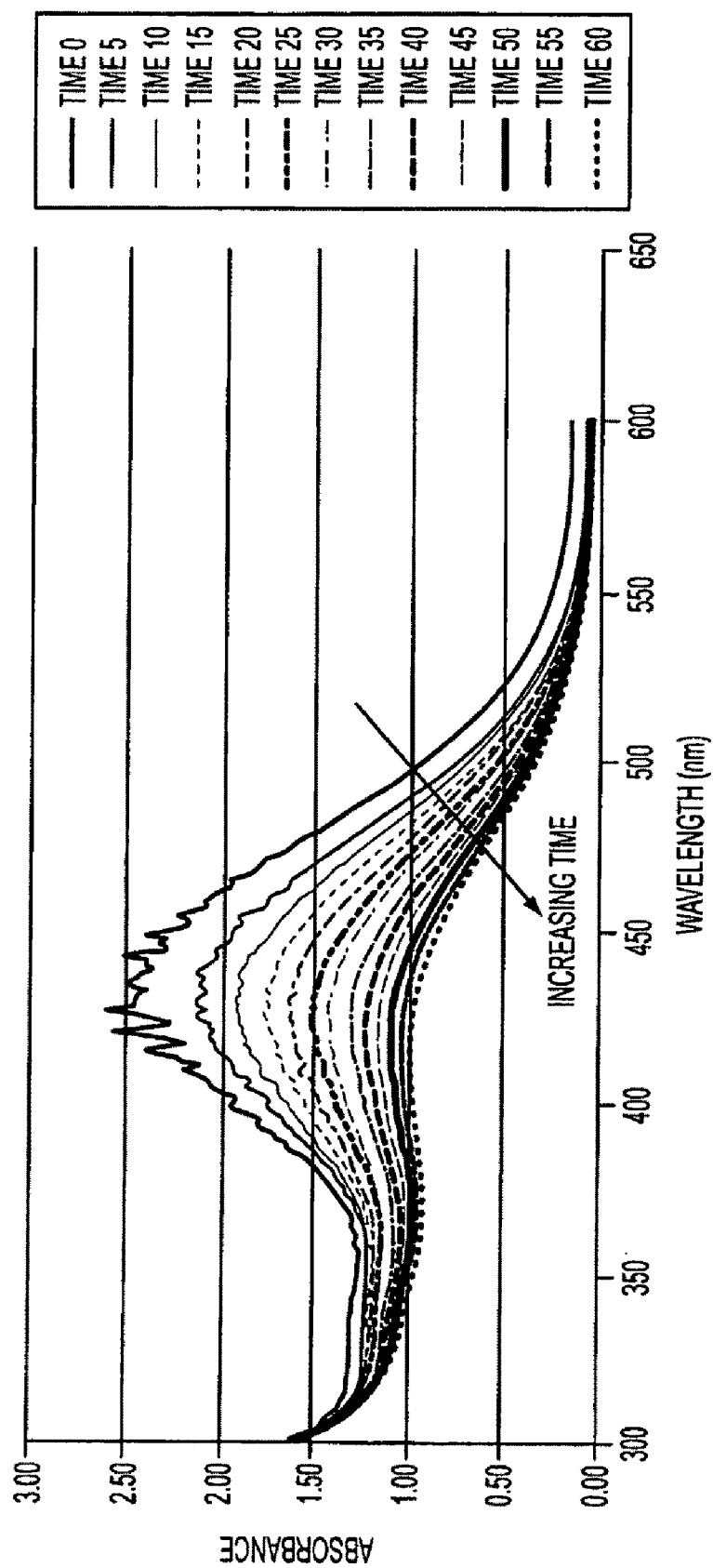
FIG. 25 presents a graph depicting UV-Vis Spectra (Absorbance versus Wavelength) of bromothymol blue over time for an initial solution containing 500 ppm bromothymol blue (pH 6), 2% $H_2O_2$, and 0.06 mM GT-nZVI.
Figure 26:
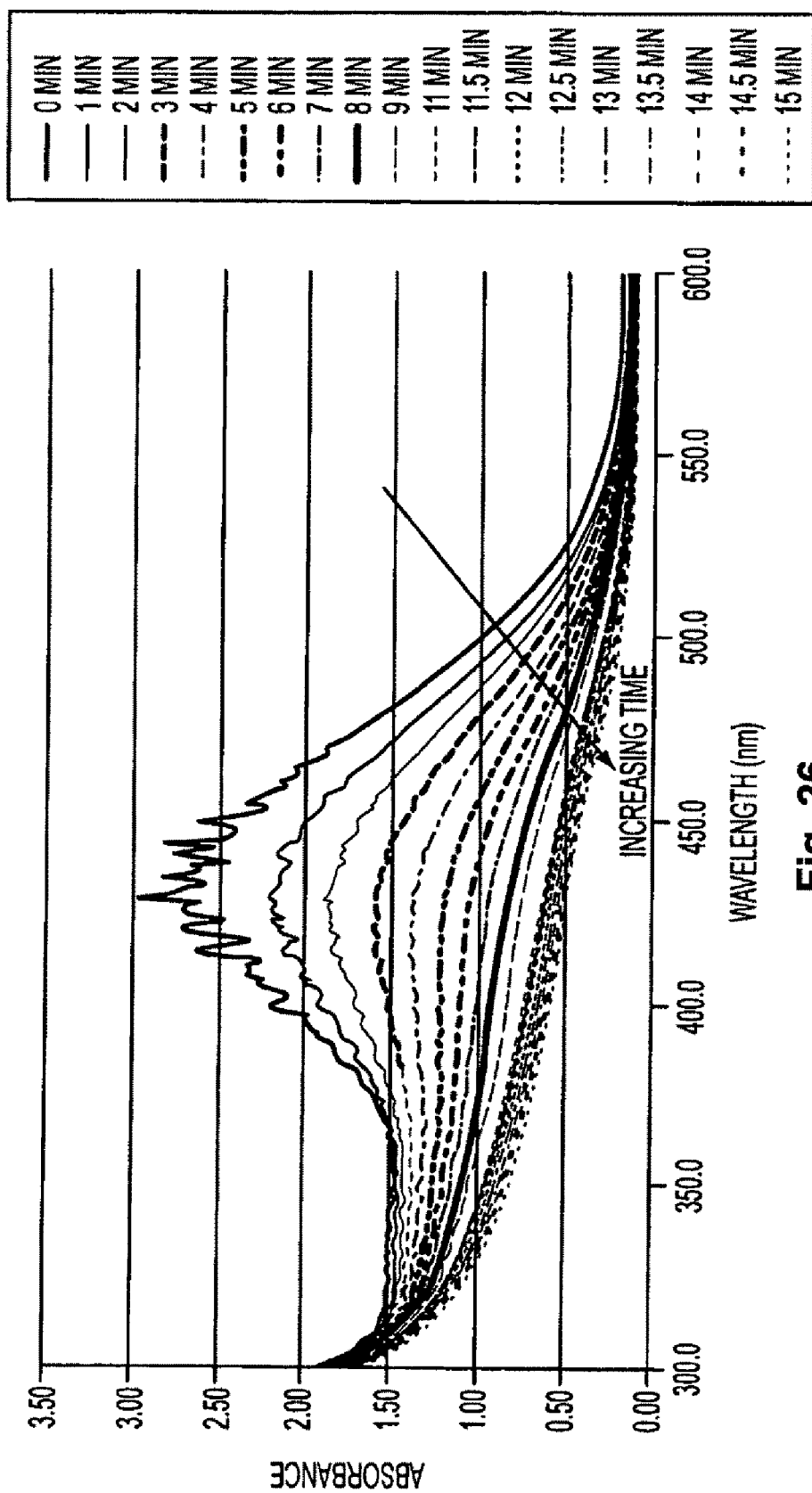
FIG. 26 presents a graph depicting UV-Vis Spectra of bromothymol blue over time for an initial solution containing 500 ppm bromothymol blue (pH 6), 2% $H_2O_2$, and 0.33 mM GT-nZVI.

Initial bromothymol blue concentration was 500 mg/L and with 2% hydrogen peroxide, bromothymol blue did not undergo any degradation/catalysis, confirming the lack of a direct oxidation pathway by peroxide. A similar bromothymol blue concentration was tested using different iron concentrations for peroxide catalysis and is shown in FIGS. 25 and 26. The maximum absorbance, at 431 nm, is at time zero and decreases with every scan over time, demonstrating the free radical oxidation of bromothymol blue. Higher iron concentrations accelerated the degradation of bromothymol blue.

Figure 27:
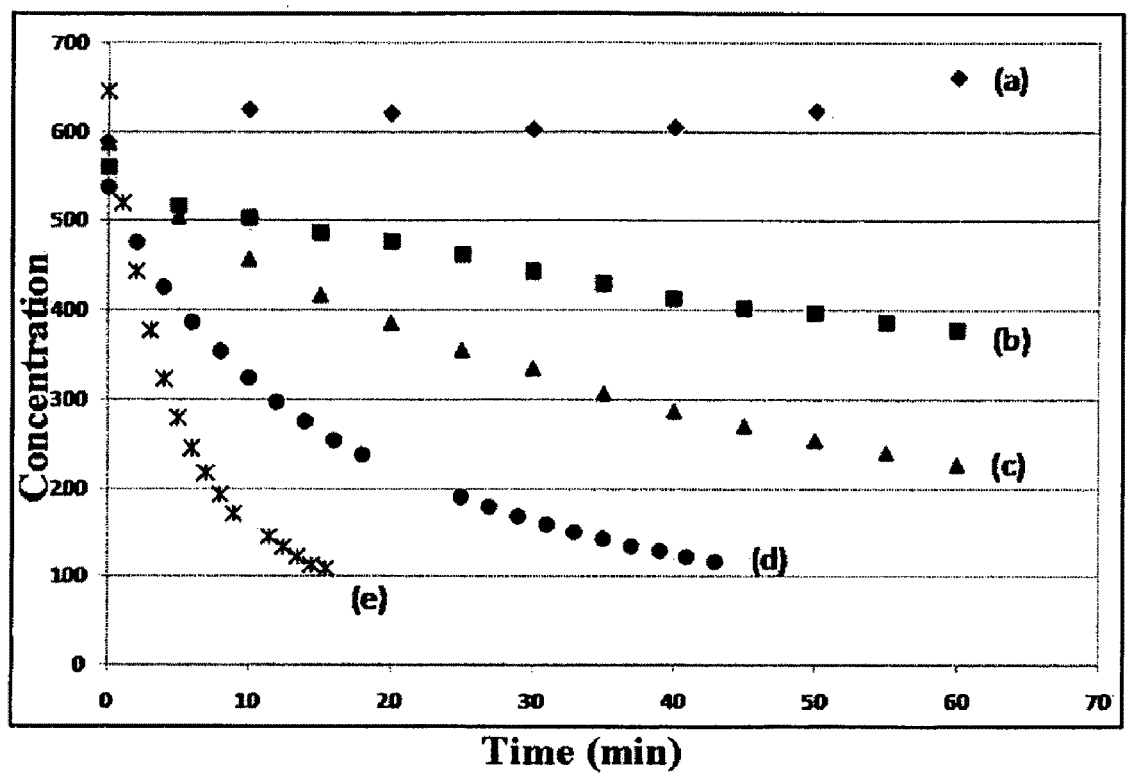
FIG. 27 presents a graph of concentration versus time depicting degradation of bromothymol blue with GT-nZVI catalyzed $H_2O_2$, (a) bromothymol blue with 2% peroxide solution—control, (b) bromothymol blue treated with 0.03 mM (as Fe) GT-nZVI catalyzed hydrogen peroxide (HP) (2%), (c) bromothymol blue treated with 0.06 mM (as Fe) GT-nZVI catalyzed HP (2%), (d) bromothymol blue treated with 0.12 mM (as Fe) GT-nZVI catalyzed HP (2%), (e) bromothymol blue treated with 0.33 mM (as Fe) GT-nZVI catalyzed HP (2%).

The changes in the concentration of the bromothymol blue (pH 6) at different time intervals is illustrated in FIG. 27. Graphs (a) through (e) represent GT-nZVI concentrations in 2% hydrogen peroxide, as set forth in Table 5. The time series graphs demonstrate how bromothymol blue degrades over time in the presence of 2% $H_2O_2$ and 0.03, 0.06, 0.12 and 0.33 mM GT-nZVI respectively. Experimental rate constants of bromothymol blue oxidation are obtained by monitoring the change in absorbance at 431.

Figure 28:
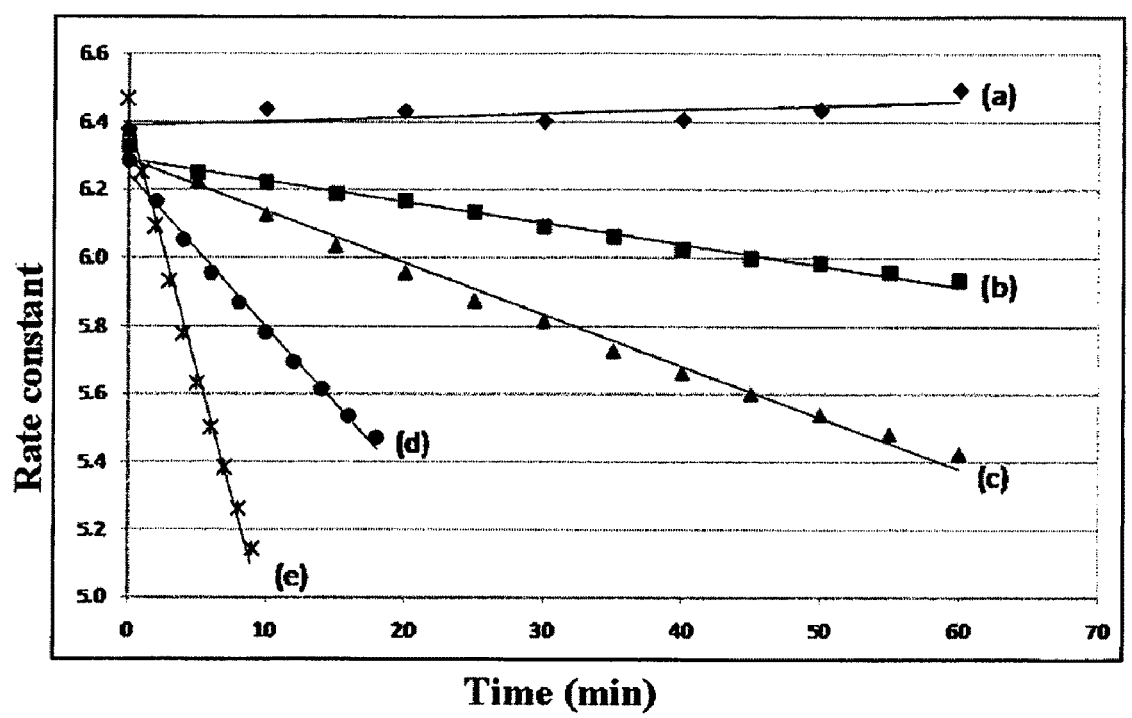
FIG. 28 presents initial rates, in ln [BTB] vs. time, of decomposition of bromothymol blue with GT-nZVI catalyzed $H_2O_2$. (a) bromothymol blue with 2% peroxide solution—control, (b) bromothymol blue treated with 0.03 mM (as Fe) GT-nZVI catalyzed HP (2%), (c) bromothymol blue treated with 0.06 mM (as Fe) GT-nZVI catalyzed HP (2%), (d) bromothymol blue treated with 0.12 mM (as Fe) GT-nZVI catalyzed HP (2%), (e) bromothymol blue treated with 0.33 mM (as Fe) GT-nZVI catalyzed HP (2%).

The fastest degradation of bromothymol blue by catalyzed $H_2O_2$ occurred with Fe GT-nZVI at a concentration of 0.33 mM. A linear relationship is determined between the natural log of bromothymol blue concentration (ln [BTB]) and time, indicating a first order reaction with respect to bromothymol blue concentration, as shown in FIG. 28. The rate constants increase between 0.0062 $min^{-1}$ at 0.03 mM GT-nZVI, to 0.1448 $min^{-1}$ at 0.33 mM GT-nZVI (Table 5).

TABLE 5

Initial rates of decomposition of bromothymol blue with GT-nZVI catalyzed $H_2O_2$.

| Graph | GT-nZVI (mM as Fe) | Rate ($min^{-1}$) | $R^2$ |
|---|---|---|---|
| (a) | 0 | −0.0011 | 0.4376 |
| (b) | 0.03 | 0.0062 | 0.9842 |
| (c) | 0.06 | 0.0152 | 0.9859 |
| (d) | 0.12 | 0.0449 | 0.9938 |
| (e) | 0.33 | 0.1448 | 0.9925 |

Figure 29:
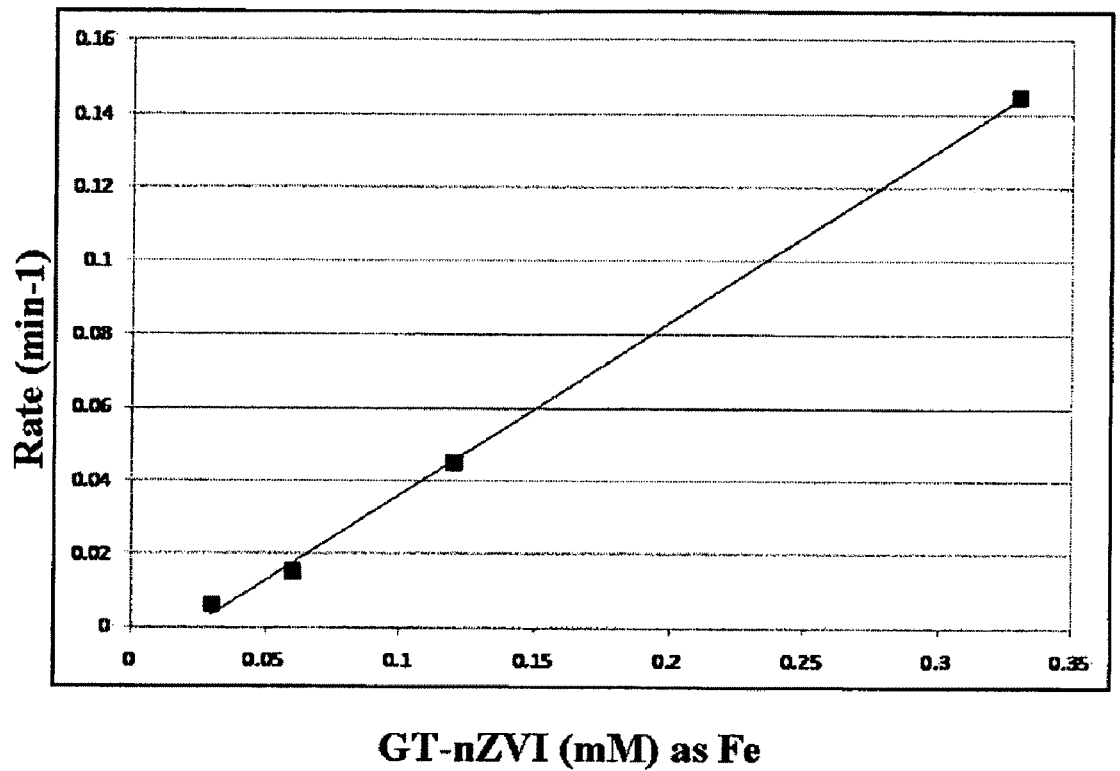
FIG. 29 presents the initial rate constants for the decomposition of bromothymol blue with GT-nZVI catalyzed $H_2O_2$ as a function of Fe concentration, expressed in terms of rate ($min^{-1}$) versus GT-nZVI concentration (mM) as Fe ($y=0.4694x-0.0106 R^2=0.9989$).

FIG. 29 illustrates the linear relationship between the initial rate constants and GT-nZVI concentrations. The highly linear relationship of the initial bromothymol blue oxidative rate constants ($R^2$=0.9989) for a 2% hydrogen peroxide concentration over a range of Fe concentrations (0.03 mM to 0.33 mM) demonstrates the activity of these heterogeneous catalysts, with initial rate constants varying from 0.0062 to 0.1448 $min^{-1}$.

Figure 30:
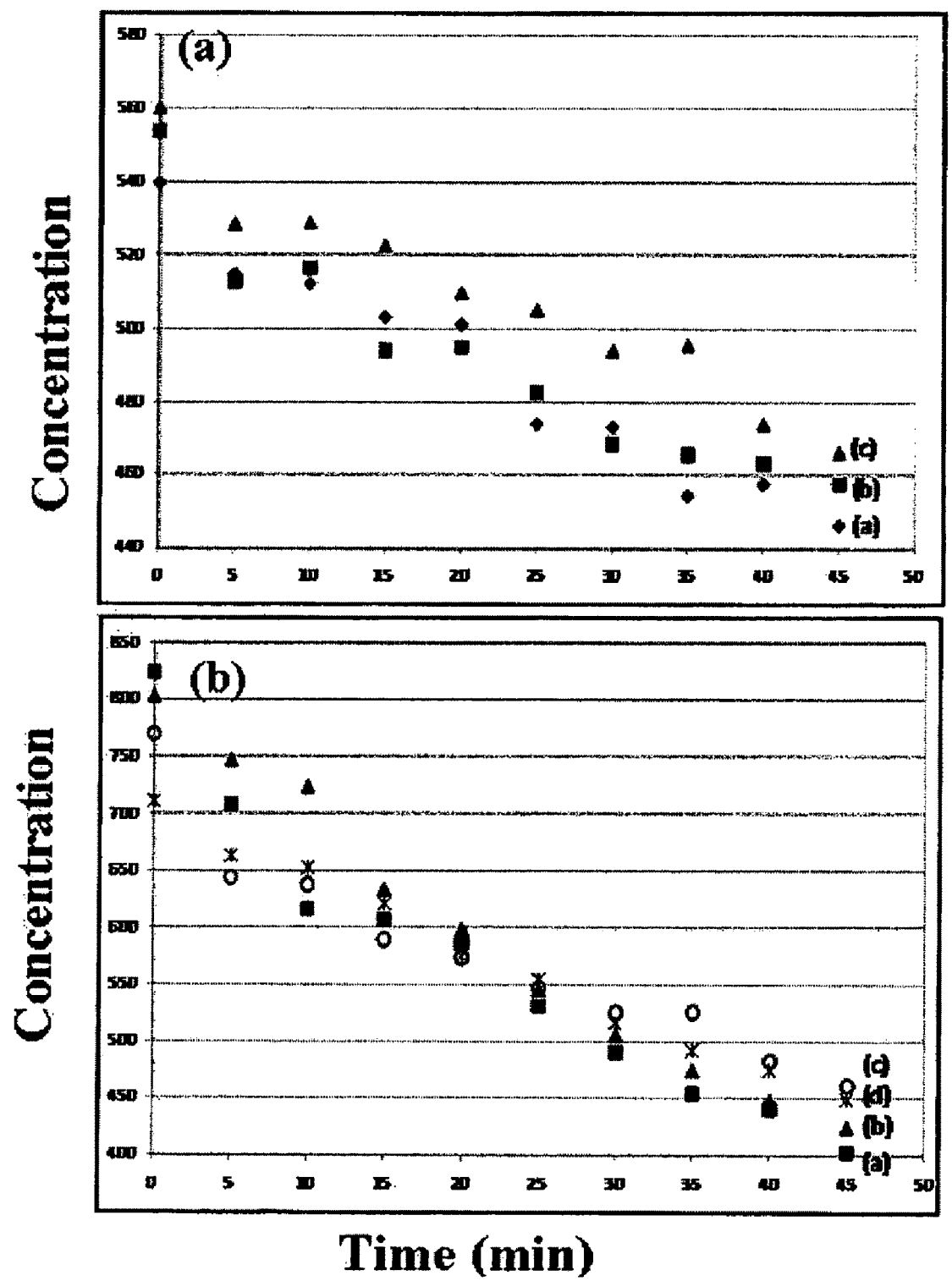
FIG. 30 presents the degradation of bromothymol blue concentration over time with Fe-EDTA and Fe-EDDS catalyzed $H_2O_2$. (a) bromothymol blue treated with 0.12 mM Fe catalyzed HP (2%), (b) bromothymol blue treated with 0.33 mM as Fe catalyzed HP (2%), (c) bromothymol blue treated with 0.50 mM as Fe catalyzed HP (2%), (d) bromothymol blue treated with 0.66 mM as Fe (Fe-EDDS only) catalyzed HP (2%).

The degradation of bromothymol blue over time with Fe-EDTA and Fe-EDDS catalyzed 2% $H_2O_2$, at four different Fe concentrations is shown in FIG. 30. FIG. 30 presents the degradation of bromothymol blue concentration over time with Fe-EDTA (graph (a)) and Fe-EDDS (graph (b)) catalyzed $H_2O_2$. (a) bromothymol blue treated with 0.12 mM Fe catalyzed HP (2%), (b) bromothymol blue treated with 0.33 mM as Fe catalyzed HP (2%), (c) bromothymol blue treated with 0.50 mM as Fe catalyzed HP (2%), (d) bromothymol blue treated with 0.66 mM as Fe (Fe-EDDS only) catalyzed HP (2%).

Figure 31:
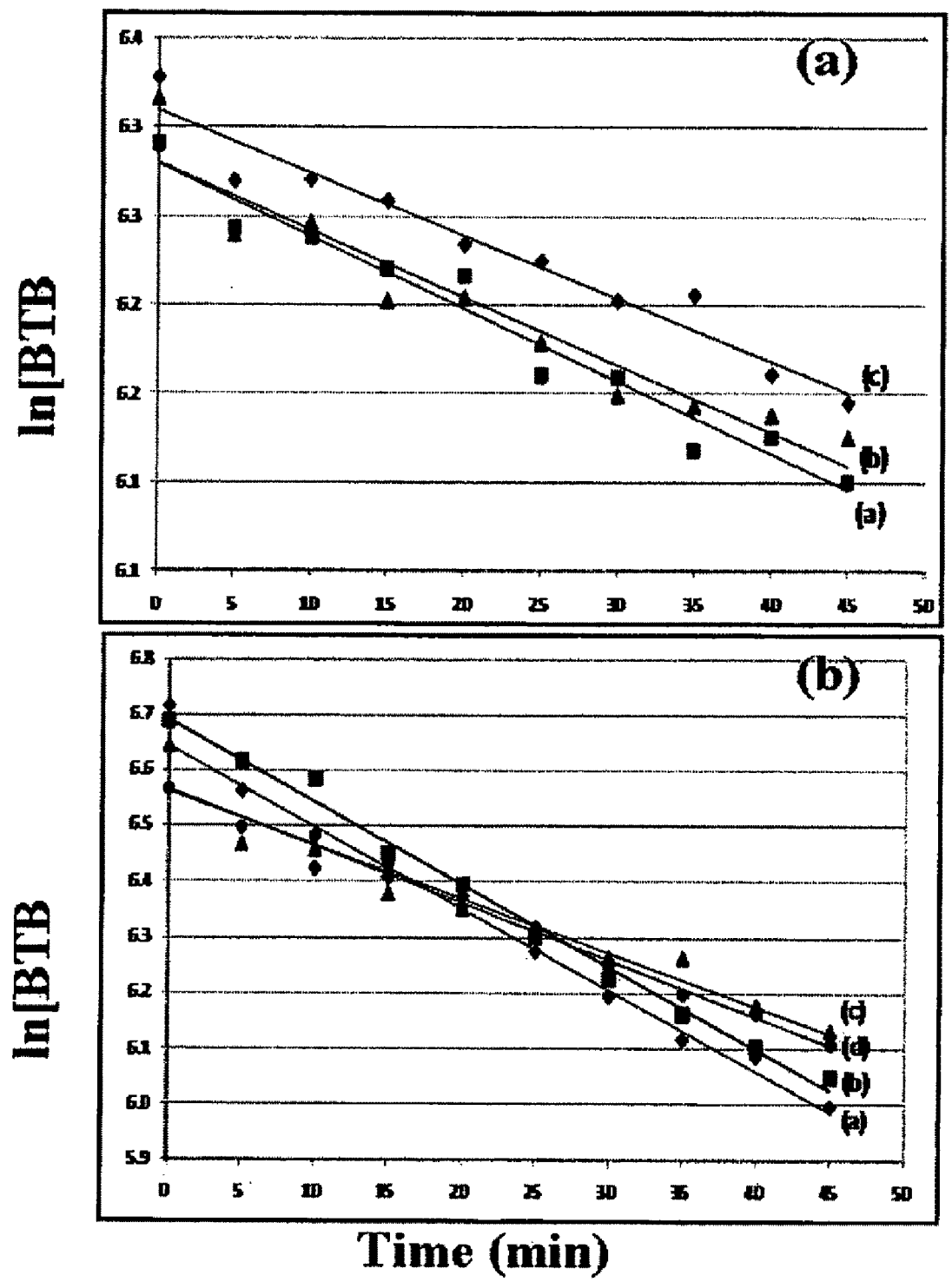
FIG. 31 presents the initial rates, expressed in terms of ln [BTB] versus time, of decomposition of bromothymol blue with Fe-EDTA and Fe-EDDS catalyzed $H_2O_2$. (a) bromothymol blue treated with 0.12 mM Fe catalyzed HP (2%), (b) bromothymol blue treated with 0.33 mM as Fe catalyzed HP (2%), (c) bromothymol blue treated with 0.50 mM as Fe catalyzed HP (2%), (d) bromothymol blue treated with 0.66 mM as Fe (Fe-EDDS only) catalyzed HP (2%).

Initial rate constants for these reactions were obtained by plotting ln [BTB] as a function of Fe-EDTA or -EDDS concentrations (as Fe). Over the range of Fe concentrations tested, the results suggest a decrease in the rate of bromothymol blue degradation with increasing amounts of Fe, as shown in FIG. 31. Because EDTA and EDDS have the ability to stabilize $H_2O_2$, increasing concentrations of Fe-EDTA or -EDDS result in an increase in the stabilization of $H_2O_2$. This increase in $H_2O_2$ stabilization slows the decomposition of $H_2O_2$ and the production of hydroxyl radicals, ultimately slowing the oxidation of bromothymol blue (Tables 6 and 7).

TABLE 6

Initial rates of decomposition of bromothymol blue with Fe-EDTA.

| Sl No. | Fe-EDTA (mM as Fe) | Rate ($min^{-1}$) | $R^2$ |
|---|---|---|---|
| (a) | 0.12 | 0.041 | 0.96 |
| (b) | 0.33 | 0.0038 | 0.9104 |
| (c) | 0.5 | 0.0035 | 0.9502 |

TABLE 7

Initial rates of decomposition of bromothymol
blue Fe-EDDS catalyzed $H_2O_2$.

| Sl No. | Fe-EDDS (mM as Fe) | Rate (min$^{-1}$) | $R^2$ |
|---|---|---|---|
| (a) | 0.12 | 0.0146 | 0.9742 |
| (b) | 0.33 | 0.0148 | 0.9375 |
| (c) | 0.5 | 0.0097 | 0.9936 |
| (d) | 0.66 | 0.0103 | 0.9502 |

Figure 32:
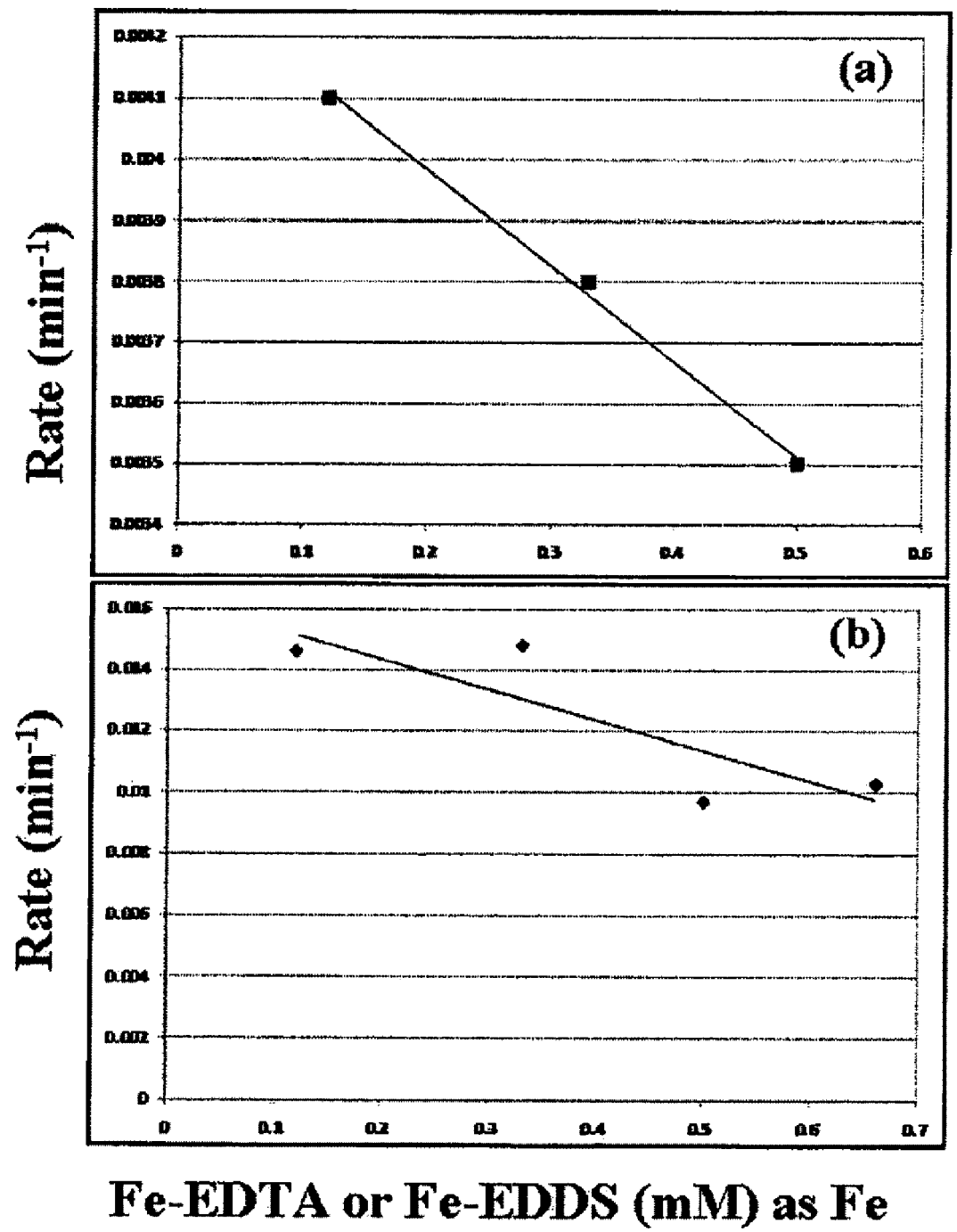
FIG. 32 presents the initial rate constants for the decomposition of bromothymol blue as a function of Fe concentration, with Fe-EDTA and Fe-EDDS: Rate ($min^{-1}$) vs Fe-EDTA or Fe-EDDS (mM) as Fe. Fe-EDTA: $y=-0.0016x+0.0043$ ($R^2=0.9963$), Fe-EDDS: $y=-0.0099x+0.0164$ ($R^2=0.7135$).

FIG. 32 shows the relationship between initial rate constants and the concentration (as Fe) of Fe-EDTA and Fe-EDDS. Initial rate constants for the Fe-EDTA catalyzed peroxide varied from 0.0035 to 0.0041 min$^{-1}$ and Fe-EDDS initial rate constants varied from 0.0097 to 0.0148 min$^{-1}$. It is apparent that the initial rate constants for the oxidation of the bromothymol blue were much greater with the GT-nZVI catalyst than with Fe-EDTA or Fe-EDDS. At a Fe concentration of 0.33 mM and a hydrogen peroxide concentration of 0.33 mM, the initial rate constants for bromothymol blue oxidation were 0.1447, 0.0038 and 0.0148 for the catalysts GT-nZVI, FeEDTA and FeEDDS, respectively. The comparative rate constants for bromothymol blue oxidation using a GT-nZVI catalyst were more than an order of magnitude greater than with Fe-EDTA and Fe-EDDS.

Example 10

Green Synthesis of Au Nanostructures at Room Temperature Using Biodegradable Plant Surfactants The following describes a convenient one-step room-temperature green synthesis of gold (Au) nanostructures with different morphologies and sizes (i.e., spheres, prisms, and hexagonal structures), which are readily prepared from inexpensive starting materials including plant-based naturally-occurring biodegradable surfactants and cosolvents in water without using any additional capping or reducing reagent. The sizes vary from nanometer to micron scale level depending on the plant extract used for the preparation. This synthesis concept can enable the fine-tuning of material responses to magnetic, electrical, optical, and mechanical stimuli.

Chloroauric acid tetrahydrate (HAuCl$_4$.4H2O) and methyl ammonium bromide was obtained from Aldrich chemical company. Plant extract were obtained from VeruTEK™ Technologies, Inc. of Bloomfield, Conn. VeruSOL-3™ is a mixture of d-limonene and plant-based surfactants. VeruSOL-10™, VeruSOL-11™ and VeruSOL-12™ are individual plant-based surfactants derived from coconut and castor oils. All of the chemicals were analytical grade and used without further purification. Doubly distilled water was used throughout the experiments.

Different concentrations of HAuCl$_4$ solutions were added to the solution of plant extracts at room temperature. This mixture was gently mixed, followed by rapid inversion mixing for 2 minutes. The composition of the reaction mixtures are shown in Table 8. Samples for UV spectroscopy measurements were reaction mixtures dispersed in distilled water. To obtain better SEM images, the product was drop-casted on carbon tape and allowed to dry. Transmission electron microscopy (TEM) was performed with a JEOL-1200 EX II microscope operated at 120 kV. Scanning electron microscopy (SEM) was carried out with a field-emission microscope (JEOL 8400 LV) operated at an accelerating voltage of 20 kV. Panalytical X-pert diffractometer with a copper Kα source was used to identify crystalline phases of the lead precipitates. The tube was operated at 45 kV and 40 mA for the analyses. Scans were performed over a 2-theta ranging from 5 to 70° with a step of 0.02° and a one-second count time at each step. Pattern analysis was performed by following ASTM procedures using the computer software Jade (Versions 8, Materials Data, Inc.), with reference to the 1995-2002 ICDD PDF-2 data files (International Center for Diffraction Data, Newtown Square, Pa.). UV spectra were recorded using Varian UV-visible spectrometer (Model Cary 50 Conc).

TABLE 8

Different compositions of reaction mixture

| Entry | Composition | Code |
|---|---|---|
| 1 | VeruSOL-3 ™ 2 mL + 4 mL HAuCl$_4$ | Au-1 |
| 2 | D-limonene 2 mL + 4 mL HAuCl$_4$ | Au-2 |
| 3 | VeruSOL-12 ™ 2 mL + 4 mL HAuCl$_4$ | Au-3 |
| 4 | VeruSOL-10 ™ 2 mL + 4 mL HAuCl$_4$ | Au-4 |
| 5 | VeruSOL-11 ™ 2 mL + 4 mL HAuCl$_4$ | Au-5 |
| 6 | VeruSOL-3 ™ 2 mL + 4 mL HAuCl$_4$ + 10 H$_2$O | Au-6 |
| 7 | D-limonene 2 mL + 4 mL HAuCl$_4$ + 10 H$_2$O | Au-7 |
| 8 | VeruSOL-12 ™ + 4 mL HAuCl$_4$ + 10 H$_2$O | Au-8 |
| 9 | VeruSOL-10 ™ + 4 mL HAuCl$_4$ + 10 H$_2$O | Au-9 |
| 10 | VeruSOL-11 ™ + 4 mL HAuCl$_4$ + 10 H$_2$O | Au-10 |
| 11 | VeruSOL-3 ™ 1 mL + 10 mL HAuCl$_4$ | Au-11 |
| 12 | D-limonene 1 mL + 10 mL HAuCl$_4$ | Au-12 |
| 13 | VeruSOL-12 ™ 1 mL + 10 mL HAuCl$_4$ | Au-13 |
| 14 | VeruSOL-10 ™ 1 mL + 10 mL HAuCl$_4$ | Au-14 |
| 15 | VeruSOL-11 ™ 1 mL + 10 mL HAuCl$_4$ | Au-15 |

Figure 34:
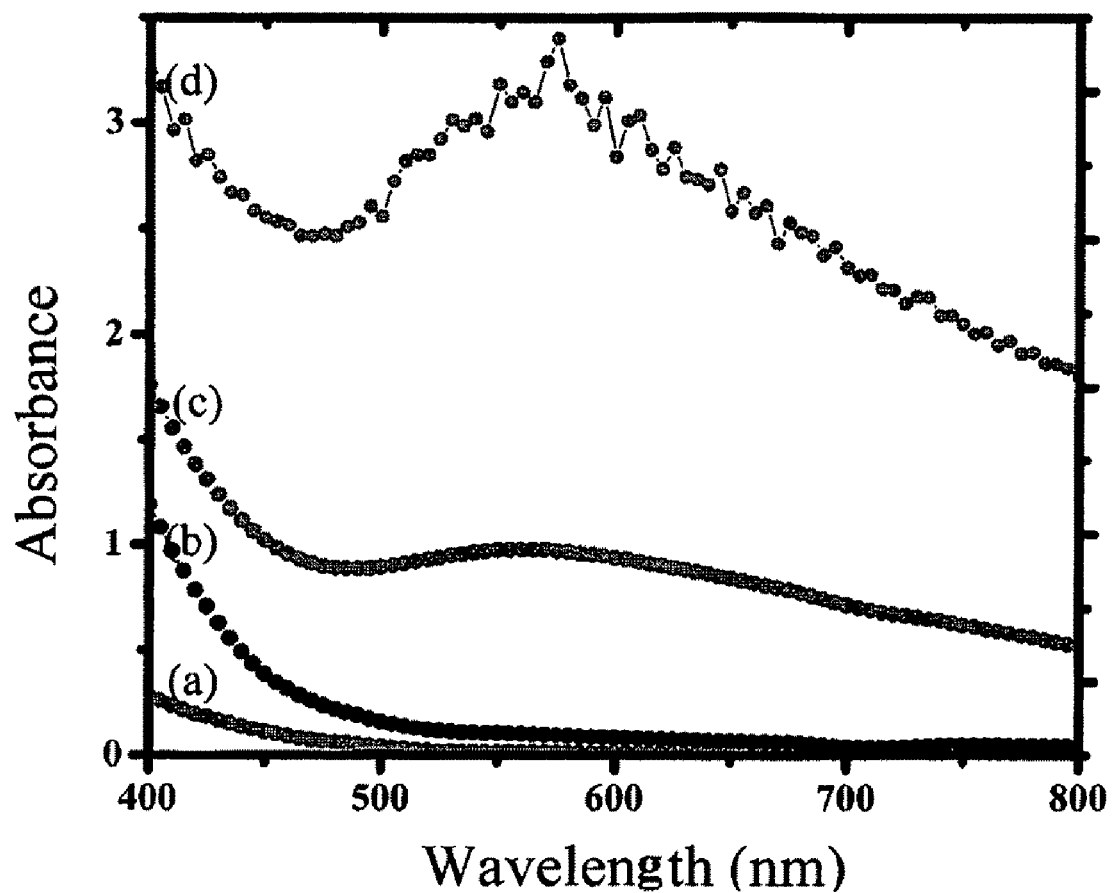
FIG. 34 presents a series of graphs depicting a time-dependent Au-10 reaction after (a) 0 minutes (control); (b) 1 minute; (c) 2 minutes; and (d) 3 minutes.
Figure 35:
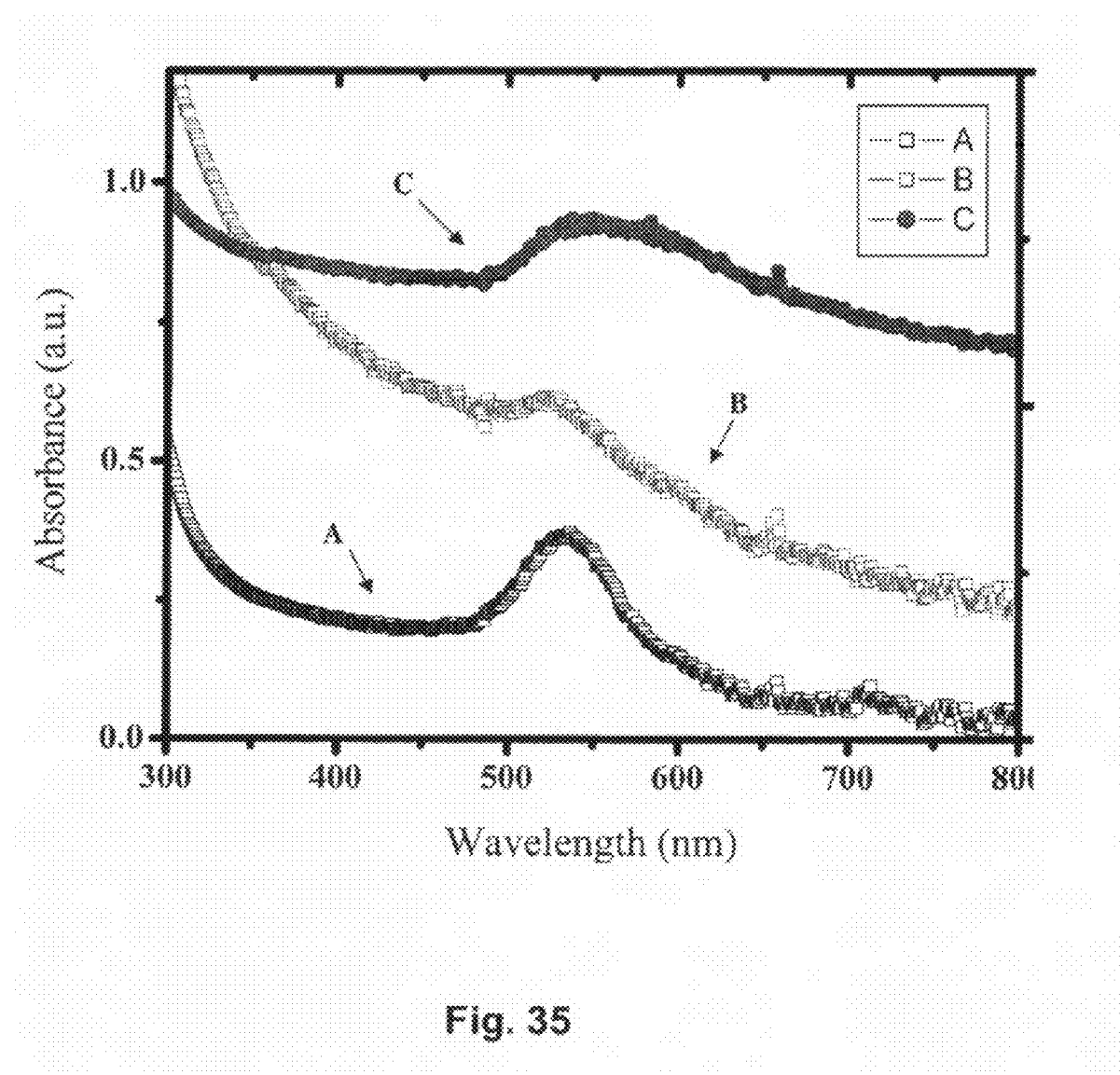
FIG. 35 presents UV spectra of (a) Au-8 (b) Au-3 and (c) Au-13 samples.

Formation of gold nanostructures was achieved at room temperature, followed by the in situ measurement by the UV-vis spectra. The reaction solution containing plant extracts obtained from VeruTEK Technologies, Inc. of Bloomfield, Conn. HAuCl$_4$ 4H$_2$O was introduced into a quartz cell immediately after mixing, and the UV-vis spectra were recorded at different time intervals. The color of the solution changed gradually to light pink within 15 min after mixing. However, some of the samples took longer for the color formation. FIG. 34 shows the time-dependent spectral response obtained during the growth of Au nanostructures. In FIG. 34, the graphs depict a time-dependent Au-10 reaction after (a) 0 minutes (control); (b) 1 minute; (c) 2 minutes; and (d) 3 minutes. The spectra recorded in the early stage show a broad peak at 550 nm, which can be assigned to the transverse component of SPR absorption. The intensity of the peak increases monotonically with time indicating the increase in the amount of the gold products. It can be observed from FIG. 34 that the intensity of the UV-vis absorption peak increases up to 2 min, and then increases exponentially because of the formation of the product. The reaction completes within a few minutes. FIG. 35 shows a typical UV-vis spectrum of gold nanostructures obtained by reducing chloroauric ions with a natural muscle-6013 (Au-10) extract. The broad SPR bands centering at 550 nm are clearly visible, which can be attributed to the in-plane dipole resonance.

Figure 36:
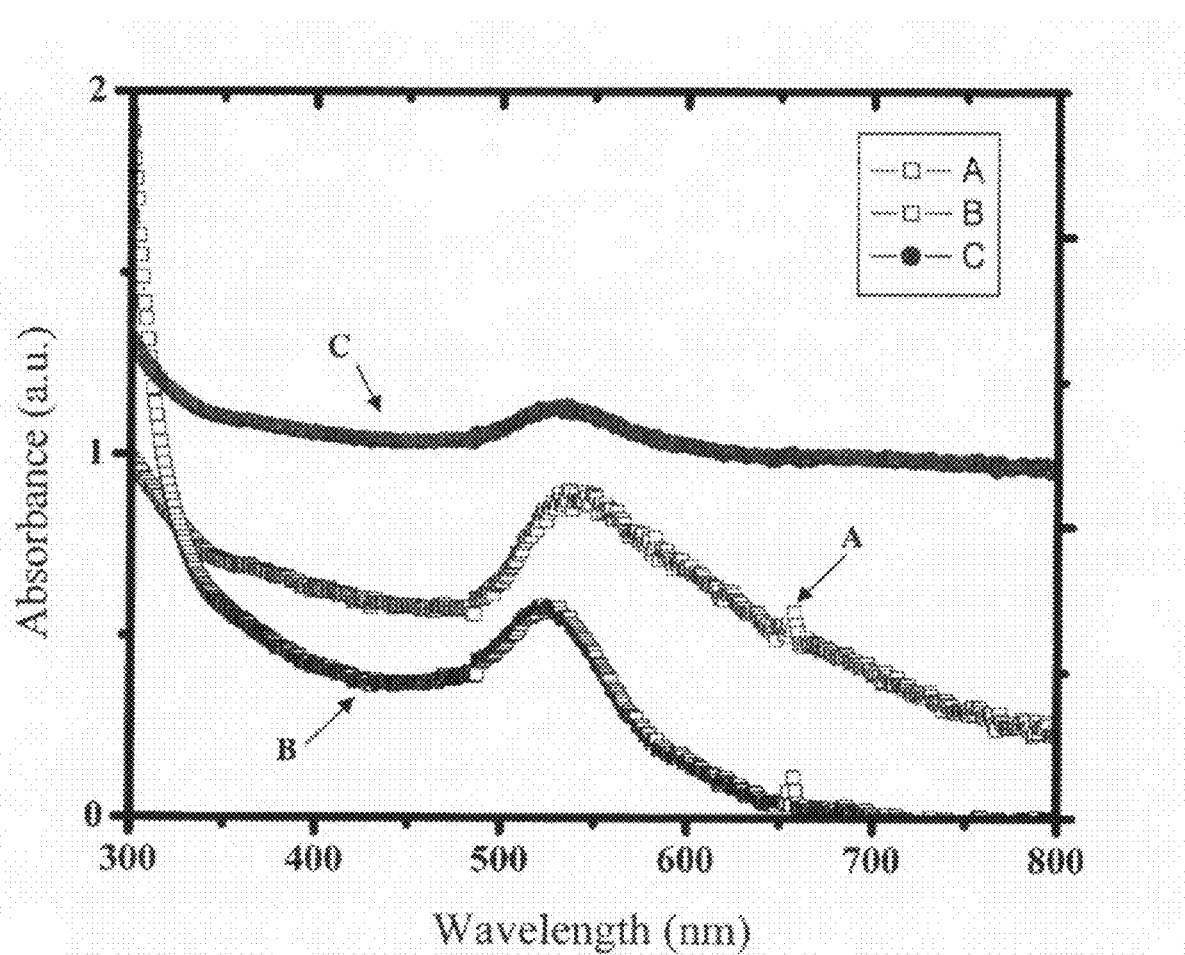
FIG. 36 presents UV spectra of (a) Au-15, (b) Au-5 and (c) Au-10 samples.
Figure 37:
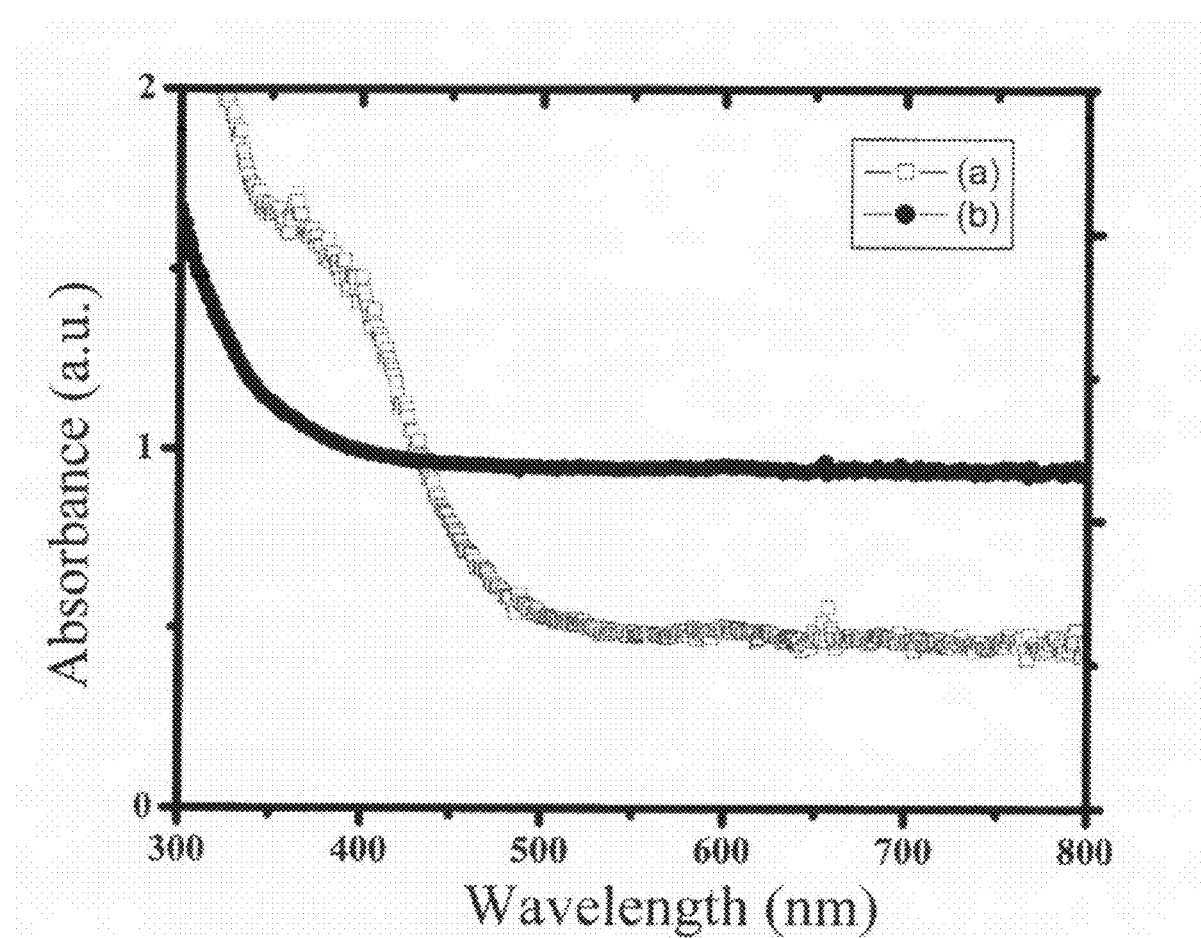
FIG. 37 presents UV spectra of (a) Au-7 and (b) Au-12 samples.
Figure 38:
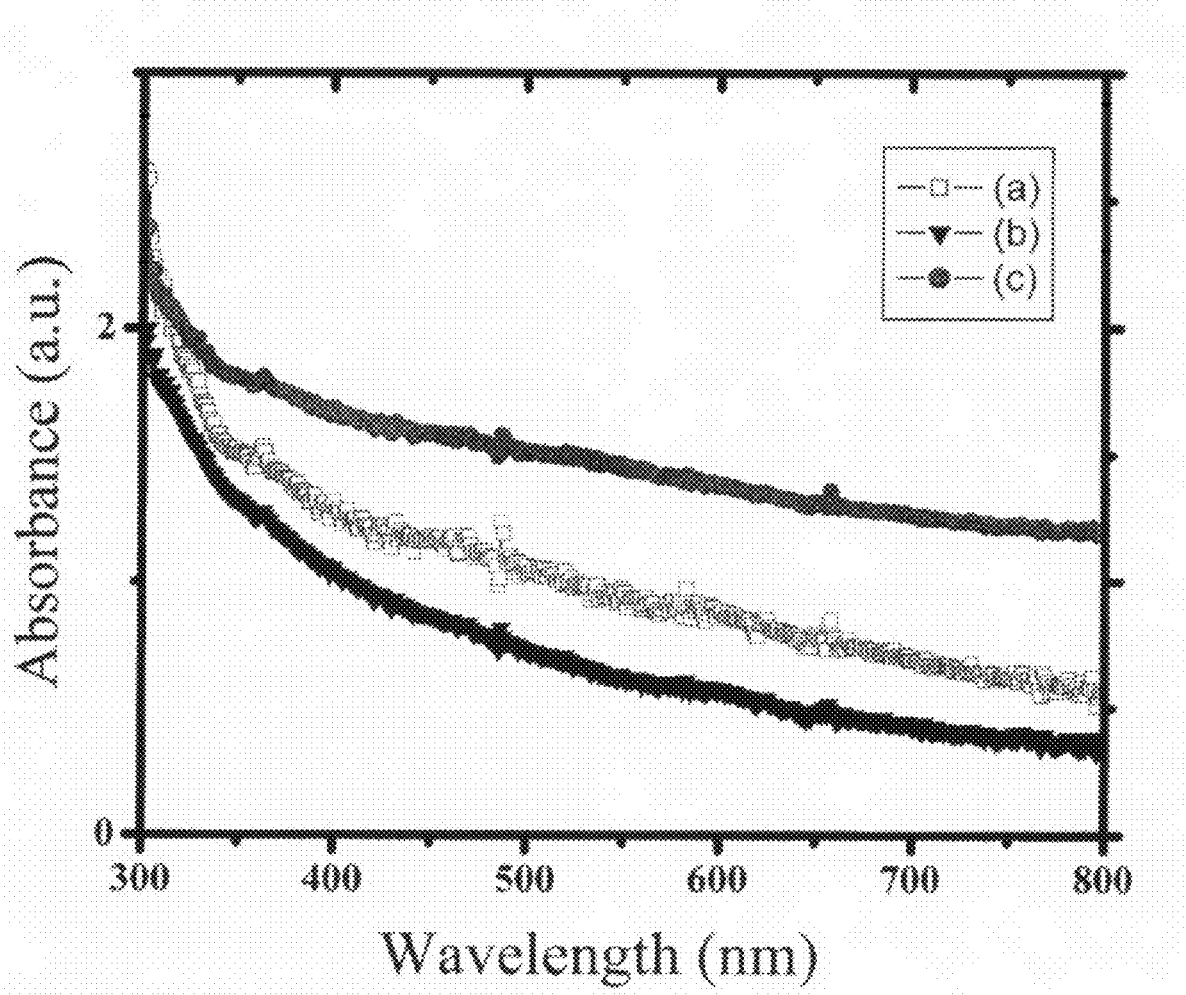
FIG. 38 presents UV spectra of (a) Au-11, (b) Au-1 and (c) Au-6 samples.
Figure 39A:
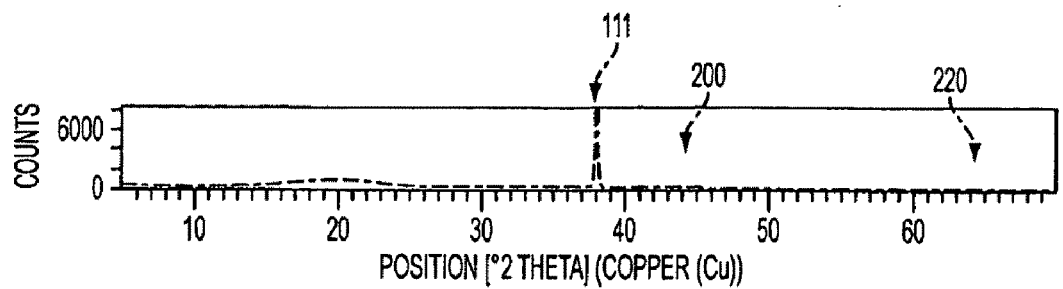
FIG. 39 presents XRD patterns for (a) Au-4, (b) Au-9, (c) Au-14, (d) Au-1, (e) Au-11, (f) Au-5, (g) Au-10 and (h) Au-8.
Figure 39B:
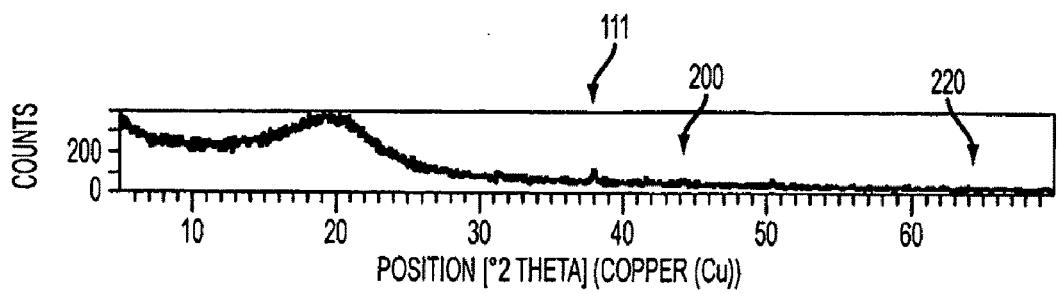
Figure 39C:
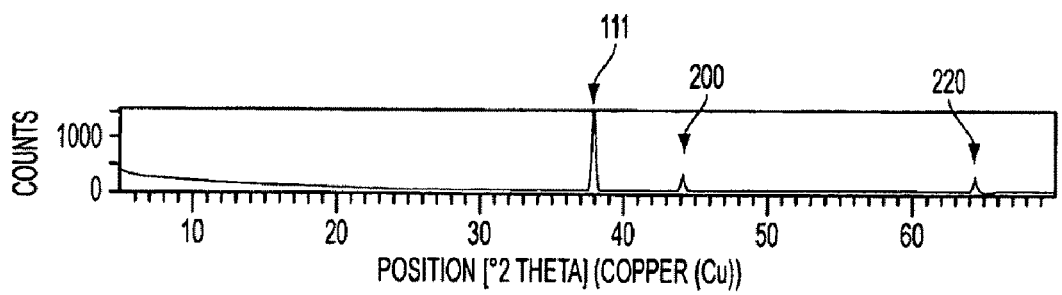
Figure 39D:
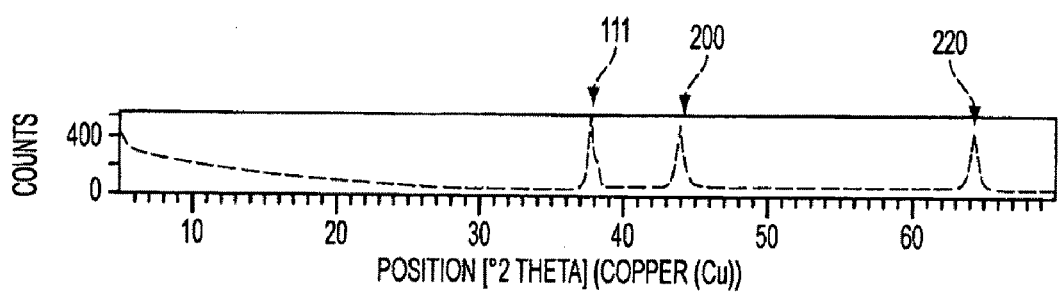
Figure 39E:
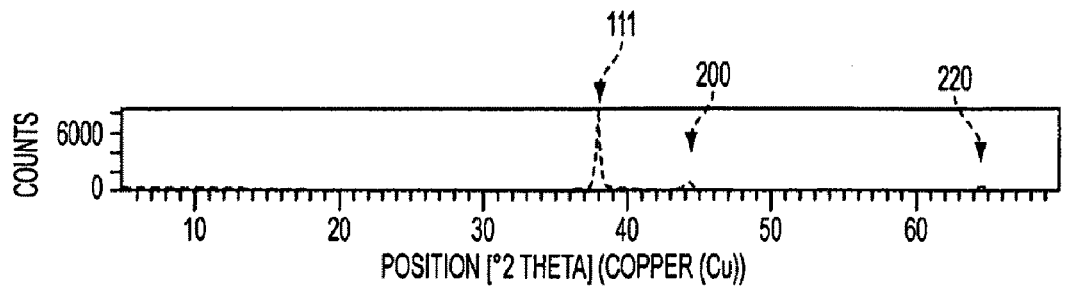
Figure 39F:
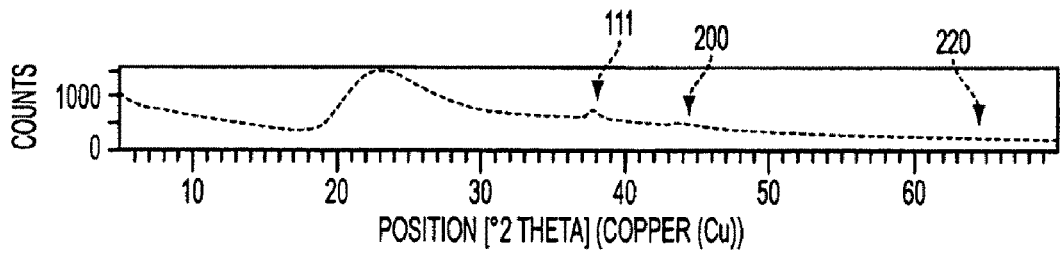
Figure 39G:
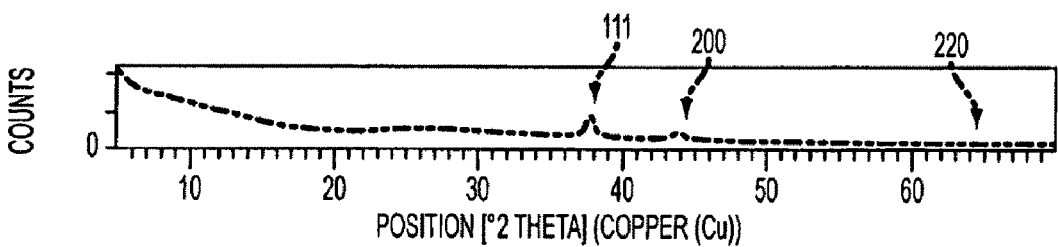
Figure 39H:
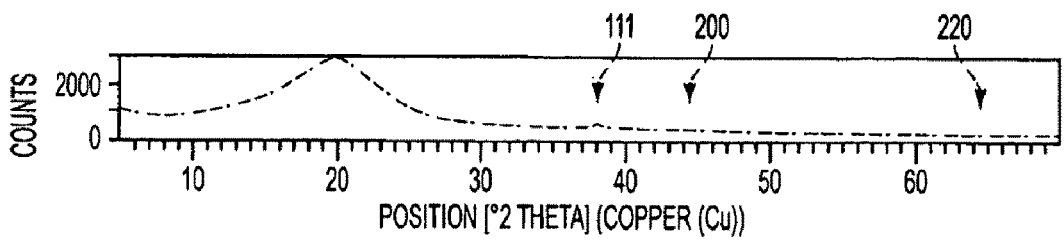

Similarly, the UV-vis spectra for other compositions identified in Table 8 are shown in FIGS. 36-38. In FIG. 36 curves (a) through (c) represent UV spectra of (a) Au-15, (b) Au-5 and (c) Au-10 samples. In FIG. 37, curves (a) and (b) represent UV spectra of (a) Au-7 and (b) Au-12 samples. Samples Au-5, Au-10 and Au-15 reveal a similar spectra to Au-3, Au-8, and Au-13 samples. However, samples such as Au-1, Au-6, Au-7, Au-11 and Au-12 did not show the absorption at 550 nm.

Representative XRD patterns of the gold nanostructures synthesized by different plant extracts are listed in Table 8 and found in FIG. 39. A number of Bragg reflections were present which could be indexed on the basis of the face-centered cubic (fcc) gold structure. No additional impurities were found except a broad hump around 2θ 20°. The broad hump may be from the organic moieties present in the extract. The XRD pattern clearly shows that the gold nanostructures are crystalline. In addition, the intensity of the (111) diffraction is much stronger than those of the (200) and (220) diffractions. These observations indicate that the gold nanostructures formed by the reduction of Au(III) by plant extract are dominated by {111} facets, and hence more {111} planes parallel to the surface of the supporting substrate were sampled.

Figure 40:
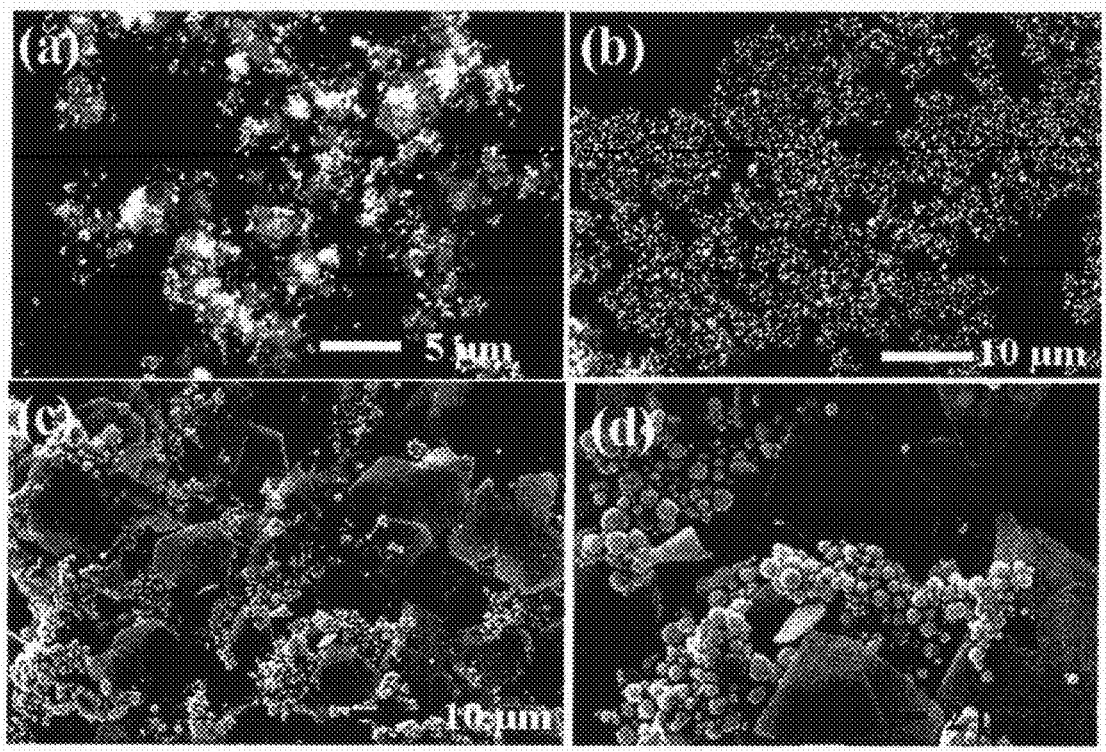
FIG. 40 presents SEM images of (a) Au-1, (b) Au-2 and (c-d) Au-4 samples.
Figure 41:
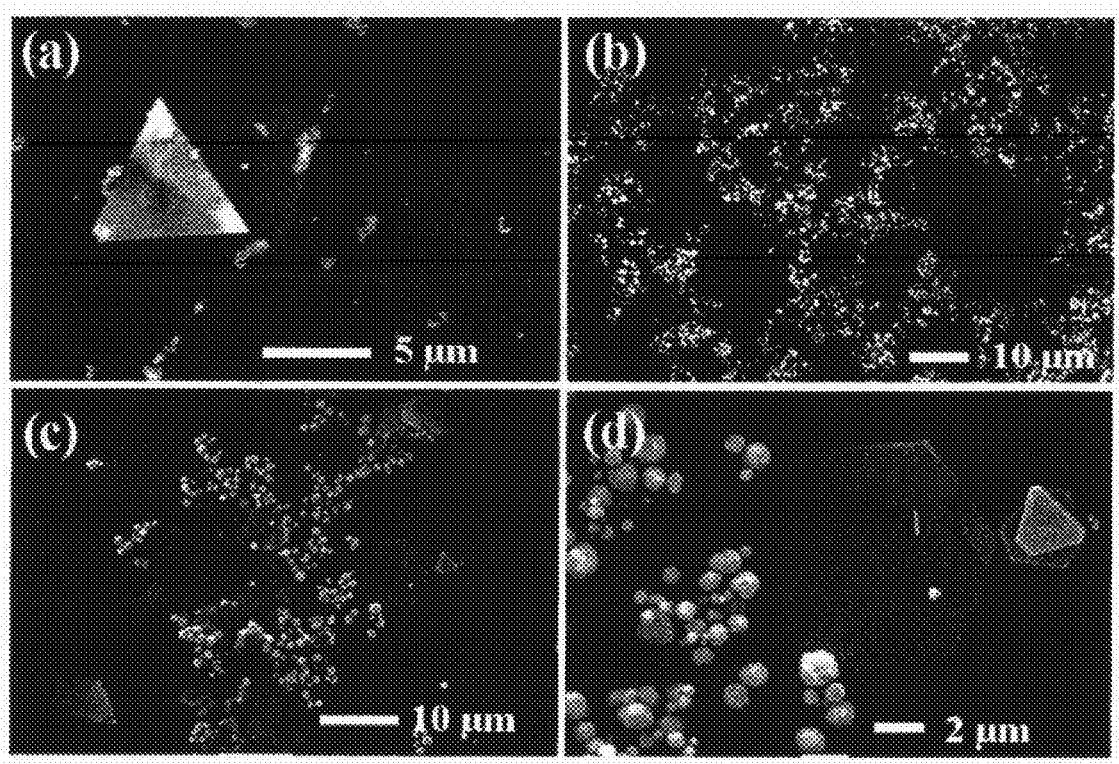
FIG. 41 presents SEM image of (a) Au-11 (b) Au-12 and (c-d) Au-14 samples.
Figure 42:
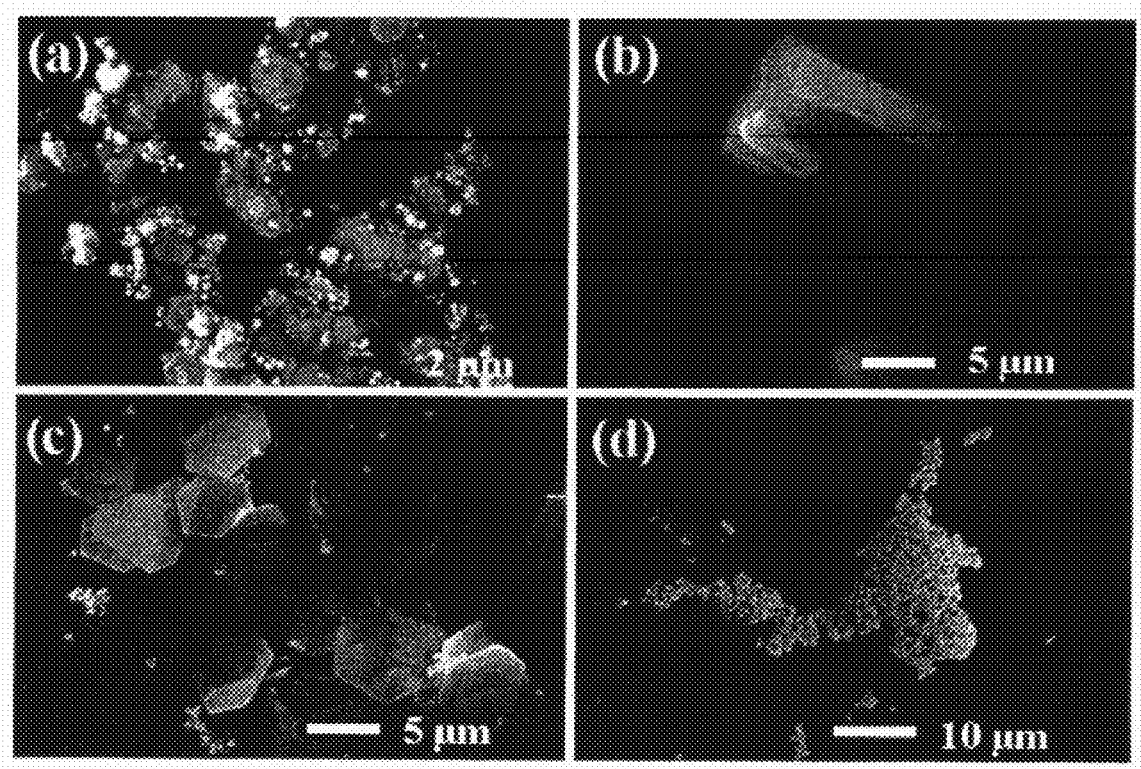
FIG. 42 presents SEM images of (a) Au-6 (b) Au-8 (c) Au-9 and (c) Au-10 samples.

Scanning electron microscopy was used to understand the surface morphology of the Au nanostructures. SEM images of samples (a) Au-1; (b) Au-2; and (c-d) Au-4 samples are found in FIG. 40. Sample Au-2 formed spherical nanostructures with sizes ranging from 100 to 300 nm. Au-1 and Au-4 also yielded a few spherical nanoparticles along with prisms and hexagonal structures. (See FIGS. 41 and 42.)

Similarly, Au-11, and Au14 samples yielded mainly prisms and hexagonal Au nanostructures along with small amount of spherical particles. The same trend continued for Au-6 and Au-9 samples. The samples of Au-10 and Au-12 consist of spherical particles with sizes ranging from 100-200 nm.

Figure 43:
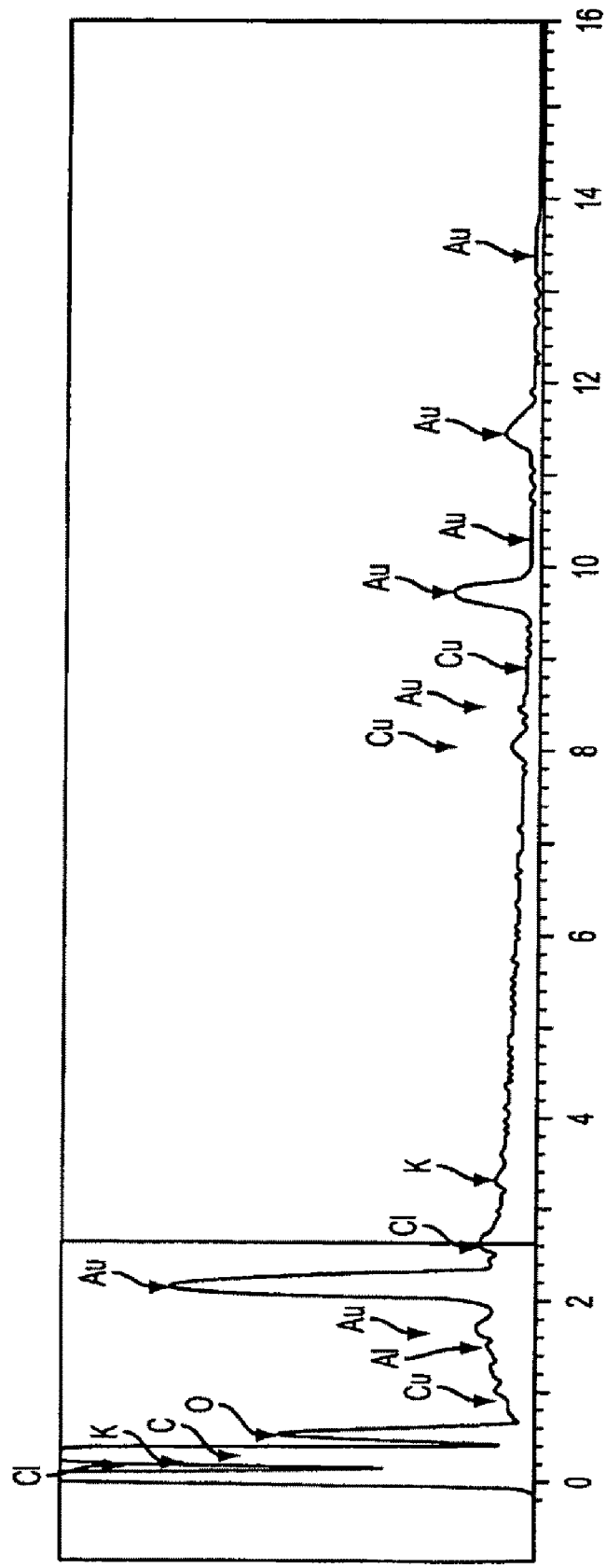
FIG. 43 presents representative EDX spectra of Aux nanostructures obtained using an Au-6 sample.
Figure 44:
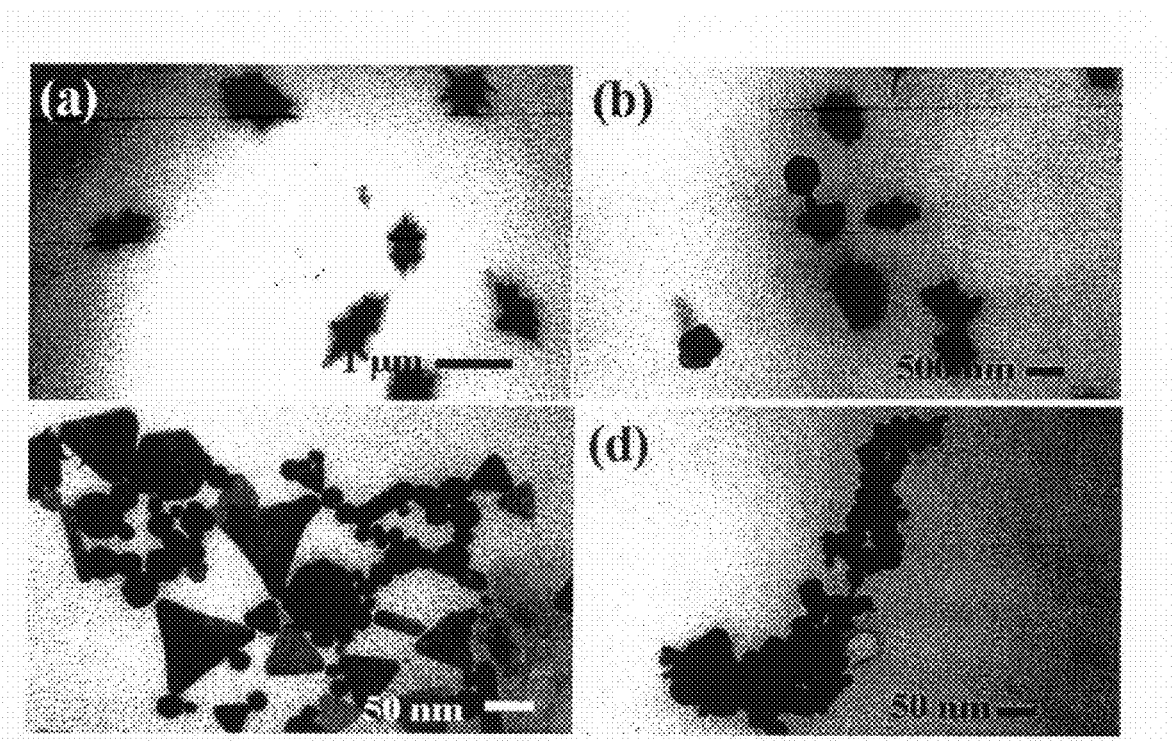
FIG. 44 presents TEM images of (a-b) Au-1, (c) Au-2 and (d) Au-5 samples.
Figure 45:
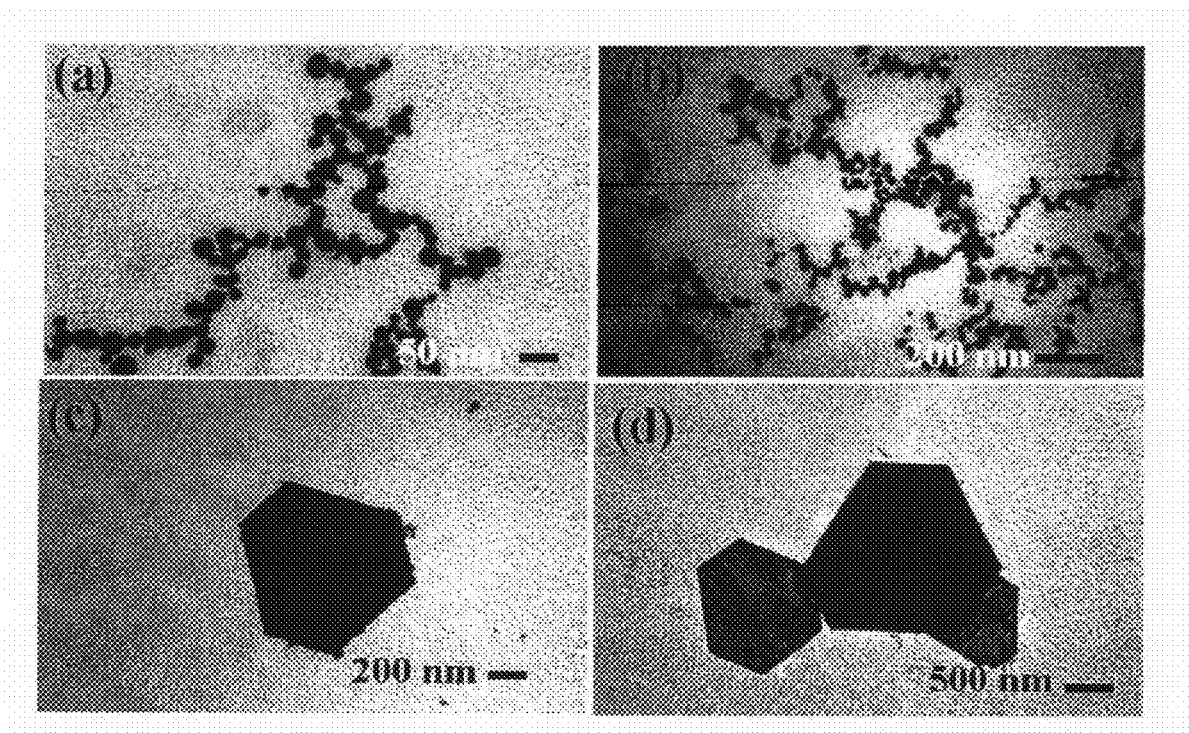
FIG. 45 presents TEM image of (a-b) Au-3 and (c-d) Au-4 samples.

Typical TEM images revealing the size and morphology of the gold nanostructures are given in FIGS. 43 and 44. The nanostructures range in size from about 20 nm to more than a micron in diameter, depending upon the extract used for the preparation. Different shapes such as spherical and hexagonal geometries with very smooth edges were observed. The single-crystalline structure of these nanostructures was further confirmed by their corresponding electron diffraction patterns. FIG. 45 show the TEM image of isolated nanostructures obtained using Au-1, Au-2 and Au-5 samples, respectively. The Au-1 sample yielded interesting plate stacks whereas Au-2 sample yielded mixed prisms, rods and spherical particles. The Au-5 sample was observed to form only spherical nanoparticles with sizes ranging from 20-50 nm. Similarly, TEM images of Au-3 and Au-4 at lower and higher magnification is shown in FIG. 45. the Au-3 sample yielded only spherical particles, in contrast to the Au-4 sample, which mainly formed prisms and hexagonal structures.

Figure 46A:
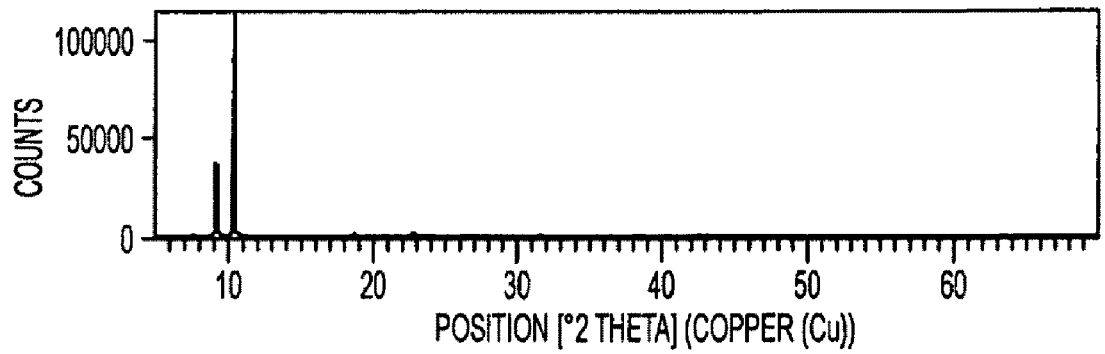
FIG. 46 presents XRD patterns for butyl ammonium bromide-reduced Au nanostructures.
Figure 46B:
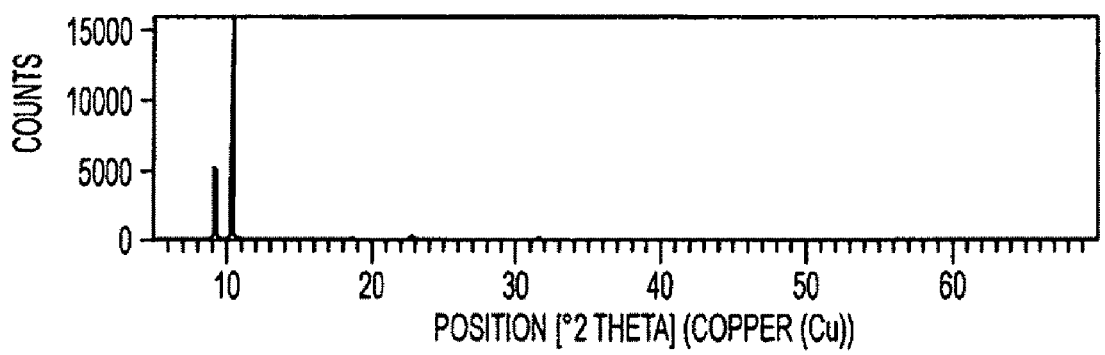
Figure 46C:
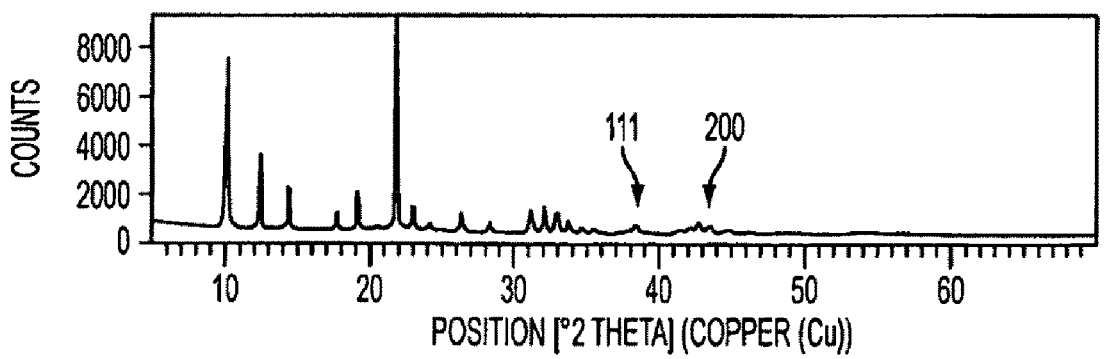

Au nanostructures were also made using commercially available surfactants such as butyl ammonium bromide. The reaction between butyl ammonium bromide and $HAuCl_4$ is spontaneous and color changes from pale yellow to orange (see FIG. 46 for XRD pattern). The XRD pattern after immediate reaction did not show any peaks corresponding to Au nanostructures (see FIG. 46(a-b). However, the overnight reacted sample had peaks which can be indexed to cubic Au pattern. The pattern was compared with JCPDF card no 00-004-0784.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention claimed is:

1. A method for reducing the concentration of a contaminant in a medium, comprising:

combining a metal nanoparticle with the medium;
introducing a plant-based surfactant into the medium; and
allowing the metal nanoparticle to reduce the concentration of or stimulate biological reduction of the concentration of the contaminant.

2. The method of claim 1, wherein the metal nanoparticle is prepared by a method comprising:

providing a solution comprising a first metal ion;
providing a plant extract that comprises a reducing agent, a polyphenol, caffeine, and/or a natural solvent or surfactant; and
combining the first metal ion solution and the plant extract to produce metal nanoparticles.

3. The method of claim 2, wherein the providing of the solution comprising the first metal ion, the providing of the plant extract, and the combining of the first metal ion solution and the plant extract to produce metal nanoparticles are conducted at about room temperature.

4. The method of claim 2, wherein the plant extract is selected from the group consisting of tea extract, green tea extract, coffee extract, lemon balm extract, sorghum bran, sorghum bran extract, polyphenolic flavonoid, flavonoid, flavonol, flavone, flavanone, isoflavone, flavans, flavanol, anthocyanins, proanthocyanins, carotenoids, catechins, quercetin, rutin, and combinations.

5. The method of claim 2, wherein the plant extract is obtained from a waste product selected from the group consisting of fruit juice pulp, fruit juice manufacturing wastewater, fruit juice manufacturing waste, food processing waste, food processing byproduct, wine manufacturing waste, beer manufacturing waste, and forest product processing waste.

6. The method of claim 2, wherein the plant-based surfactant is selected from the group consisting of castor oil, coca oil, coconut oil, soy oil, cotton seed oil, naturally occurring plant oil, ethoxylated corn oil, ethoxylated palm oil, ethoxylated soybean oil, ethoxylated castor oil, ethoxylated coconut oil, polyoxyethylene castor oil, polyethylene glycol castor oil, ethoxylated coconut fatty acid, polyethylene glycol ester of coconut fatty acid, ethoxylated coconut oil fatty acid, polyethylene glycol monoester of coconut oil fatty acid, polyethylene glycol monococonut ester, ethoxylated coca oil, ethoxylated coco fatty acid, polyethylene glycol cocoate, polyethylene glycol monococoate, polyethylene glycol monococonut ester, monococoate polyethylene glycol, monococonut oil fatty acid ester of polyethylene glycol, polyoxyethylene monococoate, polyethylene glycol cocamide, polyethylene glycol coconut amide, polyoxyethylene coconut amide, amidified ethoxylated coconut fatty acid, ethoxylated monoethanolamide of a coconut oil fatty acid, yucca extract, soapwood extract, and extracts of other plants that produce saponins and combinations.

7. The method of claim 2, wherein the solution comprises ferric chloride ($FeCl_3$), ferrous sulfate ($FeSO_4$), ferric nitrate ($Fe(NO_3)_3$), Fe(III)-EDTA, Fe(III)-citric acid, Fe(III)-EDDS, Fe(II)-EDTA, Fe(II)-citric acid, and/or Fe(II)-EDDS.

8. The method of claim 2, wherein the first metal ion is present in the medium.

9. The method of claim 2, wherein the first metal ion is provided in the medium by adding a chelating agent to a soil and/or water sample to be treated.

10. A composition comprising the metal nanoparticle prepared according to the method of claim 2.

11. The method of claim 1, wherein combining the metal nanoparticle with the medium comprises:

introducing a reducing agent, a polyphenol, caffeine, and/or a natural solvent or surfactant into the medium; and allowing the reducing agent, polyphenol, caffeine, and/or the natural solvent or surfactant to react with a dissolved metal ion in the medium to form the metal nanoparticle.

12. The method of claim 11, wherein the metal nanoparticle is nZVI.

13. The method of claim 1, wherein the metal nanoparticle is a zero valent metal nanoparticle.

14. The method of claim 1, wherein the metal nanoparticle comprises at least two different metals.

15. The method of claim 1, wherein the contaminant is selected from the group consisting of a perchlorate, nitrate, and combinations.

16. The method of claim 1, wherein the contaminant is selected from the group consisting of a heavy metal, a heavy metal compound, $Hg^{2+}$, $Ni^{2+}$, $Ag^+$, $Cd^{2+}$, $Cr_2O_7^{2-}$, $AsO_4^{3-}$, and combinations.

17. The method of claim 1, wherein the plant-based surfactant is selected from the group consisting of castor oil, coca oil, coconut oil, soy oil, cotton seed oil, naturally occurring plant oil, ethoxylated corn oil, ethoxylated palm oil, ethoxylated soybean oil, ethoxylated castor oil, ethoxylated coconut oil, polyoxyethylene castor oil, polyethyleneglycol castor oil, ethoxylated coconut fatty acid, polyethylene glycol ester of coconut fatty acid, ethoxylated coconut oil fatty acid, polyethylene glycol monoester of coconut oil fatty acid, polyethylene glycol monococonut ester, ethoxylated coca oil, ethoxylated coco fatty acid, polyethylene glycol cocoate, polyethylene glycol monococoate, polyethylene glycol monococonut ester, monococoate polyethylene glycol, monococonut oil fatty acid ester of polyethylene glycol, polyoxyethylene monococoate, polyethylene glycol cocamide, polyethylene glycol coconut amide, polyoxyethylene coconut amide, amidified ethoxylated coconut fatty acid, ethoxylated monoethanolamide of a coconut oil fatty acid, yucca extract, soapwood extract, and extracts of other plants that produce saponins and combinations.

18. The method of claim 1, further comprising introducing an oxidant into the medium.

19. The method of claim 1, wherein the medium is selected from the group consisting of a biologically contaminated material, soil, groundwater, water, wastewater, air, and combinations.

20. The method of claim 1, wherein the contaminant is selected from the group consisting of non-aqueous phase liquids, dense non-aqueous phase liquids, light non-aqueous phase liquids and combinations thereof.

* * * * *